United States Patent [19]
Okuda et al.

[11] Patent Number: 5,750,958
[45] Date of Patent: May 12, 1998

[54] CERAMIC GLOW PLUG

[75] Inventors: Norio Okuda; Hiroyuki Arima; Kyouji Uchiyama; Michio Ohno; Hiroaki Ohyama; Jun Fukuda; Makoto Niina, all of Kokubu, Japan

[73] Assignee: Kyocera Corporation, Kyoto, Japan

[21] Appl. No.: 305,085

[22] Filed: Sep. 13, 1994

[30] Foreign Application Priority Data

| Sep. 20, 1993 | [JP] | Japan | 5-233075 |
| Sep. 30, 1993 | [JP] | Japan | 5-244401 |
| Nov. 22, 1993 | [JP] | Japan | 5-291789 |
| Nov. 29, 1993 | [JP] | Japan | 5-297825 |
| Jan. 31, 1994 | [JP] | Japan | 6-009346 |
| Feb. 28, 1994 | [JP] | Japan | 6-029863 |
| Mar. 30, 1994 | [JP] | Japan | 6-061031 |
| May 31, 1994 | [JP] | Japan | 6-118418 |
| Jul. 13, 1994 | [JP] | Japan | 6-160884 |

[51] Int. Cl.$^6$ ............... F23Q 7/22; H05B 3/44; F02P 19/00
[52] U.S. Cl. ............ 219/267; 219/544; 123/145 A; 361/264
[58] Field of Search .............. 219/267, 270, 219/541, 543, 544; 123/145 A, 145 R; 361/264, 265, 266

[56] References Cited

U.S. PATENT DOCUMENTS

| 4,644,133 | 2/1987 | Atsumi et al. | 219/270 |
| 4,697,165 | 9/1987 | Ishiguro et al. | 219/543 |
| 4,733,056 | 3/1988 | Kojima et al. | 219/543 |
| 4,912,305 | 3/1990 | Tatemasu et al. | 219/544 |
| 5,086,210 | 2/1992 | Nunogaki et al. | 219/270 |
| 5,132,516 | 7/1992 | Hatanaka et al. | 219/270 |
| 5,206,483 | 4/1993 | Aota | 219/270 |
| 5,233,166 | 8/1993 | Maeda et al. | 219/544 |
| 5,264,681 | 11/1993 | Nozaki et al. | 219/544 |
| 5,451,748 | 9/1995 | Matsuzaki et al. | 219/543 |

Primary Examiner—Teresa J. Walberg
Assistant Examiner—Sam Paik
Attorney, Agent, or Firm—Loeb & Loeb LLP

[57] ABSTRACT

A ceramic heater for a DC power source comprising an insulating ceramic sintered body, a heating resistor composed of at least two separate layers of heating resistor made of an inorganic conductive material, leads made of high-melting point metal wires and connected to each end of the layers, and electrodes made of an inorganic conductive material, each formed in a single layer or divided into a plurality of pieces and connected to the leads, the heating resistor, leads and electrodes being embedded in the ceramic sintered body.

The present invention further includes six related inventions closely related with one another in regard to the above-mentioned ceramic heater and ceramic glow plugs embodied by using the ceramic heater.

10 Claims, 22 Drawing Sheets (x800)

(x800)

5,750,958

CERAMIC GLOW PLUG

BACKGROUND

1. Field of the Invention

The present invention relates to a ceramic heater for high temperature suited for a variety of heating apparatuses, such as a self-saturation glow plug used to quickly preheat the interior of a pre-combustion chamber at the starting or idling of a diesel engine.

2. Prior Art

A sheathed heater wherein a sheath made of a heat-resistant metal is filled with heat-resistant insulating powder and a heating resistor of a high-melting point metal wire mainly made of nickel (Ni), chromium (Cr), etc. is embedded in the heat-resistant insulating powder, and a variety of ignition devices which use high-voltage spark have been used for glow plugs to assist the starting of diesel engines, and a variety of heaters for ignition and heating.

The above-mentioned sheathed heater, however, has some defects. It has no quick heating function since the heat of the heating resistor is transmitted by means of the heat-resistant insulating powder filled in the sheath. In addition, it is inferior in wear resistance and durability. Furthermore, the above-mentioned spark ignition devices have the defects of causing radio interference such as noise during ignition and decreasing reliability for positive ignition and safety at unsuccessful ignition.

To solve such problems, a ceramic heater comprising a heating resistor made of an inorganic conductive material and embedded in a ceramic sintered body, which can exhibit a quick heating function, does not cause radio interference, ensures positive ignition and safety and is superior in wear resistance and durability for higher reliability, has been widely used for glow plugs of internal combustion engines and heaters for various heating apparatuses.

In particular, ceramic heaters for glow plugs of internal combustion engines have been proposed. As an example, a ceramic heater shown in FIG. 4 comprises a heating resistor 3 formed from a coiled high-melting point metal wire and embedded in a ceramic sintered body 2 to have improved durability at high temperatures, thereby accomplishing a quick heating function and self-saturating the temperature thereof. As another example, a ceramic heater shown in FIG. 5 comprises a heating resistor 3 of a high-melting point metal wire and embedded in a ceramic sintered body 2, and a heater 3a of a wire having a positive resistance temperature coefficient higher than that of the heating resistor 3 is connected to the above-mentioned heating resistor 3 in series so as to self-control the heating current of the heating resistor 3 while the heater is turned on and its temperature is rising. (Refer to Japanese Patent Publication No. 1-55369.) In FIGS. 4 and 5, numeral 14 represents a metallic pipe, numeral 15 represents a holder and numeral 16 represents a metallic lead wire.

Problems to be Solved by the Present Invention

In the case of the above-mentioned self-saturation ceramic heater, the electric power consumption and the rush current thereof are small: about 60 W and 18 A respectively when 11 V is applied for 60 seconds for example. It is, however, difficult to set the maximum heating zone of the ceramic heater to the range less than 5 mm from the tip thereof, that is, heating at the tip is difficult. In addition, when the ceramic heater is self-saturated at a heating temperature of 1350° C. at an applied voltage of 14 V, the extremes of temperature in the circumferential direction of the ceramic heater become about 60° C.

On the other hand, in the case of the above-mentioned self-control ceramic heater, the electric power consumption and the rush current thereof are considerably large: about 90 to 100 W and 22 A respectively when 11 V is applied for 60 seconds for example. The heating resistor 3a of the above-mentioned wire used to self-control heating current causes a change in resistance because of intermittently applied current for heating, thereby being apt to deteriorate durability. Furthermore, the complicated structure of the heater increases manufacturing costs.

In addition, since both the terminals 7, 7 are made by sintering leads 5, 5 of embedded metal wires into one body, and then by grinding the sintered area to expose the leads on the surface, there may be the dangers of generating gaps at the boundaries between the ceramic sintered body and leads 5, 5 of exposed metal wires because of the difference in the coefficient of thermal expansion. Through these gaps, oxygen, moisture, etc. may enter the heater, generating cracks at the ceramic sintered body during operation or causing other problems.

SUMMARY OF THE INVENTION

The present invention has been developed to eliminate the above-mentioned defects of the prior art. The object of the present invention is to provide heating at the tip of a self-saturation ceramic heater for a DC power source (the maximum heating zone is disposed about 5 mm or less from the tip), which can be uniform in temperature distribution, prevent the ceramic sintered body from being cracked by entry of moisture and oxygen from the terminals and decrease the volume of the heating zone and electric power consumption. The above-mentioned heater for carrying out the object of the present invention generally comprises a layer of heating resistor composed of at least two separate layers of conductive ceramic in an insulating ceramic sintered body, leads of high-melting point metal wires and connected to the two layers, and terminals connected to the other ends of the leads. Furthermore, the present invention simultaneously provides six Inventions which are related to increase various properties of the heater itself and glow plugs developed by using the heater. That is, the above-mentioned ceramic heater is referred to as a genus invention, and the six inventions are referred to as first to sixth inventions. Regarding the heater, these inventions are closely related to one another and provided with the following means and objects.

In the first invention, wherein a ceramic heater is applied to a glow plug for a diesel engine, the relationship among the effective heating zone length of a heating resistor, the maximum outside diameter of the maximum heating zone of the ceramic heater and the length exposed from a glow plug connection pipe is made specific in view of durability. With this invention, the sealing between the ceramic heater and a holder secured thereto can be accomplished, thereby preventing oxygen and moisture from entering.

In the second invention, the connection of the layer of heating resistor for the heating zone and the leads, with the layer being used as a first layer and a second layer being laminated on the end of the first layer, are connected to the leads by means of the second layer, and the width of the second layer is made smaller than that of the first layer. With this structure, temperature rise does not occur at the connection to the leads, thereby preventing disconnection, any increase in resistance and breakdown of the layer at the connection of the layers.

In the third invention, the diametric and longitudinal positional relationship between embedded layers of heating resistor and an insulating ceramic sintered body is made specific. By keeping the strength of the ceramic heater as high as that of the insulating ceramic sintered body, any breakdown occurring from the conductive ceramics of the layers can be prevented at the setting of a glow plug in an engine or during engine operation.

In the fourth invention, the position of the maximum heating zone of the layer is made specific from the outer circumference of the insulating ceramic sintered body, the tip position of the layer is also made specific from the insulating ceramic sintered body, and the thermal shock resistance and the surface roughness of the maximum heating zone are determined to have limited values, thereby providing a glow plug superior in strength and thermal shock resistance.

In the fifth invention, the positional relationship between the starting point of joining the ceramic heater with a metal member and the corner of the layer connected to the embedded lead wires is made specific, thereby providing high impact resistance when a glow plug is set in an engine or handled in various ways.

In the sixth invention, the insulating ceramic sintered body is a silicon nitride sintered body. The grain boundary phase of the sintered body includes both crystals of $Mo_{4.8}Si_3C_{0.6}$ and $MoSi_2$, and the crystal phase consisting of silicate of RE (an element of the group 3a in the periodic table) existing in the grain boundary before the thermal exposure of the sintered body is composed of monosilicate represented by $RE_2O_3 \cdot SiO_2$. The small variation in the resistance of the heating resistor can prevent a series of successive adverse effects: crystal structural breakdown caused by the movement of ions in the grain boundary, sintered body cracks caused by the breakdown, sintered body oxidation caused by the cracks, the variation in resistance caused by the oxidation and breakdown in the layer of heating resistor.

The genus invention and the six inventions will be detailed below referring to the attached drawings of examples.

DETAILED DESCRIPTION OF THE INVENTION

Figure 1:
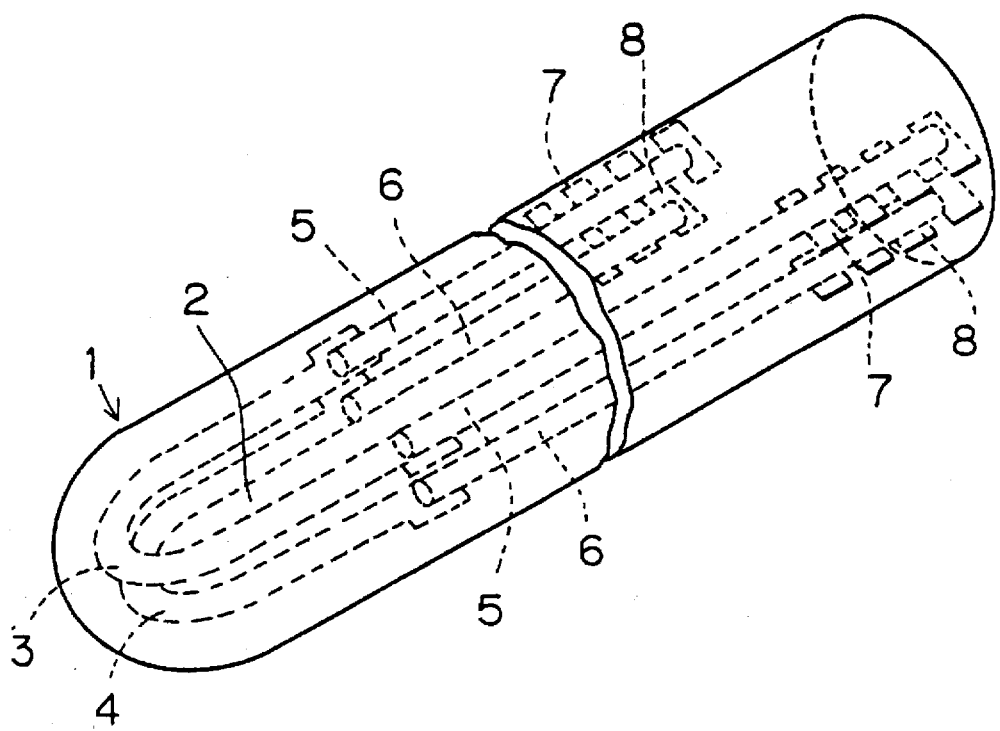
FIG. 1 is a perspective view showing an example of a ceramic heater of the genus invention.
Figure 2:
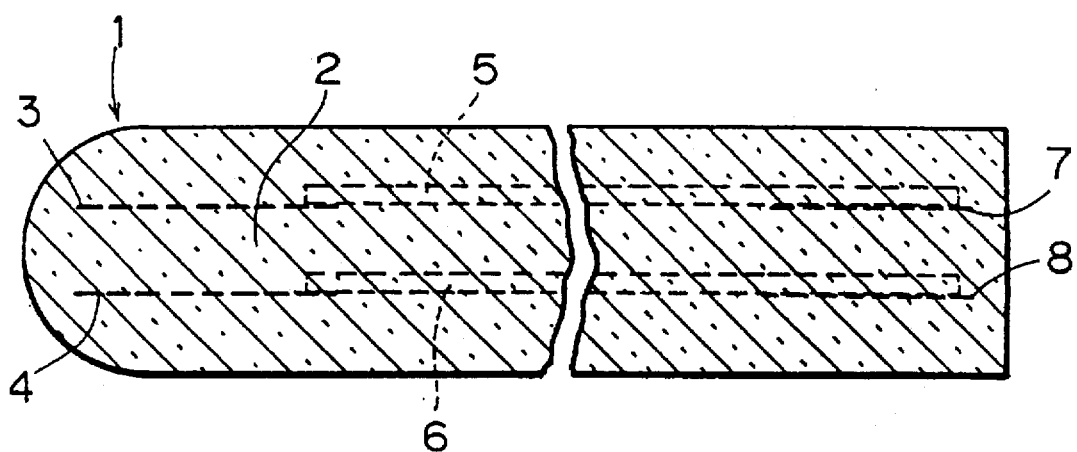
FIG. 2 is a vertical longitudinal sectional view of the ceramic heater shown in FIG. 1.
Figure 3:
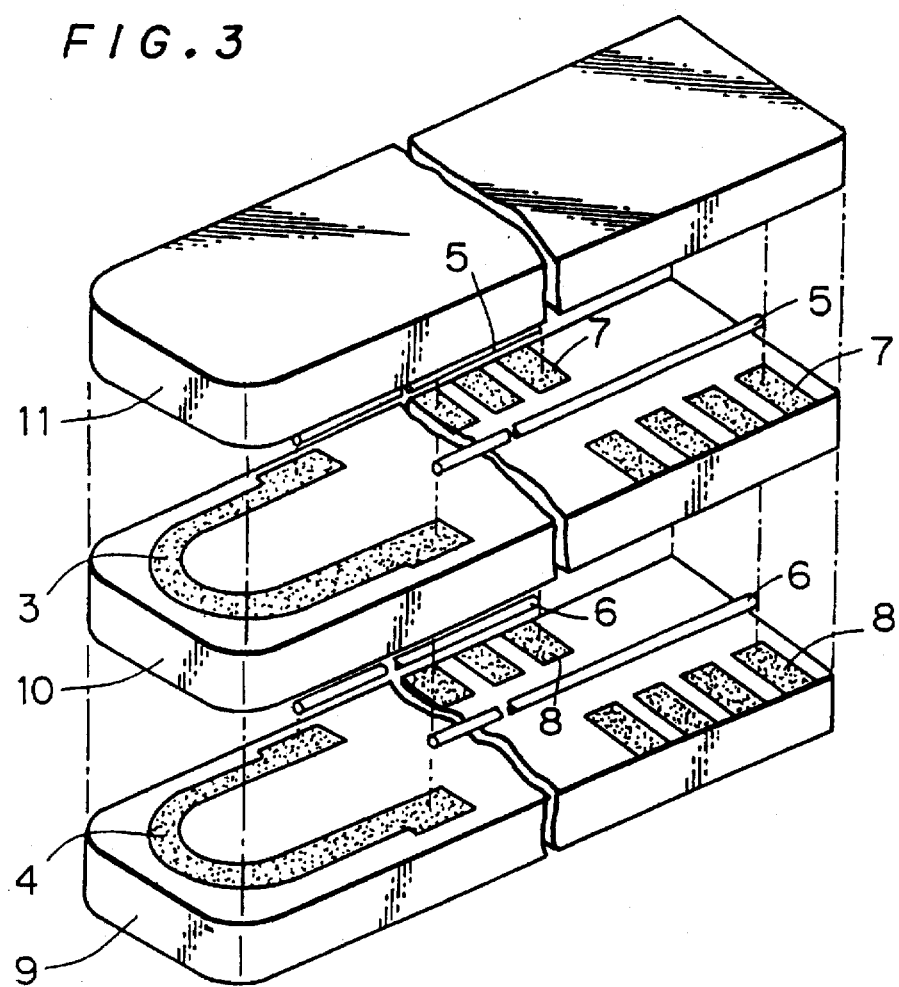
FIG. 3 is a perspective view illustrating a method of producing the ceramic heater of the genus invention.

The genus invention and the first to sixth inventions will be detailed below in that order. For the sake of clearer understanding, all the inventions and their claims and drawings will be categorized generally as follows. FIGS. 1 to 3 correspond to the genus invention, FIGS. 6, 7 and 9 correspond to the first invention, and FIGS. 10 and 11 correspond to the second invention, claim 10 and FIGS. 13 to 15 correspond to the third invention, FIGS. 17 to 19 correspond to the fourth invention, FIGS. 21 to 26 and 28 correspond to the fifth invention, and FIGS. 29 to 35 correspond to the sixth invention, respectively.

In the following descriptions of the present invention and prior art, the same functional members are represented by the same reference characters for the sake of convenience, even though such members may be different in structure.

The ceramic heater of the genus invention is intended to be used for a DC power source and comprises an insulating ceramic sintered body, a heating resistor embedded in the sintered body, and a pair of leads which are connected to the heating resistor and comprise a pair of electrodes exposed from the side surfaces of the ceramic sintered body, being characterized in that the heating resistor is composed of a single printed layer or a plurality of separate printed layers made of an inorganic conductive material, and the leads are each composed of a high-melting point metal wire.

In the ceramic heater of the genus invention, since the embedded heating resistor made of an inorganic conductive material is formed in a layer shape by the screen printing method or the like, the tip of the ceramic heater can be heated concentratedly. Furthermore, since the volume of the heating zone of the heater is small, the electric power consumption of the heater can be reduced.

In addition, by making the above-mentioned heating resistor made of an inorganic conductive material into at least two layers disposed preferably nearly parallel to each other, the maximum temperature difference in the circumferential direction of the ceramic heater can be made small when the temperature of the ceramic heater saturates, the quick heating function can be improved, and the layers of heating resistor can be made thinner. Because of these reasons, cracks or any other problems do not occur when the layers of heating resistor are formed.

Furthermore, by forming the leads from high-melting point metal wires or the like, the leads have low resistance and thus do not generate unnecessary heat. Moreover, by making the electrodes connected to the leads into a plurality of layers made of inorganic conductive material and formed by the screen printing method or the like and by further dividing the electrodes into a plurality of pieces, the difference in thermal expansion between the electrodes and the ceramic sintered body is made small and no gap is generated between the surface of the ceramic sintered body and the electrodes, thereby preventing entry of oxygen and moisture and improving the durability and reliability of the electrodes during continuous operation for a long time.

EXAMPLES (Example 1)

The following descriptions will be offered basically referring to the drawings of an example of a ceramic heater of the genus invention.

FIG. 1 is a perspective view showing the ceramic heater of the genus invention, and FIG. 2 is a vertical longitudinal sectional view of the ceramic heater shown in FIG. 1.

Referring to FIGS. 1 and 2, numeral 1 represents a ceramic heater. Two nearly-parallel separate layers 3, 4 of heating resistor made of an inorganic conductive material, leads 5, 6 formed from high-melting point metal wires and connected respectively to the ends of the layers 3, 4 of heating resistor, and electrodes 7, 8 composed of two separate layers made of an inorganic conductive material and connected respectively to the leads 5, 6, each layer being divided into a plurality of pieces, are embedded in the insulating ceramic sintered body 2 of the ceramic heater 1. The ends of the electrodes 7, 8 are exposed to the outer circumference of the ceramic sintered body 2. The entire shape of the ceramic heater 1 is cylindrical, and the tip of the ceramic sintered body 2 on the side wherein the layers 3, 4 of heating resistor are disposed has a nearly spheric shape.

A sintered body mainly composed of silicon nitride ($Si_3N_4$) which is superior in oxidation resistance and strength at high temperatures is ideally suited for the insulating ceramic sintered body 2.

Furthermore, the main component of the layers 3, 4 of heating resistor made of an inorganic conductive material or the electrodes 7, 8 is a high-melting point metal, such as tungsten (W), molybdenum (Mo) or rhenium (Re) or one of their alloys, or a carbide or a nitride of one of the 4a, 5a and 6a groups, such as tungsten carbide (WC), titanium nitride (TiN) or zirconium boride ($ZrB_2$). In particular, tungsten carbide (WC) is preferable.

When the insulating ceramic sintered body 2 is mainly made of silicon nitride ($Si_3N_4$), it is preferable that the layers 3, 4 of heating resistor or the electrodes 7, 8 are mainly made of tungsten carbide (WC) and additionally made of silicon nitride ($Si_3N_4$) powder which is mixed with the tungsten carbide in the following mixture ratio. More specifically, the layers 3, 4 of heating resistor made of the above-mentioned inorganic conductive material should have a composition of 65 to 95 weight % of tungsten carbide (WC) and 5 to 35 weight % of silicon nitride ($Si_3N_4$) in view of coefficient of thermal expansion, or more preferably a composition of 75 to 90 weight % of tungsten carbide (WC) and 10 to 25 weight % of silicon nitride ($Si_3N_4$). Besides, the thickness of the above-mentioned layers of heating resistor should be at least in the range of 2.3 to 150 μm at the maximum heating zone, or more preferably, 8 to 53 μm to prevent cracks or any other problems in the layers of heating resistor.

The resistance of the inorganic conductive material for the electrodes 7, 8 is required to be lower than that of the layers 3, 4 of heating resistor, and the electrodes are desired to be formed into two upper and lower layers as shown in the figure. Instead of this structure, the number of the layers of electrodes can be made smaller than that of the layers of heating resistor by establishing electric connections by using through-holes or the like.

On the other hand, the leads 5, 6 should be made of tungsten (W), molybdenum (Mo) or rhenium (Re), or one of their alloys, or more preferably tungsten (W).

Before evaluating the ceramic heater of the genus invention, ceramic green bodies 9, 10 and 11 mainly made of silicon nitride, such as flat plates shown in FIG. 3, were first made by a conventional known molding method, such as the press molding method by using granules prepared by adding and mixing yttria ($Y_2O_3$) or an oxide of a rare-earth element as a sintering aid with high-purity silicon nitride ($Si_3N_4$) powder.

Next, powdery tungsten carbide (WC) and powdery silicon nitride ($Si_3N_4$) were mixed in various proportions. Solvent was added to these mixed powdery materials to prepare paste. By using such paste, the layers 3, 4 of heating resistor were formed on the surfaces of the ceramic green bodies 10 and 9 by the screen printing method or the like so that the layers of resistor had U-shaped patterns having various dimensions determined on the basis of designed resistance values and the tip of each pattern was placed within 5 mm from the tip of the ceramic sintered body.

On the other hand, by using paste made of 85 weight % of powdery tungsten carbide (WC) and 15 weight % of powdery silicon nitride ($Si_3N_4$), the electrodes 7 and 8 were each formed in four parallel patterns each having a width of about 0.7 mm and a thickness of about 70 μm in the same method as described above on the surfaces of the ceramic green bodies 10 and 9, disposed at the specified positions on the sides of the ceramic green bodies at the ends thereof opposite to the side where the layers 3 and 4 of heating resistor were disposed, and extending to the side surfaces of the ceramic green bodies.

Next, the leads 6 formed from a tungsten (W) wire of 0.25 mm in diameter was placed between the surface of the ceramic green body 9 having the layer 4 of heating resistor and the electrode 8 formed on the same surface by printing and the surface of the ceramic green body 10 on which the layer 3 of heating resistor and the electrode 7 were not formed by printing so that the lead 6 was connected to the layer 4 of heating resistor and the electrode 8.

Then, the lead 5 formed from a tungsten (W) wire having the same dimension as described above was placed between the surface of the ceramic green body 10 having the layer 3 of heating resistor and the electrode 7 and the surface of the ceramic green body 11 having no layer of heating resistor and electrode so that the lead 5 was connected to the layer 3 of heating resistor and the electrode 7. These green bodies were fired under pressure at 1600° to 1800° C. for 15 minutes to 2 hours in a reduction atmosphere including carbon (C).

The circumference of the ceramic sintered body obtained in this way was ground so that the ceramic sintered body had a cylindrical rod shape with the tip thereof on the sides of the layers 3 and 4 of heating resistor being made into a nearly sphere shape, and the end surfaces of the embedded electrodes 7 and 8 were exposed to the side surfaces of the cylindrical rod, thereby producing a ceramic heater having a diameter of about 3.5 mm.

Figure 4:
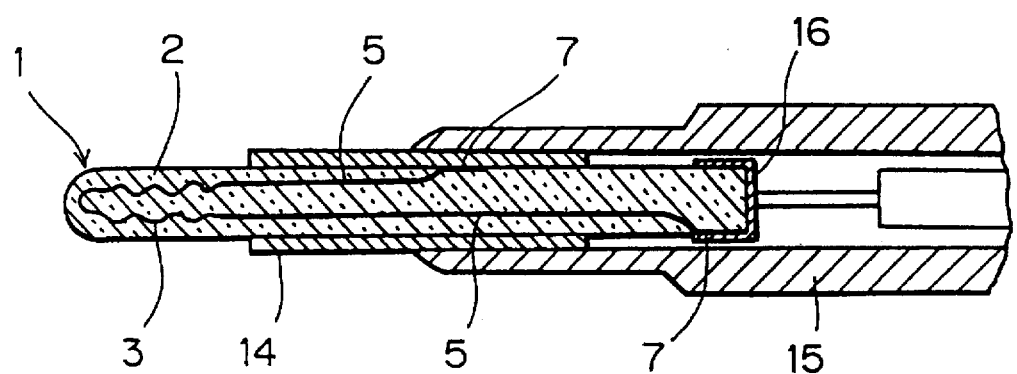
FIG. 4 is a horizontal longitudinal sectional view showing the main section of a self-saturation glow plug applied to a glow plug of a conventional internal combustion engine.
Figure 5:
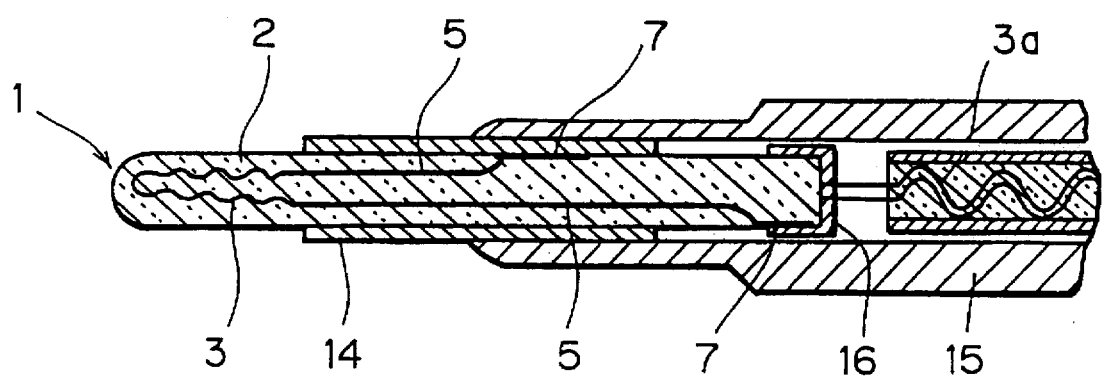
FIG. 5 is a horizontal longitudinal sectional view showing the main section of a self-control ceramic heater applied to a glow plug of a conventional internal combustion engine.

By the metalizing or plating method, a metallic layer made of nickel (Ni) or the like was formed at least on the exposed portions of the electrodes 7 and 8 of the ceramic heater 1 obtained as described above. A cylindrical support pipe (corresponding to numeral 14 in FIG. 4) was then fitted on the ceramic heater 1 so that the metallic layer was connected to the electrode 7 exposed on the side surface of the ceramic heater 1. The support pipe was further joined to the electrode by silver soldering in a reduction atmosphere to form a negative electrode. An electrode (corresponding to numeral 16 in FIG. 4) formed from a wire or a cap was joined to the electrode 8 support pipe was joined by silver soldering in the same way as described above to form a positive electrode. The ceramic heater 1 was thus provided with the positive and negative electrodes. In this way, a variety of samples of the ceramic heaters 1 were produced for the purpose of evaluation (this production method is represented by MS).

By using the above-mentioned ceramic heater for evaluation, a DC voltage of 11 V was applied to the above-mentioned layers of heating resistor for 60 seconds and the temperature of the heater was raised quickly up to 1150° C. At this time, the electric power consumption and rush current of the heater were measured. In addition, the time required until a temperature of 800° C. was reached after the heater had been turned on was also measured.

Furthermore, after a constant temperature was reached because of saturation, the surface temperature distribution from the tip of the ceramic heater exposed from the support pipe was measured by a noncontacting radiation thermometer to obtain the distance from the above-mentioned tip to the maximum heating zone.

Additionally, the heating temperature of the ceramic heater was saturated to 1350° C. by applying a DC voltage of 14 V and the temperature distribution around the maximum heating zone was measured by a noncontacting radiation thermometer to obtain the maximum circumferential temperature difference of the above-mentioned ceramic heater for evaluation.

Moreover, the above-mentioned ceramic heater for evaluation was subjected to 50,000 cycles of a high-load durability test wherein each cycle consisted of a quick heating period in which the ceramic heater was quickly heated up to 1400° C. by applying a DC voltage of 14 V for 2 minutes and a forcibly cooling period in which power supply was stopped and compressed air was blown to the ceramic heater. The increase in the resistance value of the ceramic heater before and after the test was measured. A plurality of samples were subjected to the test and those caused increases in resistance not less than 20% were judged to be improper.

(Comparison Example 1)

A single layer of heating resistor composed of 80 weight % of tungsten carbide (WC) and 20 weight % of silicon nitride ($Si_3N_4$) was formed and connected to the lead of a single layer of electrode having the same composition as that of the above-mentioned ceramic heater for evaluation. This heater was used as a comparison example.

The results of the above-mentioned measurements are shown in Tables 1 and 2.

TABLE 1

| Sample No. | Heating Resistor Composition (wt %) WC | Heating Resistor Composition (wt %) Si₃N₄ | Thickness (μm) | Electric Power Consumption (W) | Rush Current (A) | Remarks |
|---|---|---|---|---|---|---|
| 1 | 65 | 35 | 150 | 33 | 12.0 | Genus |
| 2 | " | " | 125 | 30 | 10.9 | Invention |
| 3 | " | " | 73 | 27 | 9.9 | Example |
| 4 | 70 | 30 | 75 | 37 | 13.5 | |
| 5 | " | " | 56 | 34 | 12.4 | |
| 6 | " | " | 30 | 29 | 10.6 | |
| 7 | 75 | 25 | 53 | 39 | 14.1 | |
| 8 | " | " | 27 | 32 | 11.6 | |
| 9 | " | " | 18 | 29 | 10.5 | |
| 10 | 80 | 20 | 40 | 45 | 16.3 | |
| 11 | " | " | 30 | 42 | 15.2 | |
| 12 | " | " | 25 | 38 | 13.8 | |
| 13 | " | " | 16 | 35 | 12.7 | |
| 14 | " | " | 12 | 32 | 11.6 | |
| 15 | 85 | 15 | 28 | 42 | 15.3 | |
| 16 | " | " | 22 | 40 | 14.6 | |
| 17 | " | " | 17 | 36 | 13.1 | |
| 18 | " | " | 11 | 34 | 12.4 | |
| 19 | " | " | 9 | 30 | 10.9 | |
| 20 | 90 | 10 | 18 | 43 | 15.7 | |
| 21 | " | " | 8 | 35 | 12.8 | |
| 22 | " | " | 5.2 | 28 | 10.2 | |
| 23 | 95 | 5 | 12 | 47 | 17.2 | |
| 24 | " | " | 6.3 | 32 | 11.7 | |
| 25 | " | " | 2.8 | 24 | 8.8 | |
| *26 | 80 | 20 | 24 | 37 | 13.6 | Comparison Example 1 |

Note:
Sample with asterisk * is out of range of the present invention as claimed.

TABLE 2

| Sample No. | Maximum Heating Zone Distance (mm) | Maximum Heating Zone Circumferential Extremes of Temperature (°C.) | Quick Heating Function (SEC) | Durability Test Results | Remarks |
|---|---|---|---|---|---|
| 1 | 2.0 | 25 | 3.4 | Proper | Genus |
| 2 | 1.8 | 28 | 3.1 | " | Invention |
| 3 | 1.0 | 20 | 3.2 | " | Example |
| 4 | 2.7 | 30 | 3.9 | " | |
| 5 | 2.3 | 24 | 3.2 | " | |
| 6 | 2.1 | 29 | 3.3 | " | |
| 7 | 2.8 | 31 | 3.7 | " | |
| 8 | 2.1 | 28 | 3.8 | " | |
| 9 | 1.3 | 23 | 3.3 | " | |
| 10 | 3.3 | 25 | 4.3 | " | |
| 11 | 2.9 | 32 | 3.9 | " | |
| 12 | 2.3 | 18 | 3.7 | " | |
| 13 | 1.8 | 24 | 3.0 | " | |
| 14 | 1.5 | 20 | 3.4 | " | |
| 15 | 3.2 | 25 | 3.8 | " | |
| 16 | 2.5 | 18 | 3.5 | " | |
| 17 | 2.2 | " | 3.0 | " | |
| 18 | 2.0 | 20 | 3.1 | " | |
| 19 | 1.4 | " | 2.8 | " | |
| 20 | 3.0 | " | 3.8 | " | |
| 21 | 2.1 | 25 | 3.0 | " | |
| 22 | 1.4 | 28 | 2.9 | " | |
| 23 | 3.7 | 32 | 3.7 | " | |
| 24 | 1.9 | 23 | 3.6 | " | |
| 25 | 1.3 | 35 | 3.0 | " | |
| *26 | 1.9 | 64 | 4.5 | " | Comparison Example 1 |

Note:
Sample with asterisk * is out of range of the present invention as claimed.

As clearly shown in Tables 1 and 2, the distance between the tip and the maximum heating zone is not more than 5 mm for all samples 1 to 25 and comparison example 1. The quick heating functions of samples 1 to 25 are generally shorter (the shortest value: 2.8 seconds) than the function of comparison example 1. A decisive difference is shown by sample 25 which delivers a circumferential temperature difference value of 35° C., the maximum value among samples 1 to 25. The difference value for comparison example 1 is 64° C., 1.8 times as high as that of sample 25. It is thus obvious that this difference is caused by the structural difference between the example of the genus invention wherein two thin separate layers are used for a heating resistor and the comparison example wherein a single layer is used.

As described above, since the ceramic heater of the genus invention has at least two embedded layers of heating resistor made of an inorganic conductive material, the heater can concentratedly heat a zone very close to the tip thereof (not more than 5 mm). In addition, since the volume of the heating zone is small, the heater requires less electric power consumption. Furthermore, since the maximum temperature difference in the circumferential direction of the ceramic heater is extremely small at temperature saturation, the quick heating function can be improved and the layers of heating resistor can be made thinner, thereby preventing cracks from being caused by residual stress at the firing of the layers of heating resistor into one body.

Besides, since the leads are composed of a high-melting point metal, they have low resistance and do not generate unnecessary heat. What is more, since the electrodes connected to the leads are each formed in a layer which is made of an inorganic conductive material in the same way as the layers of heating resistor and disposed in a plurality of divided pieces, the difference between the thermal expansion coefficient of the electrodes and that of the ceramic sintered body is made small, thereby preventing gap generation between the surface of the ceramic sintered body and the electrodes even if thermal exposure is repeated. Accordingly, no entry of oxygen and moisture is assured and the durability and reliability of the ceramic sintered body are improved.

As a result, the genus invention can provide a ceramic heater capable of operating continuously for a long time, requiring no complicated structure and being superior in durability.

The first invention is intended to solve the problems described below when the ceramic heater of the genus invention is used as a glow plug.

Figure 8:
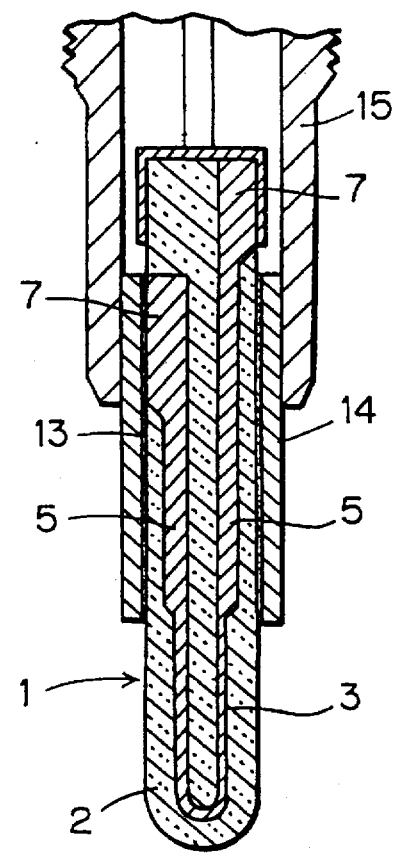
FIG. 8 is a horizontal longitudinal sectional view showing the main section of a conventional ceramic glow plug.

A conventional ceramic heater 1 (Japanese Laid-open Patent Application No. 2-75188) has been proposed wherein nonoxide ceramics, such as a silicon nitride sintered body, superior in thermal shock resistance and high temperature strength to other ceramics, is used for an insulator, a heating resistor generally composed of a high-melting point metal, such as tungsten (W) or molybdenum (Mo), or a compound of such metals, is embedded in the above-mentioned insulator, or heating resistor paste mainly composed of one of the above-mentioned metals or a compound of such metals, such as tungsten carbide (WC), is printed on the above-mentioned insulator as shown in FIG. 8 to form patterns for a heating resistor 3, leads 5, 5 and electrodes 7, 7, and the insulator is then laminated with another insulator, and fired into one body.

When the above-mentioned ceramic heater is used for a glow plug for high temperatures ranging from 1000° to 1300° C., it generates heat at the various portions thereof because of high resistance values at the heating resistor patterns used for the heating resistor 3, the leads 5, 5 and the electrodes 7, 7. As a result, a cylindrical support pipe 14 electrically connected to a holder for securing the ceramic heater 1 to a diesel engine is heated close to 1000° C. The above-mentioned cylindrical support pipe 14 is thus subjected to repetitive exposure to high temperatures close to 1000° C., each time the diesel engine is ignited.

As a result, the brazing material 13 for securing the ceramic heater 1 to the cylindrical support pipe 14 may be melted or oxidized and gaps may be generated between the ceramic heater 1 and the cylindrical support pipe 14. These gaps may cause many problems, that is, the combustion gas of the diesel engine may leak from the gaps, reducing the pressure in the combustion chamber, oxygen and moisture may enter from the gaps, causing cracks in the heating resistor 3 for the heating zone, or breakdown may occur in a short period.

To solve these problems, the first invention has been developed. The object of the invention is to provide a ceramic glow plug which is suited as a glow plug for high temperatures ranging from 1000° to 1300° C. and is superior in durability so that it can be used repetitively for a long time without deteriorating the sealing performance at the brazed area between the above-mentioned ceramic heater and the cylindrical support pipe.

In the ceramic glow plug of the first invention, when the length of the effective heating zone of the heating resistor is l, the maximum outside diameter of the insulating ceramic sintered body including the effective heating zone is D, and the exposed length of the above-mentioned ceramic heater is L, the equation described below can be established.

$$l/L \leq (l/2 \times l/D) - 5$$

where l/L and l/D represent percent values.

$$10 \leq l/L < 67$$

$$50 \leq l/D < 178$$

According to the ceramic glow plug of the first invention, the length l of the effective heating zone of the heating resistor made of an inorganic conductive material and embedded in an insulating ceramic sintered body is set to a value ranging between 10 to 67% of the length L of the ceramic heater exposed from the pipe, also ranging between 50 and 178% of the maximum outside diameter D of at least the portion corresponding to the effective heating zone of the insulating ceramic sintered body, and satisfies the equation of $l/L \leq (l/2 \times l/D) - 5$. With these settings, even when the heating zone is heated to high temperatures ranged between 1000° and 1300° C., the temperature of the support pipe can be restricted. As a result, the sealing performance between the ceramic heater and the cylindrical pipe is not deteriorated and the ceramic glow plug can have improved durability.

(Example 2)

In the following description, the ceramic glow plug of the first invention will be explained referring to the attached drawings.

Figure 6:
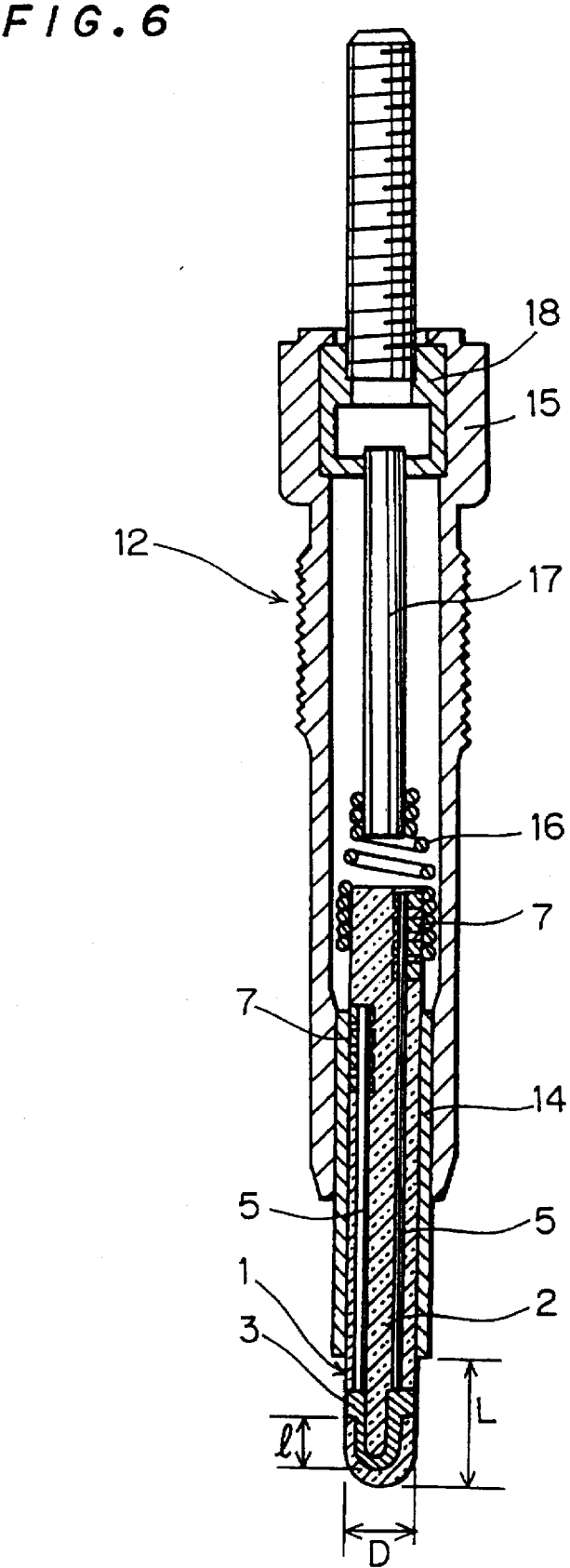
FIG. 6 is a horizontal longitudinal sectional view showing an example of a ceramic glow plug of the first invention.
Figure 7:
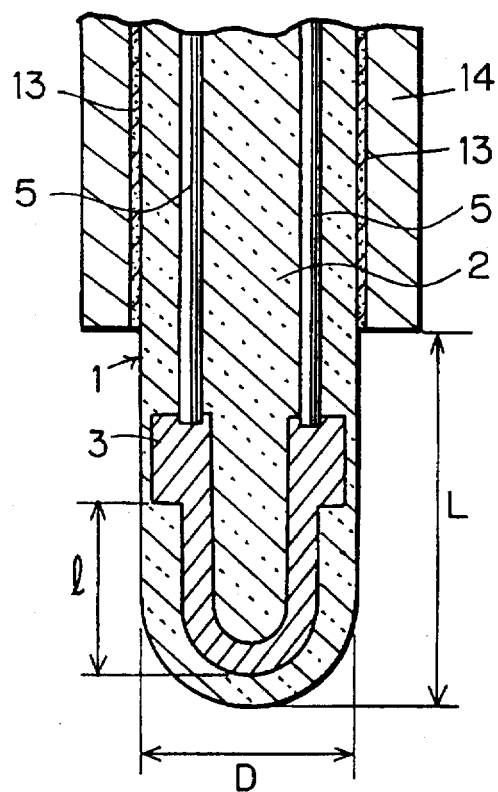
FIG. 7 is an enlarged view showing the main section of the ceramic glow plug shown in FIG. 6.

FIG. 6 shows an example of the ceramic glow plug of the first invention and is a horizontal longitudinal sectional view wherein the glow plug is cross-sectioned on a horizontal plane including an upper heating resistor layer 3, a lead 5 and an electrode 7. FIG. 7 is an enlarged view of the main section of the ceramic glow plug shown in FIG. 6.

Referring to FIGS. 6 and 7, members corresponding to numerals 3, 5 and 7 are explained hereafter. However, since the structures of the members represented by numerals 4, 6 and 8 are completely the same as those of the members 3, 5 and 7, they are not shown but just indicated by the corresponding numerals parenthesized (this method is also applied to the second and subsequent inventions).

The ceramic glow plug of the first invention includes a holder 15 electrically connected to a ceramic heater 1 by means of a cylindrical support pipe 14 secured by a brazing material 13. The ceramic heater 1, comprising heating resistors 3 (4), leads 5 (6) formed from high-melting point metal wires and connected to each end of the heating resistors 3 (4) and a plurality of layers of electrodes 7 (8) made of an inorganic conductive material, is embedded in an insulating ceramic sintered body 2.

In other words, the cylindrical support pipe 14 is fit on the above-mentioned ceramic heater 1, used as one electrode terminal and further connected to a holder 15 which is eventually used as the negative electrode. An electrode 16 is connected to the trailing end of the ceramic heater 1, used as the other electrode terminal, and further connected to a terminal rod 17 which is eventually used as the positive electrode. An insulating washer 18 made of bakelite or the like is fit on the terminal rod 17 and the trailing end of the holder 15 is crimped and fastened to insulate the holder 15, the negative electrode, from the terminal rod 17, the positive electrode. The tip of the insulating ceramic sintered body is made to have a nearly spherical surface. The cross section of at least the area embedded with the heating resistor 3 (4) is made circular. The ceramic glow plug 12 of the first invention is thus structured as described above.

In the ceramic glow plug 12 of the first invention, when l/L is equal to a value calculated by $(l/2 \times l/D) - 5$ according to the equation of $l/L \leq (l/2 \times l/D) - 5$ or when it is more than 67% or when l/D is less than 50%, the cylindrical pipe is heated to 950° C. or more by heat conduction, causing the danger of deteriorating the sealing performance or causing breakdown in a short time.

If the value of l/L is less than 10%, a predetermined temperature is not reached in a predetermined period, thereby causing the danger of deteriorating the quick heating function of the ceramic heater or easily damaging the ceramic heater at the setting of it in a cylinder head. On the other hand, if the value of l/D is more than 178%, it is difficult to raise the heater temperature in the range of 1,000° to 1300° C. when a predetermined voltage is applied.

Accordingly, the ceramic glow plug 12 of the first invention should satisfy the equation of $l/L \leq (l/2 \times l/D) - 5$. The value of l/L should be in the range of 10 to 67%, more preferably in the range of 22 to 56%, and the value of l/D should be in the range of 50 to 178%, more preferably in the range of 89 to 148%.

To evaluate the ceramic glow plug of the first invention, its samples were prepared by using the previously described production method MS. First, by using granules obtained by mixing 88.4 weight % of high-purity silicon nitride ($Si_3N_4$) powder with yttria ($Y_2O_3$) or an oxide of a rare earth element as a sintering aid, flat ceramic green bodies (9, 10, 11, . . . , shown in FIG. 3) mainly made of silicon nitride was produced by the press forming method or the like.

Next, by using paste prepared by adding solvent to fine powder of 80 weight % of tungsten carbide (WC) and fine powder of 20 weight % of silicon nitride ($SI_3N_4$), a plurality of layers 4 of heating resistor having a thickness of about 40 µm and having a nearly U-shaped pattern with various preset lengths corresponding to the effective heating zone according to the designed resistance values were each formed on the first ceramic green body (to prepare a variety of samples) by the screen printing method or the like so that the effective heating zone was disposed within 5 mm from the tip of the ceramic sintered body. The length of the effective heating zone, however, was set to 1.5 mm or more, since the heating resistor might burn out because of concentrated heat, if the length was less than 1.5 mm.

On the other hand, the electrodes 8 were made as follows. By using paste composed of 85 weight % of powdery tungsten carbide (WC) and 15 weight % of powdery silicon nitride ($Si_3N_4$), a plurality of patterns having a width of 0.7 mm and a thickness of about 70 µm were formed at predetermined positions in parallel opposite to the side where the above-mentioned layer 4 of heating resistor was formed on the ceramic green body 9 and extended to both side surfaces of the ceramic green body 9 in the same way as described above.

Next, leads 6 formed from tungsten (W) wires of 0.25 mm in diameter were placed between the first ceramic green body 9 having the printed heating resistor 4 and the electrodes 8 and the second ceramic green body 10 so that the leads 6 were-connected to the layer 4 of heating resistor and the electrodes 8. Furthermore, the leads 5 formed from the tungsten (W) wires similar to the above-mentioned wires were placed between the second ceramic green body 10 which was formed in the same way as that for the first ceramic green body 9 and the third ceramic green body 11 so that the leads 5 were connected to the layer 3 of heating resistor and the electrodes 7 on the second green body 10. This structure was fired under pressure at 1750° C. for one hour in a reduction atmosphere including carbon (C).

By grinding the circumference of the obtained ceramic sintered body, the tip of the heating resistor was made spheric and its cross section was made circular, and the end surface of each embedded electrode was exposed to the side surface of the cylindrical sintered body. In this way, a plurality of ceramic heaters 1 having a diameter of about 3.4 mm were prepared for evaluation.

A metallic film of nickel (Ni) or the like was formed on at least the exposed portions of the electrodes of the above-mentioned ceramic heater 1 for evaluation by the metalizing or plating method. A plurality of the cylindrical support pipes 14 having different lengths were each fit on the ceramic heater 1 so that the pipes were each connected to the electrodes 8 positioned close to the intermediate portion of the ceramic heater 1. The exposed length L of the ceramic heater 1 was set in the range of 5 to 15 mm. The pipe 14 was joined with the ceramic heater 1 by silver soldering and set to function as the negative electrode.

On the other hand, an electrode 16 formed from a wire or a cap is connected to the electrodes 7, 8 exposed to the end of the above-mentioned ceramic heater 1 by silver soldering in the same way as described above and set to function as the positive electrode. In this way, a plurality of ceramic glow plugs 12 for evaluation provided with the positive and negative electrodes were produced.

By using the ceramic glow plugs for evaluation produced as described above, the temperature distribution on the surface of the ceramic heater 1 exposed from the cylindrical pipe 14 was measured by a noncontacting radiation thermometer. Applied voltage was adjusted so that the maximum heating temperature is 1400° C. and the temperature at the tip of the cylindrical support pipe 14 was measured by a thermocouple while the temperature of 1400° C. was maintained.

Additionally, 20,000 cycles of a high-load durability test was conducted, each cycle consisting of a quick heating period in which the ceramic heater was quickly heated up to 1400° C. by applying a DC voltage of 14 V for 1 minute and a forcibly cooling period in which power supply was stopped and compressed air was blown to the heater. After the high-load durability test, an air leak test was conducted by dipping the ceramic glow plug 12 into water while an air pressure of 15 atmospheres was applied to check for air leak and to evaluate the sealing performance between the ceramic heater 1 and the cylindrical support pipe 14.

The maximum outside diameter D of the insulating ceramic sintered body corresponding to the effective heating zone and the exposed length l of the ceramic heater projected from the end surface of the joining material used to secure the cylindrical support pipe 14 were measured at least at three positions by using a micrometer. When the end surface of the joining material is inside the tip of the cylindrical support pipe 14 in the case of X-ray photographing, the distances from the end surfaces were measured and the average value of them was calculated.

Moreover, on the basis of the results of the above-mentioned X-ray photographing and the temperature distribution measurements, the lengths l of the effective heating zones of the layers 3, 4 of heating resistor were obtained. By using these values, the ratio l/D of the effective heating length l to the maximum outside diameter D and the ratio l/L of the length of the effective heating zone to the exposed length L of the ceramic heater 1 were calculated.

The results of the above calibrations are shown in Tables 3 and 4.

TABLE 3

| Sample No. | Length of Effective Heating Zone Maximum Outside Diameter l/D (%) | Length of Effective Heating Zone Exposed Length l/L (%) | Temperature at Tip of Metallic Piper (°C.) | Leak Test Leak Generation | Remarks |
|---|---|---|---|---|---|
| *1 | 44 | 17 | 800 | — | Breakdown at 8,300 cycles |
| *2 | 50 | 8 | 250 | Not leaked | Insufficient quick heating |
| 3 | " | 10 | 300 | " | |
| 4 | " | 20 | 850 | " | |
| *5 | " | 22 | 980 | Leaked | |
| *6 | 59 | 8 | 200 | Not leaked | Insufficient quick heating |

TABLE 3-continued

| Sample No. | Length of Effective Heating Zone Maximum Outside Diameter l/D (%) | Length of Effective Heating Zone Exposed Length l/L (%) | Temperature at Tip of Metallic Piper (°C.) | Leak Test Leak Generation | Remarks |
|---|---|---|---|---|---|
| 7 | " | 10 | 250 | " | |
| 8 | " | 20 | 730 | " | |
| 9 | " | 22 | 800 | " | |
| *10 | " | 25 | 990 | " | |
| *11 | 89 | 9 | 150 | Not leaked | Insufficient strength |
| 12 | " | 10 | " | " | |
| 13 | " | 20 | 550 | " | |
| 14 | " | 22 | 590 | " | |
| 15 | " | 25 | 650 | " | |
| 16 | " | 30 | 750 | " | |
| 17 | " | 32 | 810 | " | |
| *18 | " | 42 | 1000 | Leaked | |
| *19 | 104 | 8 | 125 | Not leaked | Insufficient strength |
| 20 | " | 10 | 130 | " | |
| 21 | " | 20 | 500 | " | |
| 22 | " | 25 | 530 | " | |
| 23 | " | 30 | 590 | " | |
| 24 | " | 35 | 670 | " | |
| 25 | " | 42 | 930 | " | |
| *26 | " | 48 | 1110 | Leaked | |
| *27 | 124 | 8 | 95 | Not leaked | Insufficient strength |
| 28 | " | 10 | 100 | " | |
| 29 | " | 25 | 285 | " | |
| 30 | " | 30 | 510 | " | |
| 31 | " | 33 | 600 | " | |
| 32 | " | 37 | 640 | " | |
| 33 | " | 42 | 700 | " | |
| 34 | " | 46 | 780 | " | |
| 35 | " | 57 | 900 | " | |
| *36 | " | 60 | 1005 | Leaked | |

Note:
Samples identified by sample numbers marked * are not included in the claims of the first invention.

TABLE 4

| Sample No. | Length of Effective Heating Zone Maximum Outside Diameter l/D (%) | Length of Effective Heating Zone Exposed Length l/L (%) | Temperature at Tip of Metallic Pipe (°C.) | Leak Test Leak Generation | Remarks |
|---|---|---|---|---|---|
| *37 | 136 | 8 | 55 | Not leaked | Insufficient strength |
| 38 | " | 10 | 100 | " | |
| 39 | " | 25 | 310 | " | |
| 40 | " | 35 | 560 | " | |
| 41 | " | 42 | 750 | " | |
| 42 | " | 55 | 850 | " | |
| 43 | " | 60 | 905 | " | |
| *44 | " | 67 | 970 | Leaked | |
| *45 | 148 | 8 | 50 | Not leaked | Insufficient strength |
| 46 | " | 10 | 95 | " | |
| 47 | " | 30 | 430 | " | |
| 48 | " | 35 | 600 | " | |
| 49 | " | 37 | 650 | " | |
| 50 | " | 42 | " | " | |
| 51 | " | 56 | 850 | " | |
| 52 | " | 67 | 905 | " | |
| *53 | " | 70 | 955 | Leaked | |
| *54 | 171 | 9 | 50 | Not leaked | Insufficient strength |
| 55 | " | 10 | " | " | |
| 56 | " | 48 | 650 | " | |
| 57 | " | 60 | 850 | " | |
| 58 | " | 67 | 900 | " | |
| *59 | " | 70 | 950 | Leaked | |
| *60 | 178 | 8 | 50 | Not leaked | Insufficient strength |
| 61 | " | 10 | " | " | |
| 62 | " | 20 | 150 | " | |
| 63 | " | 46 | 650 | " | |
| 64 | " | 60 | 850 | " | |
| 65 | " | 67 | 900 | " | |

TABLE 4-continued

| Sample No. | Length of Effective Heating Zone Maximum Outside Diameter l/D (%) | Length of Effective Heating Zone Exposed Length l/L (%) | Temperature at Tip of Metallic Pipe (°C.) | Leak Test Leak Generation | Remarks |
|---|---|---|---|---|---|
| *66 | " | 70 | 950 | Leaked | |
| *67 | 197 | 33 | 280 | Not leaked | Predetermined temperature not reached |

Note
(1) Samples identified by sample numbers marked * are not included in the claims of the first invention.
(2) "Insufficient strength" in the table is used to designated samples, each cantilever breaking force of which is not more than 13 kg.

Figure 9:
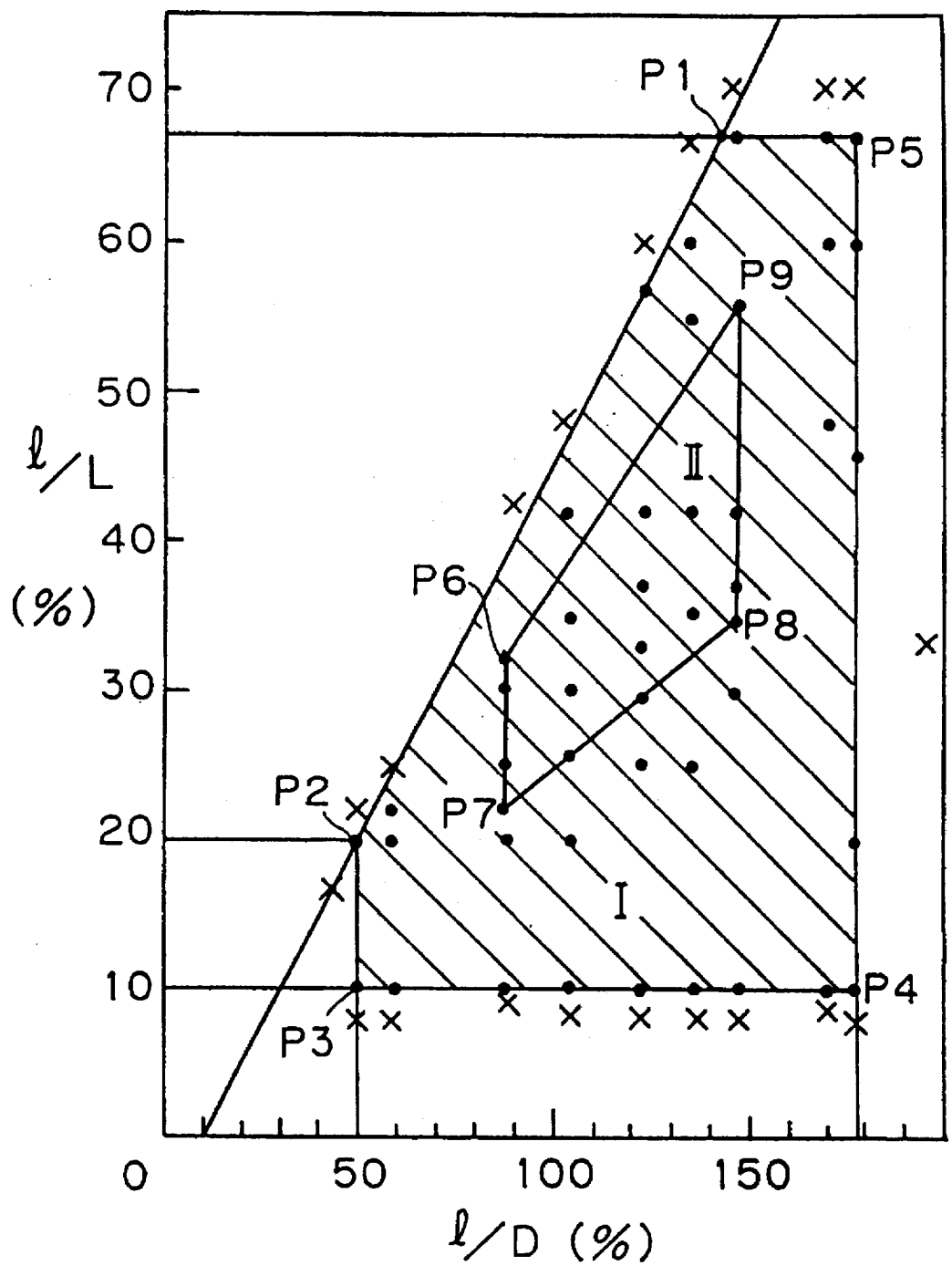
FIG. 9 is a diagram showing the relationship between the ratio of the maximum outside diameter D to the length l of the effective heating zone and the ratio of exposed length L to the length l of the effective heating zone.

According to the results shown in Tables 3 and 4, FIG. 9 shows the relationship between the ratio of the length l to the maximum outside diameter D of the effective heating zone and the ratio of the length l to the exposed length L of the effective heating zone. The points plotted according to the ratio values included in the claims of the first invention are represented by ● and those plotted according to the ratio values not included in the claims are represented by X. The area enclosed by the points plotted according to the ratio values included in the claims of the first invention is shown by shaded area I, a larger area. A more preferable area is shown by shaded area II, a smaller area.

The attached table below shows the data for points P1 to P9 in the shaded area I.

(Attached table)

| | Point | | | | | | | | |
|---|---|---|---|---|---|---|---|---|---|
| Ratio | P1 | P2 | P3 | P4 | P5 | P6 | P7 | P8 | P9 |
| l/D | 145 | 50 | 50 | 178 | 178 | 89 | 89 | 148 | 148 |
| l/L | 67 | 20 | 10 | 10 | 67 | 32 | 22 | 35 | 56 |

The best mode area is the shaded area II enclosed by the lines connecting points P6, P7, P8 and P9.

However, the first invention is not limited to the above-mentioned example. Ceramic heaters for evaluation comprising an insulating ceramic sintered body including at least an effective heating zone and having the maximum diameter of 3 to 5 mm for example can deliver the same effect as that obtained by the above-mentioned example in the same operation conditions.

According to the above-mentioned results, in the ceramic glow plug of the first invention, the length l of the effective heating zone of the heating resistor made of an inorganic conductive material and embedded in an insulating ceramic sintered body is set in the range of 50 to 178% of the maximum outside diameter D of at least the effective heating zone of the insulating ceramic sintered body, and the length l is also set in the range of 10 to 67% of the length L of the ceramic heater exposed from the pipe. The length l also satisfies the equation of l/L≦(1/2×l/D)−5. The ceramic glow plug can, therefore, maintain superior sealing performance between the ceramic sintered body and the cylindrical pipe even when it is heated to high temperatures in the range of 1000° to 1300° C. Consequently, it has been proven that the ceramic heater has an excellent quick heating function and high strength and can operate repeatedly for a long time, thereby ensuring superior durability.

The second invention is intended to solve the following problems of the genus invention.

Figure 12:
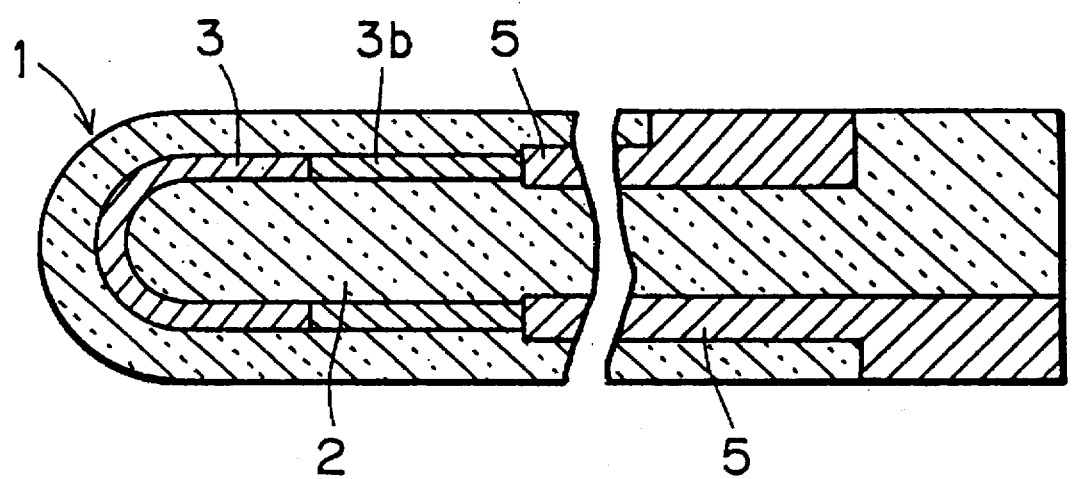
FIG. 12 is a horizontal longitudinal sectional view showing the main section of a conventional ceramic heater.

A conventional ceramic heater 1 (refer to Japanese Laid-open Patent Publication No. 4-268112) has been proposed as shown in FIG. 12, wherein heating resistors 3, 3b made of two kinds of conductive ceramic materials mainly composed of high-melting point metals or their compounds are formed on a ceramic sintered body 2, and on the heating resistors and the ceramic sintered body 2, another sintered body is laminated and fired into one body.

However, since the heating resistors 3, 3b of the above-mentioned ceramic heater 1 are made of conductive ceramic materials, the resistance values of the heating resistors are generally high. When the ceramic heater is used for a glow plug of a diesel engine, the entire resistance of the heating resistor 3b is required to be decreased to adequately set the ratio of resistance values of leads 5 and the heating resistor 3b because of a low working voltage of 10 to 35 V of such a diesel engine. Increasing the thickness of the film of the heating resistor 3b is considered as one of the measures to be taken. If the film thickness is increased, however, cracks are apt to occur in the heating resistor 3b because of the difference in thermal expansion during firing, thereby limiting the film thickness. As a result, the leads 5 are heated and cause an increase in the resistance of the heating resistor 3b and disconnection to electrodes, thereby being in danger of deteriorating durability. In addition, the entire length of the ceramic heater becomes larger and is in danger of causing a problem in strength.

The second invention has been developed to eliminate the above-mentioned defects. The purpose of the second invention is to provide a ceramic heater having a simple structure, capable of operating for a long time and superior in durability, without generating heat at the connections of the heating resistors made of an inorganic conductive material and the lead wires and without causing breakdown due to an increase in the resistance of the layer of heating resistor at the connections.

The ceramic heater of the second invention comprises lead wires made of a high-melting point metal and connected to the ends of first layers of heating resistor by means of second layers of heating resistor made of an inorganic conductive material by at least partially laminating the second layers of heating resistor on the first layers of heating resistor, and electrodes made of an inorganic conductive material and connected to the other ends of the lead wires, the lead wires and the electrodes being embedded in a sintered body.

In the ceramic heater of the second invention, the second layers of heating resistor made of an inorganic conductive material are at least partially laminated on the ends of the first layers of heating resistor composed of at least two nearly parallel layers made of an inorganic conductive material and formed by the printing method or the like. The first layers of heating resistor are connected to the lead wires made of a high-melting point metal by means of the second layers of heating resistor. With this structure, even when the first layers of heating resistor are heated to the high temperature range of 1000° to 1300° C., the second layers of heating resistor are only heated not more than 1000° C. because of the low resistance thereof. The portions connected to the lead wires are, therefore, not in danger of being exposed to high temperatures which may cause an increase in resistance, but can have an appropriate self-saturation temperature function without deteriorating quick heating performance, thereby improving the durability and reliability during continuous operation for a long time.

(Example 3)

Figure 10:
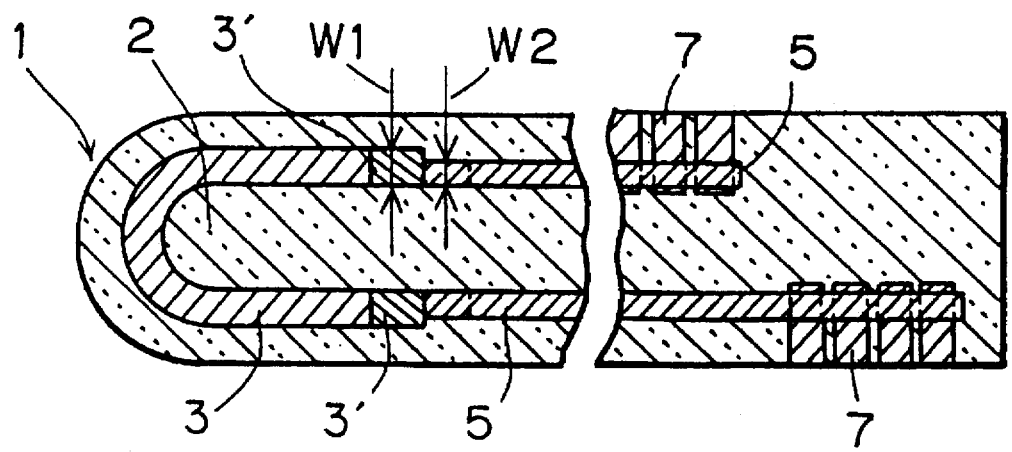
FIG. 10 is a horizontal longitudinal sectional view showing the main section of a ceramic heater of the second invention.

An example of the ceramic heater of the second invention will be explained below referring to the attached drawings. FIG. 10 is a horizontal longitudinal sectional view showing the main section of the ceramic heater of the second invention and FIG. 11 is a vertical longitudinal sectional view showing the main section of the ceramic heater of the second invention.

Figure 11:
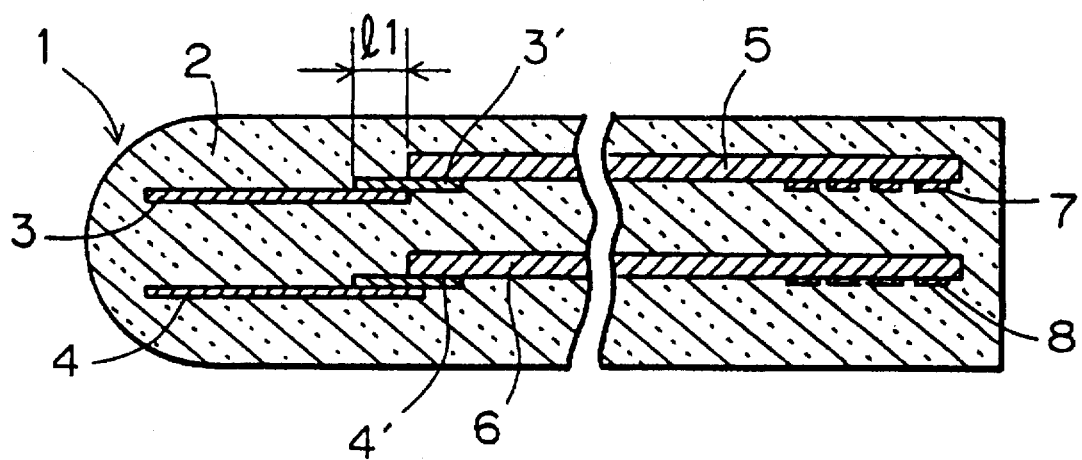
FIG. 11 is a vertical longitudinal sectional view showing the main section of the ceramic heater of the second invention.

Referring to FIGS. 10 and 11, numeral 1 represents a ceramic heater comprising first the layers 3, 4 of heating resistor composed of two nearly-parallel, generally U-shaped layers made of an inorganic conductive material, second layers 3', 4' of heating resistor at least partially laminated on the ends of the first layers 3, 4 of heating resistor, lead wires 5, 6 formed from a high-melting point metal material and connected to the ends of the first layers 3, 4 of heating resistor by means of the second layers 3', 4' of heating resistor, and electrodes 7, 8 made of an inorganic conductive material, divided into a plurality of pieces and connected to the lead wires 5, 6, all these components of the ceramic heater 1 being embedded in an insulating ceramic sintered body 2. The electrodes 7, 8 are partially exposed on the outer circumference surface of the insulating ceramic sintered body 2 and the tip of the sintered body 2 is made generally spheric and the cross section thereof is made circular.

Width W2 of the second layers 3', 4' of heating resistor made of an inorganic conductive material and connected to the lead wires 5, 6 should preferably be smaller than at least width W1 of the portions of the first layers 3, 4 of heating resistor on which the second layers 3', 4' of heating resistor are laminated. Width W2 should more preferably be in the range of about 25 to 90% of width W1 of the first layers of heating resistor.

The resistance values of the inorganic conductive materials for the second layers 3', 4' of heating resistor and the electrodes 7, 8 are required to be lower than those of the first layers 3, 4 of heating resistor.

When the insulating ceramic sintered body 2 is mainly composed of silicon nitride ($Si_3N_4$), like the first layers 3, 4 of heating resistor and the electrodes 7, 8, the second layers 3', 4' of heating resistor should preferably be composed of silicon nitride ($Si_3N_4$) powder, a main component of the ceramic sintered body 2, and added with tungsten carbide (WC) as a main component of the layers, or further added with boron nitride (BN) powder to adjust the thermal expansion coefficient thereof so that the resistance values thereof are set as desired by adjusting the amounts of the components.

Materials containing, for example, not less than 65 weight % of tungsten carbide (WC), are used for the above-mentioned first layers 3, 4 of heating resistor, the second layers 3', 4' of heating resistor and the electrodes 7, 8. Desirable resistance ratios can be set by using a material containing 70 to 90 weight % of tungsten carbide (WC) for the first layers 3, 4 of heating resistor, a material containing 80 to 95 weight % of tungsten carbide (WC) for the second layers 3', 4' of heating resistor and a material containing 85 to 95 weight % of tungsten carbide (WC) for the electrodes 7, 8.

The tip of the ceramic heater 1 is made generally spheric and the cross section thereof is made circular so that the maximum heating zone is located near the tip and the outer circumference is heated effectively and uniformly. The tip and the cross section of the ceramic heater 1 are not limited to these shapes.

The joining distance 11 of the second layers of heating resistor, that is, the distance from the tips of the second layers 3', 4' of heating resistor partially laminated on the first layers 3, 4 of heating resistor to the tips of the lead wires 5, 6 connected to the second layers 3', 4' of heating resistor should preferably be set 3 mm or more, since the resistance values at the joining portion hardly change because of the distance setting, provided that the temperature at the tips of the leads are not more than 1000° C.

Before evaluating the ceramic heater of the second invention, in the same way as the production method MS described already, flat ceramic green bodies (corresponding to numerals 9, 10 and 11 in FIG. 3) mainly composed of silicon nitride were first made by a known molding method, such as the press molding method by using granules prepared by adding and mixing yttria ($Y_2O_3$) or an oxide of a rare-earth element as a sintering aid with high-purity silicon nitride ($Si_3N_4$) powder.

Next, solvent was added to the mixture of 80 weight % of powdery tungsten carbide (WC) and 20 weight % of powdery silicon nitride ($Si_3N_4$) to prepare paste. By using the paste, the first layers 3 and 4 of heating resistor having a thickness of about 40 μm were formed on the surfaces of two different ceramic green bodies by the screen printing method or the like so that the resistor layers had generally U-shaped patterns having dimensions determined on the basis of designed resistance values and the tip of each pattern was placed within 5 mm from the tip of the ceramic sintered body.

Then, by using paste made of 85 weight % of powdery tungsten carbide (WC) and 15 weight % of powdery silicon nitride ($Si_3N_4$), the second layers 3', 4' of heating resistor having a thickness of about 40 um were formed in the same way as described above at the ends of the above-mentioned first layers 3, 4 of heating resistor so that width W2 of the second layers of heating resistor partially laminated on the first layers of heating resistor was smaller than width W1 of the first layers of heating resistor.

On the other hand, by using the paste having the same composition as that of the second layers 3', 4' of heating resistor, the electrodes 7, 8 composed of four patterns having a width of 0.7 mm and a thickness of 70 μm were formed in parallel on the other ends of the surfaces of the above-mentioned ceramic green bodies at predetermined positions and extended to the side surfaces of the ceramic green bodies.

On each ceramic green body on which the first layers 3, 4 of heating resistor, the second layers 3', 4' of heating resistor and the electrodes 7, 8 were printed, tungsten (W) wires of 0.25 mm in diameter were placed on and connected to the second layers of heating resistor and the electrodes. On the wires, a ceramic green body with no layers of heating resistor and electrodes printed was laminated, then this structure was fired under pressure at 1750° C. for one hour in a reduction atmosphere including carbon (C).

By grinding the circumference of the ceramic sintered body obtained as described above, the tip of the ceramic heater on the first layer side of the heating resistor was made spheric and its cross section was made circular, and the end surface of each embedded electrode was exposed to the side surface of the cylindrical sintered body. In this way, a plurality of ceramic heaters 1 having a diameter of about 3.5 mm were prepared.

A metallic film of nickel (Ni) or the like was formed on at least the exposed portions of the electrodes of the above-mentioned ceramic heater by the metalizing or plating method. A cylindrical pipe (corresponding to numeral 14 in FIG. 6) was fit on the ceramic heater so that the pipe was connected to one of the electrodes exposed to the side surface of the ceramic heater. The pipe was joined with the electrode by silver soldering in an atmosphere of reducing gas and set to function as the negative electrode. Furthermore, an electrode (corresponding to numeral 16 in FIG. 6) formed from a wire or a cap was connected to and joined with the other electrodes by silver soldering in the same way as described above and set to function as the positive electrode. In this way, a plurality of ceramic heaters 1 with the positive and negative electrodes were prepared for evaluation.

Moreover, the above-mentioned ceramic heater for evaluation was subjected to many cycles of a high-load durability test wherein each cycle consisted of a heating period in which the ceramic heater 1 was heated up to a saturation temperature of 1400° C. by applying a DC voltage of 10 to 35 V for 5 minutes and a forcibly cooling period in which electric power supply was stopped and compressed air was blown to the ceramic heater for 2 minutes. The increase in the resistance value across the two electrodes was measured every 1,000 cycles. A plurality of samples were subjected to the test and those caused increases in resistance not less than 10% were judged to be improper. The number of cycles wherein an increase in resistance exceeded 10% was used for evaluation.

The width W2 of the second layers 3', 4' of heating resistor made of an inorganic material and connected to the lead wires 5, 6 and the width W1 of the first layers 3, 4 of heating resistor partially laminated with the second layers of heating resistor were measured by X-ray photographing. In addition, other ceramic heaters prepared for evaluation and having the same specifications as those of the ceramic heaters described above were cut off at the connections of the lead wires and the second layers of heating resistor and at the lamination portions of the first and second layers of heating resistor, and then the dimensions of the widths W1 and W2 were measured for confirmation.

Additionally, the distance from the tips of the second layers 3', 4' of heating resistor partially laminated on the first layers 3, 4 of heating resistor, to the leading ends of the lead wires 5, 6 connected to the second layers 3', 4' of heating resistor was measured by X-ray photographing and represented by distance 11 for the second layers 3', 4' of heating resistor. When the temperature of the maximum heating zone reached 1400° C., the temperature at the ceramic heater surface corresponding to the positions of the tips of the lead wires was measured by a noncontacting radiation thermometer.

The results of the above-mentioned measurements are in Table 5.

TABLE 5

| Sample No. | Width of Layer of Heating Registor (mm) W1 | W2 | Distance 11 (mm) | Durability Test (Cycles) | Ceramic Heater Surface Temperature (°C.) |
|---|---|---|---|---|---|
| 1 | 0.75 | 0.35 | 0 | 2000 | 1210 |
| 2 | " | " | 2 | 14000 | 1100 |
| 3 | " | " | 3 | 20000 | 1000 |
| 4 | " | " | 4 | 35000 | 900 |
| 5 | " | " | 7 | 38000 | 750 |
| 6 | " | " | 10 | 40000 | 620 |
| 7 | " | 0.75 | 3 | 18000 | 980 |
| 8 | " | " | 4 | 25000 | 880 |
| 9 | " | " | 7 | 30000 | 750 |
| 10 | " | 1.00 | 4 | 15000 | 920 |
| 11 | 0.30 | 0.15 | " | 30000 | 910 |
| 12 | " | 0.20 | " | 32000 | 900 |
| 13 | " | 0.25 | " | 29000 | 910 |
| 14 | 0.50 | " | " | 35000 | 900 |
| 15 | " | 0.30 | " | 32000 | 905 |
| 16 | " | 0.45 | " | 38000 | 895 |
| 17 | 1.00 | 0.30 | " | 35000 | 905 |
| 18 | " | 0.50 | " | 34000 | 895 |
| 19 | " | 0.75 | " | 38000 | 900 |
| 20 | 1.25 | 0.30 | " | 34000 | 910 |
| 21 | " | 0.50 | " | 35000 | 905 |
| 22 | " | 0.80 | " | 33000 | 895 |
| 23 | 1.50 | 0.30 | " | 38000 | 900 |
| 24 | " | 0.50 | " | 35000 | 905 |
| 25 | " | 0.80 | " | 36000 | 895 |

According to Table 5, when the ratio of W2 to W1 is set in the range of 25 to 90% and distance 11 is set 3 mm or more, the surface temperature of the ceramic heater is not more than 1000° C. It is thus understood that the portion connected to the lead wire is not heated to the extent that the resistance at the connection is increased. This is obvious since the numbers of cycles for all samples at the durability test are not less than 20,000 cycles.

When the first layer of heating resistor composed of a single layer having width W1 of 1.50 mm was directly connected to the lead wire to prepare a comparison sample, the surface temperature of the ceramic heater reached 1320° C., the resistance of this layer of heating resistor changed more quickly than the resistance of the layers of heating resistor of the second invention. Heat generation at the tip of the lead wire was extremely significant. At the durability test, it became clear that the resistance increase ratio of this layer of heating resistor exceeded 10% at 1,090 cycles.

As described above, the ceramic heater of the second invention comprises the first layers of heating resistor composed of at least two nearly-parallel layers made of an inorganic conductive material, the second layers of heating resistor made of an inorganic conductive material and at least partially laminated on the ends of the first layers of heating resistor, and the lead wires formed from a high-melting point metal and connected to the first layers of heating resistor by means of the second layers of heating resistor. With this structure, even when the first layers of heating resistor are heated to high temperatures, the connections of the second layers of heating resistor and the lead wires are not heated so much; the temperatures do not exceed 1000° C. No increase occurs in resistance at the connections of the layers of heating resistor, thereby preventing breakdown. As a result, the ceramic heater is capable of operating continuously for a long time and does not need any complicated structure, thereby ensuring superior durability.

The third invention relates to a ceramic glow plug having been improved in the ways described below.

Figure 16:
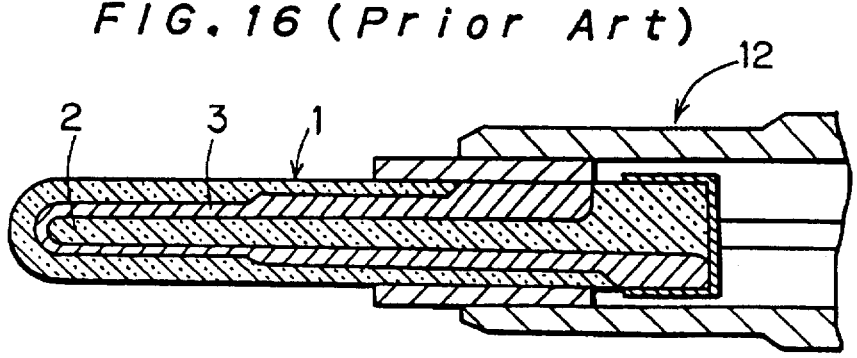
FIG. 16 is a horizontal longitudinal sectional view showing the main section of a self-saturation ceramic glow plug applied to a glow plug of a conventional internal combustion engine.

A conventional ceramic glow plug 12 shown in FIG. 16, wherein a heating resistor 3 made of a conductive ceramic material such as tungsten carbide (WC) is embedded in an insulating ceramic sintered body 2 mainly composed of silicon nitride ($Si_3N_4$) superior in strength and oxidation resistance so that the difference in thermal expansion between the insulating ceramic sintered body 2 and the heating resistor 3 embedded therein and made of a conductive ceramic material is made closer, has been proposed for a preferable ceramic glow plug 12 (refer to Japanese Laid-open Utility Model Publication No. 2-20293).

However, in the above-mentioned ceramic heater 1, since the ceramic material of the insulating ceramic sintered body 2 completely differs in substance from the conductive ceramic material of the heating resistor 3, the conductive ceramic material cannot be sintered sufficiently when fired into one body. If the ceramic heater 1 made in this way is used for a glow plug, mechanical cantilever stress is applied to the ceramic heater 1 when the plug is eventually dropped by inadvertence, or when it is set in an engine or during engine operation. As a result, the ceramic heater 1 is in danger of breaking at low stress corresponding to a cantilever bending strength less than 60 kg/mm$^2$; the breakdown may start from a conductive ceramic portion.

The third invention has been developed to eliminate the above-mentioned defects. The purpose of the third invention is to improve the strength of the ceramic heaters as high as that of the insulating ceramic sintered body by optimizing the design conditions of the insulating ceramic sintered body and the conductive ceramic materials to be embedded in the ceramic sintered body and to provide a ceramic glow plug superior in reliability and durability.

In the ceramic glow plug of the third invention, when the minimum diameter obtained by encircling the heating resistors at the transverse cross section of the ceramic heater is d, the minimum value of the outside diameter or thickness of the ceramic heater is D1, the distance from the tip of the ceramic heater to the end of the heating resistors connected to the lead wires is l2, and the length of the ceramic heater exposed from the support pipe is L, the equation described below can be satisfied.

$$0.06 < d/D1 \times l2/L \leq 0.6$$

where $$0.3 < d/D1 < 0.9$$

$$0.2 < l2/L < 1.0$$

According to the ceramic glow plug of the third invention, by satisfying the above equation, even when the heating resistors are embedded near the central portion closer to the tip of the ceramic heater to prevent the strength of the ceramic heater from deteriorating, a thermal capacity enough to improve the starting of a diesel engine can be obtained even in the low voltage range of 11 to 24 V. The surface of the ceramic heater can thus be heated to a predetermined temperature. Consequently, this invention provides a ceramic glow plug superior in durability and reliability by improving the strength of the ceramic heater while reducing the temperature difference in the circumferential direction of the ceramic heater at temperature saturation and while maintaining the quick heating function.

(Example 4)

An example of the third invention will be detailed below referring to the attached drawings.

Figure 13:
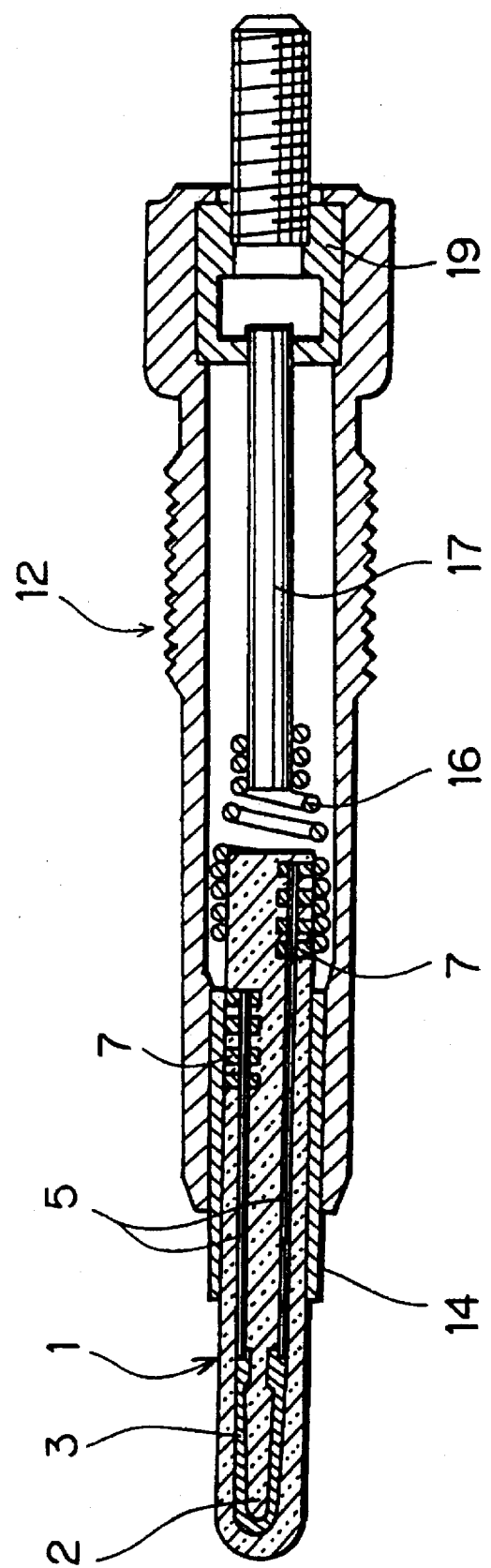
FIG. 13 is a partially cutaway horizontal longitudinal sectional view showing a ceramic glow plug of the third invention.
Figure 14:
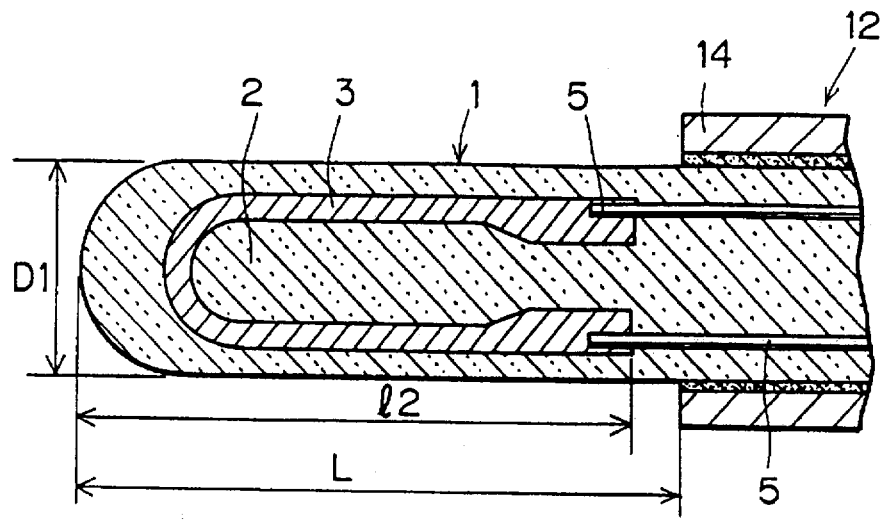
FIG. 14 is an enlarged view showing the main section of the ceramic glow plug shown in FIG. 13.

FIG. 13 is a partially cutaway horizontal longitudinal sectional view showing a ceramic glow plug of the third invention. FIG. 14 is an enlarged view showing the main section of the ceramic glow plug shown in FIG. 13 and FIG. 15 is a transverse sectional view of the ceramic glow plug shown in FIG. 14, including heating resistors.

Figure 15:
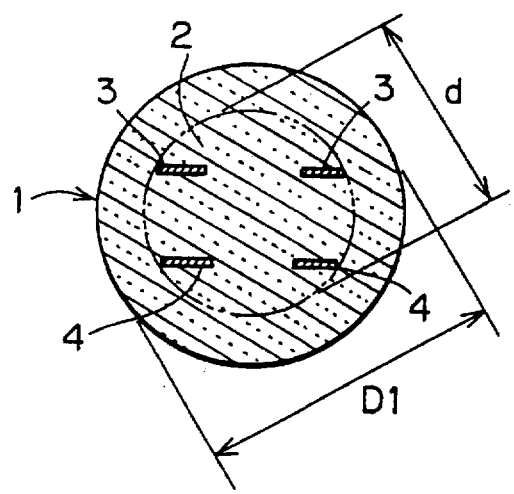
FIG. 15 is a transverse sectional view of the ceramic glow plug shown in FIG. 14, including heating resistors.

Referring to FIGS. 13, 14 and 15, numeral 12 represents a ceramic glow plug wherein a ceramic heater 1 comprises heating resistors 3, 4 made of an inorganic conductive material and lead wires 5 (6) formed from a high-melting point metal material and connected to the ends of the heating resistors 3, 4, the heating resistors and the lead wires being embedded in an insulating ceramic sintered body 2. By brazing, the ceramic heater 1 is Joined with a cylindrical support pipe 14 so that the pipe functions as one of the electrodes. The relationship between the heating resistors 3, 4 and the ceramic heater 1 of the ceramic glow plug satisfies the equation described below.

$$0.06 < d/D1 \times l2/L \leq 0.6$$

where $$0.3 < d/D1 < 0.9$$

$$0.2 < l2/L < 1.0$$

The tip of the insulating ceramic sintered body 2 is made generally spheric and at least the cross section of the insulating ceramic sintered body 2 wherein the heating resistors 3 are embedded, is made circular.

In the above-mentioned ceramic glow plug, when the value of d/D1 is not more than 0.3, the ceramic heater cannot attain a predetermined heating temperature in the low voltage range of 11 to 24 V. When the value of d/D1 is not less than 0.9, the heating resistors cause breakdown during a durability test wherein heating to 1400° C. and cooling are continuously repeated, and the ceramic heater becomes lower in strength and is greatly in danger of being broken when dropped. The value of d/D1 must, therefore, be more than 0.3 and less than 0.9.

Additionally, when the value of l2/L is not more than 0.2, the electric power of the ceramic heater is less than 18 W in the predetermined voltage range of 11 to 24 V, being incapable of generating sufficient thermal capacity and deteriorating the starting of a diesel engine. On the other hand, when the value of l2/L is not less than 1.0, the cylindrical pipe 14 brazed to the ceramic heater is heated to a high temperature and damaged by melting or chipping during the durability test conducted in the above-mentioned high-load conditions as a matter of course and even during actual engine operation. The value of l2/L must, therefore, be more than 0.2 and less than 1.0.

On the basis of the above-mentioned relationship, when the value of d/D1×l2/L is not more than 0.06, the ceramic heater cannot have sufficient thermal capacity at a predetermined voltage. On the other hand, when the value is more than 0.6, the ceramic heater becomes lower in strength and is in danger of being easily broken when handled improperly. The value of $d/D1 \times l2/L$ must, therefore, have a specific value, that is, more than 0.06 and not more than 0.6.

In the above-mentioned ceramic glow plug 12, the ceramic heater 1 comprises the heating resistors 3, 4 made of an inorganic conductive material and the lead wires 5 (6) formed from a high-melting point metal material and electrodes 7 (8) having comb-shaped divided layer pieces connected to the lead wires 5 (6), the heating resistors and the lead wires being embedded simultaneously in an insulating ceramic sintered body 2. An electrode 16 made of a wire or the like is electrically connected from the end of the ceramic heater 1 to a terminal rod 17 to function as the other electrode. The two electrodes are electrically insulated from each other by an insulating material 19.

Before evaluating the ceramic glow plug of the third invention, in the same way as the production method MS described heretofore, flat ceramic green bodies (corresponding to numerals 9, 10 and 11 in FIG. 3) mainly composed of silicon nitride were first made by a known molding method, such as the press molding method, by using granules prepared by adding and mixing ytterbium oxide ($Yb_2O_3$) or an oxide of a rare-earth element as a sintering aid with high-purity silicon nitride ($Si_3N_4$) powder.

Next, solvent was added to a specified mixture of powdery tungsten carbide (WC) and powdery silicon nitride ($Si_3N_4$) to prepare paste. By using the paste, heating resistors were formed on the surfaces of ceramic green bodies by the screen printing method or the like so that the layers of resistor had generally U-shaped patterns having various dimensions determined on the basis of designed resistance values and the tip of each pattern was placed within 5 mm from the tip of the ceramic sintered body.

On the other hand, by using paste made of powdery tungsten carbide (WC) and powdery silicon nitride ($Si_3N_4$), four patterns of the electrodes having a width of about 0.7 mm and a thickness of about 70 μm were formed in the same way as described above on the surfaces at the ends opposite to the heating resistors of the above-mentioned ceramic green body.

Further, boron nitride (BN) can be added as necessary to the paste used for the above-mentioned heating resistors and the electrodes to adjust the thermal expansion of the paste with that of the insulating ceramic sintered body.

Next, lead wires formed from tungsten (W) wires of 0.25 mm in diameter were placed between a first ceramic green body and a second ceramic green body, both having heating resistors and electrodes printed on the surface thereof so that the lead wires were connected to the heating resistors and the electrodes. Furthermore, lead wires formed from the tungsten (W) wires similar to the above-mentioned wires were placed between the second ceramic green body and a third ceramic green body with no heating resistors and electrodes printed. This structure was fired under pressure at 1750° C. for one hour in a reduction atmosphere including carbon (C).

By grinding the circumference of the obtained ceramic sintered body, the tip of the heating resistor side was made spheric and its cross section was made circular, and the end surface of each embedded electrode was exposed to the side surface of the cylindrical sintered body. In this way, a plurality of ceramic heaters having a diameter of about 3.5 mm were prepared.

A metallic film of nickel (Ni) or the like was formed on at least the exposed portions of the electrodes of the ceramic heater by the metalizing or plating method. A cylindrical support pipe was fit on the ceramic heater so that the pipe was connected to one of the electrodes exposed to the side surface of the ceramic heater. The pipe was joined with the electrode by silver soldering in a reduction atmosphere so that the length L of the ceramic heater exposed from the support pipe is in the range of 8 to 15 mm and the support pipe functions as the negative electrode. Furthermore, an electrode formed from a wire or a cap was connected to and joined with the other electrode by silver soldering in the same way as described above to function as the positive electrode. In this way, a plurality of ceramic glow plugs with the positive and negative electrodes were prepared for evaluation.

The ceramic glow plugs for evaluation were heated by applying a DC voltage of 11 to 24 V. Samples reached 1000° C. or more at the maximum heating zones thereof were represented by O and those not reached the temperature were represented by X to evaluate the quick heating functions of the samples.

In addition, a DC voltage was applied to the above-mentioned ceramic glow plugs for 60 seconds to heat them up to 1150° C. and their electric power consumption values were measured.

Next, the ceramic heater of the above-mentioned ceramic glow plug was subjected to 15,000 cycles of a high-load durability test wherein each cycle consisted of a heating period in which the ceramic heater was heated up to a saturation temperature of 1400° C. by applying a DC voltage of 11 to 24 V for 5 minutes and a forcibly cooling period in which electric power supply was stopped and compressed air was blown to the ceramic heater for 2 minutes. The increase in the resistance values of the ceramic glow plug before and after the test was measured. A plurality of samples were subjected to the test to evaluate their durability. Those caused increases in resistance not less than 10% were judged to be improper and represented by X. Those caused increases in resistance less than 10% were judged to be proper and represented by 0.

On the other hand, after the ceramic heater was heated up to a saturation temperature of 1400° C. by applying a DC voltage, the surface temperature at the tip of the cylindrical support pipe was measured by a noncontacting radiation thermometer.

Furthermore, the support pipe of the above-mentioned ceramic glow plug was held and a load was applied to the tip of the exposed ceramic heater at room temperature to obtain the breakdown strength thereof and to calculate the cantilever bending strength thereof. After observing the broken surfaces, samples which began to break at the heating resistors were judged to be improper and represented by X, and samples which began to break at portions other than the heating resistors were judged to be proper and represented by 0.

Moreover, a plurality of sets of three ceramic glow plug samples with a cantilever bending strength of less than 60 kg/mm$^2$ and having the same specifications were dropped to a concrete surface with the ceramic heater thereof directed downward from a height of about 1 m, it was confirmed that at least one of three samples in each set was broken.

The d/D1 and l2/L values were measured after cutting off each ceramic heater at the transverse cross section thereof, and the values were also measured by X-ray photographing to confirm the design values.

The results of the above evaluation are shown in Tables 6 and 7.

TABLE 6

| Sample No. | d/D1 | l2/L | d/D1 × l2/L | Temperature Rising Characteristics | Electric Power Consumption (W) | Remarks |
|---|---|---|---|---|---|---|
| *1 | 0.28 | 0.75 | 0.21 | X | 35 | |
| 2 | 0.32 | " | 0.24 | O | 36 | |
| 3 | 0.46 | " | 0.35 | O | 39 | |
| 4 | 0.63 | " | 0.47 | O | 38 | |
| 5 | 0.80 | " | 0.60 | O | 37 | |
| *6 | 0.89 | " | 0.67 | O | " | |
| *7 | 0.91 | " | 0.68 | O | " | |
| *8 | 0.63 | 0.19 | 0.12 | O | 17 | Improper starting of diesel engine |
| 9 | " | 0.21 | 0.13 | O | 23 | |
| 10 | " | 0.48 | 0.30 | O | 25 | |
| 11 | " | 0.63 | 0.40 | O | 30 | |
| 12 | " | 0.88 | 0.55 | O | 35 | |
| 13 | " | 0.94 | 0.59 | O | 40 | |
| *14 | " | 1.13 | 0.71 | O | 45 | |
| *15 | " | 0.13 | 0.08 | O | 15 | Improper starting of diesel engine |
| 16 | " | 0.27 | 0.17 | O | 24 | |
| 17 | " | 0.33 | 0.21 | O | 33 | |
| 18 | " | 0.67 | 0.42 | O | 48 | |
| 19 | " | 0.87 | 0.55 | O | 53 | |
| 20 | " | 0.93 | 0.59 | O | 54 | |
| *21 | " | 1.00 | 0.63 | O | 55 | |
| 22 | 0.31 | 0.21 | 0.07 | O | 24 | |
| 23 | " | 0.94 | 0.29 | O | 25 | |
| 24 | 0.89 | 0.21 | 0.19 | O | 40 | |
| 25 | " | 0.67 | 0.60 | O | 41 | |

Note:
Samples identified by sample numbers marked * are not included in the claims of the third invention.

TABLE 7

| Sample No. | Metallic Durability Test | Piper Temperature (°C.) | Cantilever Bending Strength (Kg/mm²) | Breakage Starting Point | Remarks |
|---|---|---|---|---|---|
| *1 | — | 500 | 75 | O | |
| 2 | O | " | 72 | O | |
| 3 | O | " | 68 | O | |
| 4 | O | 490 | 75 | O | |
| 5 | O | 520 | 70 | O | |
| *6 | O | 495 | 60 | X | |
| *7 | X | 500 | 45 | X | Breakdown at 1,000 cycles |
| *8 | O | 415 | 73 | O | |
| 9 | O | 430 | 70 | O | |
| 10 | O | 420 | 68 | O | |
| 11 | O | 500 | 70 | O | |
| 12 | O | 590 | 65 | O | |
| 13 | O | 650 | 63 | O | |
| *14 | O | 750 | 48 | X | |
| *15 | O | 350 | 80 | O | |
| 16 | O | 408 | 78 | O | |
| 17 | O | 400 | 75 | O | |
| 18 | O | 520 | 68 | O | |
| 19 | O | 600 | 63 | O | |
| 20 | O | 630 | 62 | O | |
| *21 | O | 700 | 49 | X | |
| 22 | O | 440 | 78 | O | |
| 23 | O | 650 | 73 | O | |
| 24 | O | 420 | 70 | O | |
| 25 | O | 510 | 75 | O | |

Note:
Sample identified by sample numbers marked * are not included in the claims of the third invention.

As clearly shown in Table 6, the samples other than those corresponding to the example of the third invention are improper in one of the evaluation points: quick heating function, diesel engine starting performance and breakdown starting point (including breakdown). Contrary to such samples, the samples corresponding to the example of the third invention are proper in all the evaluation points.

As described above, according to the ceramic glow plug of the third invention, when the minimum diameter obtained by encircling the heating resistors at the transverse cross section of the ceramic heater is d, the minimum value of the outside diameter or thickness of the ceramic heater is D1, the distance from the tip of the ceramic heater to the ends of the heating resistors connected to the lead wires is l2, and the length of the ceramic heater exposed from the pipe of the glow plug is L, the relationship between the heating resistors and the ceramic heater satisfies the equation described below.

$$0.06 < d/D1 \times l2/L \leq 0.6$$

where $0.3 < d/D1 < 0.9$ $$0.2 < l2/L < 1.0$$

With this structure, even when the heating resistors are embedded near the central portion closer to the tip of the ceramic heater, the strength of the ceramic heater can be improved as high as that of the insulating ceramic sintered body and a thermal capacity enough to improve the starting of a diesel engine can be obtained even in the low voltage range of 11 to 24 V. The surface of the ceramic heater can thus be heated quickly to a predetermined temperature and the temperature difference in the circumferential direction of the ceramic heater at the time of temperature saturation is reduced. Consequently, this invention can provide a ceramic glow plug superior in reliability and durability without requiring any complicated structure.

The fourth invention relates to improvements of the ceramic heater of the genus invention in the following points.

Figure 20:
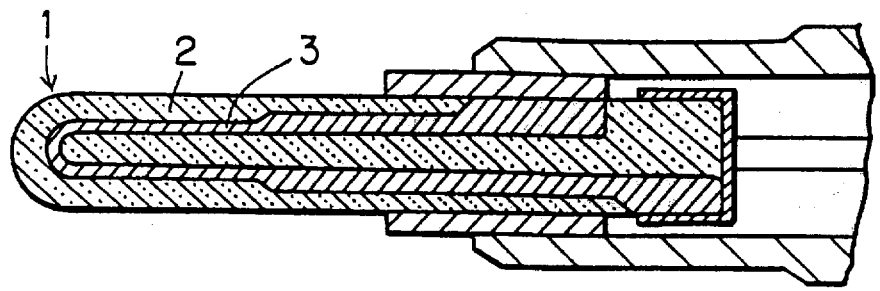
FIG. 20 is a horizontal longitudinal sectional view showing the main section of a conventional ceramic heater applied to a glow plug of a diesel engine.

As shown in FIG. 20, a conventional ceramic heater 1 has been proposed (refer to Japanese Laid-open Utility Model Publication No. 2-20293 and No. 5-31191) wherein a heating resistor 3 made of a high-melting point metal material and having specific dimensions is embedded at a specific position in an insulating ceramic sintered body 2 superior in strength and oxidation resistance.

The temperature distribution of the heating zone of the above-mentioned ceramic heater 1 is close to the distribution of design values, thereby capable of reducing crack generation due to difference in thermal expansion between the insulating ceramic sintered body 2 and the heating resistor 3.

However, when the above-mentioned ceramic heater 1 is used for a ceramic heater operating at 1000° C. or more, such as a glow plug of a diesel engine, the ceramic heater is designed to generate heat at the tip thereof, that is, within 5 mm from the maximum heating zone to ensure positive ignition and superior starting. With this structure, liquid fuel having a temperature extremely lower than that of the heated ceramic heater may directly and abruptly contact the red hot ceramic heater surface of the maximum heating zone located close to the tip of the ceramic heater at the starting. In addition, when the ceramic heater is used for a heater of other heating or igniting apparatuses, various types of mediums and fuel, such as liquid and gas having low temperatures, may also directly contact the red hot maximum heating zone located near the tip of the ceramic heater.

Since the temperature difference in the above-mentioned cases may exceed 950° C. and may frequently occur at local areas near the maximum heating zone at the tip of the heater, thermal shock due to the above-mentioned temperature difference may apply to the ceramic heater during operation and may be in danger of causing breakdown in the heating resistor itself because of cracks generated in the ceramic heater. This causes problems in durability, safety for positive ignition and reliability.

The fourth invention has been developed to eliminate the above-mentioned defects. The purpose of the fourth invention is to provide a ceramic heater superior in strength, wear resistance, thermal resistance, corrosion resistance, durability and reliability during continuously repeated heating and cooling operation for a long time, while adopting the tip heating method and maintaining the quick heating function, without causing cracks in the ceramic heater and thus preventing breakdown in the heating resistor, even when low-temperature liquid fuel, gas fuel or other heating medium directly and abruptly contacts an area close to the maximum heating zone of the ceramic heater during operation and the ceramic heater is subjected to thermal shock which may cause extremely significant and local temperature difference.

In the ceramic heater of the fourth invention, the outermost circumference of the layers of heating resistor at least at the maximum heating zone is positioned inside the surface of the insulating ceramic sintered body by distance 13 which corresponds to 6 to 25% of the outside diameter of the insulating ceramic sintered body, the tips of the layers of heating resistor are positioned 0.3 to 1.5 mm inside the tip of the insulating ceramic sintered body, and the cross section of the insulating ceramic sintered body is made circular at least in the range from the maximum heating zone to the tip thereof.

In the above-mentioned ceramic heater, it is preferable that at least the maximum heating zone of the insulating ceramic sintered body has thermal shock resistance corresponding to a temperature difference of not less than 1000° C., or the surface roughness of the maximum heating zone is in the range of 0.4 to 3.0 μm Rmax.

In the ceramic heater of the fourth invention, heating resistor layers made of an inorganic conductive material, leads connected to the layers of heating resistor and electrodes connected to the leads are embedded in an insulating ceramic sintered body. The outermost circumference of the layers of heating resistor at least at the maximum heating zone is positioned inside the surface of the insulating ceramic sintered body by distance 13 which corresponds to 6 to 25% of the outside diameter of the insulating ceramic sintered body, the tips of the layers of heating resistor are positioned 0.3 to 1.5 mm inside the tip of the insulating ceramic sintered body, and the cross section of the insulating ceramic sintered body is made circular at least in the range from the maximum heating zone to the tip thereof. It is preferable that at least the maximum heating zone of the ceramic heater has thermal shock resistance corresponding to a temperature difference of not less than 1000° C., or the surface roughness of the maximum heating zone is in the range of 0.4 to 3.0 μm Rmax. This structure is suited to maintain the strength of the insulating ceramic sintered body. The superior thermal conductivity of the ceramic heater is effective in relieving thermal shock to the insulating ceramic sintered body enclosing the layers of heating resistor.

(Example 5)

The ceramic heater of the fourth invention will be explained below referring to the attached drawings.

Figure 17:
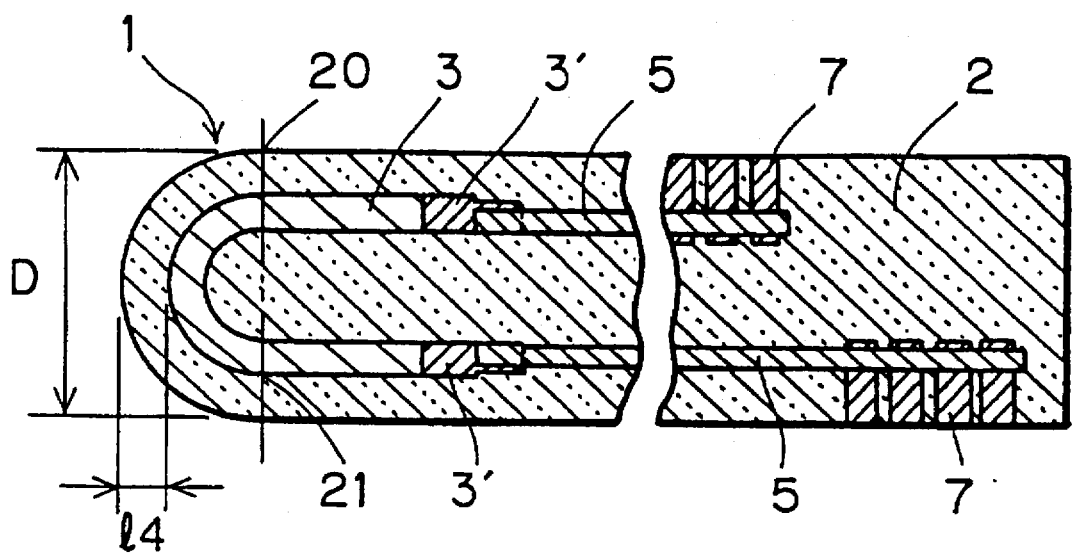
FIG. 17 is a horizontal longitudinal sectional view showing an example of a ceramic heater of the fourth invention.
Figure 18:
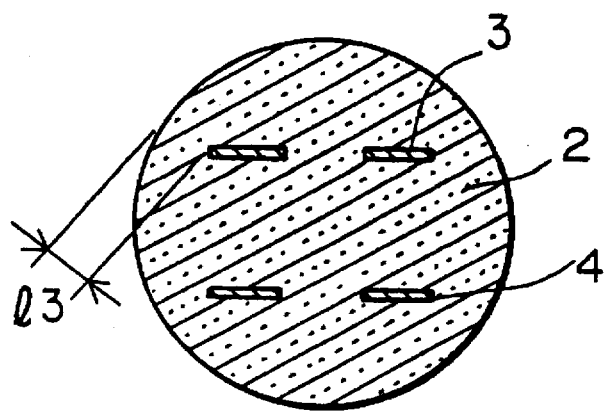
FIG. 18 is a transverse sectional view at the maximum heating zone of the ceramic heater of the fourth invention.

FIG. 17 is a horizontal longitudinal sectional view showing an example of the ceramic heater of the fourth invention and FIG. 18 is a transverse sectional view at the maximum heating zone of the ceramic heater of the fourth invention.

Referring to FIGS. 17 and 18, numeral 1 represents a ceramic heater comprising layers 3, 4 of heating resistor made of an inorganic conductive material, leads 5 (6) connected to the layers 3, 4 of heating resistor and electrodes 7 (8) connected to the leads 5 (6), the layers of heating resistor, the leads and the electrode being embedded in an insulating ceramic sintered body 2.

In the ceramic heater 1, the outermost circumference portions 21 of the generally U-shaped heating resistor layers 3 (4) corresponding to at least the maximum heating zone 20 are embedded inside the surface of the insulating ceramic sintered body 2 by distance 13 which corresponds to 6 to 25% of the outside diameter D of the insulating ceramic sintered body 2, and the tips of the layers 3 (4) of heating resistor are positioned 0.3 to 1.5 mm inside the tip of the insulating ceramic sintered body 2.

Second layers 3' (4') of heating resistor having lower resistance than and being as wide as first layers 3, 4 of heating resistor are laminated to the ends of the generally U-shaped first layers 3, 4 of heating resistor made of an inorganic conductive material. The ends of the second layers 3' (4') of heating resistor are formed narrower than the first layers 3, 4 of heating resistor and projected in the longitudinal direction from the ends of the first layers 3, 4 of heating resistor. The second layers 3' (4') of heating resistor are connected to the leads 5 formed from tungsten (W) wires by means of the projected portions of the second layers 3' (4') of heating resistor.

The electrodes 7 (8), made of an inorganic conductive material, divided into a plurality of layer pieces and connected to the other ends of the leads 5 (6), are embedded in the insulating ceramic sintered body 2. The electrodes 7 (8) are partially exposed on the outer circumference surface of the insulating ceramic sintered body 2. The tip of the insulating ceramic sintered body 2 on the sides of the first layers 3, 4 of heating resistor is made generally spheric and cross section of at least the insulating ceramic sintered body 2, in which the first heating resistors 3, 4 are embedded, is made circular.

When the outermost circumference portions 21 of the first layers 3, 4 of heating resistor corresponding to at least the above-mentioned maximum heating zone 20 are positioned inside the surface of the insulating ceramic sintered body 2 by distance 13 which corresponds to 6 to 25% of the outside diameter D of the insulating ceramic sintered body 2 at least at the maximum heating zone, and the tips of the first layers 3, 4 of heating resistor are positioned 0.3 to 1.5 mm inside the tip of the insulating ceramic sintered body 2, the tip heating method can be adopted and the heater can have high thermal shock resistance against thermal shock caused by a temperature difference of 950° C. or more without deteriorating the quick heating function. When the durability of the ceramic heater during a high-load durability test consisting of many heating and cooling cycles is considered, the above-mentioned outermost circumference portions 21 should preferably be positioned inside the surface of the insulating ceramic sintered body 2 by distance 13 which corresponds to 11 to 24% of the outside diameter D of the insulating ceramic sintered body 2, and the tips of the first layers 3, 4 of heating resistor should preferably be positioned 0.5 to 1.3 mm inside the tip of the insulating ceramic sintered body 2. In particular, when the resistance increase ratio of the resistors is considered, the above-mentioned outermost circumference portions 21 should most preferably be positioned inside the surface of the insulating ceramic sintered body 2 by distance 13 which corresponds to 16 to 19% of the outside diameter D of the insulating ceramic sintered body 2 and the tips of the first layers 3, 4 of heating resistor should most preferably be positioned 0.8 to 1.2 mm.

On the other hand, the surface roughness of the insulating ceramic sintered body 2 at the portion corresponding to at least the above-mentioned maximum heating zone 20 should be as small as possible. However, in view of grinding cost, the surface roughness should preferably be in the range of 0.4 to 3.0 µm Rmax. In view of strength, the surface roughness should more preferably be in the range of 0.6 to 1.8 µm Rmax. Furthermore, in view of thermal shock resistance, the surface roughness should most preferably be in the range of 0.8 to 1.5 µm Rmax.

The resistance of the inorganic conductive material for the electrodes 7 (8) is required to be lower than that of the material for the layers 3, 4 of heating resistor. Moreover, the electrodes 7 (8) should preferably be divided into a plurality of pieces. Besides, the number of the electrodes 7 (8) can be made equal to that of the layers 3, 4 of heating resistor. Instead of such multiple layers, a single layer structure can also be used for the electrodes 7 (8) by electrically connecting a plurality of layers by means of through-holes or the like.

Figure 19:
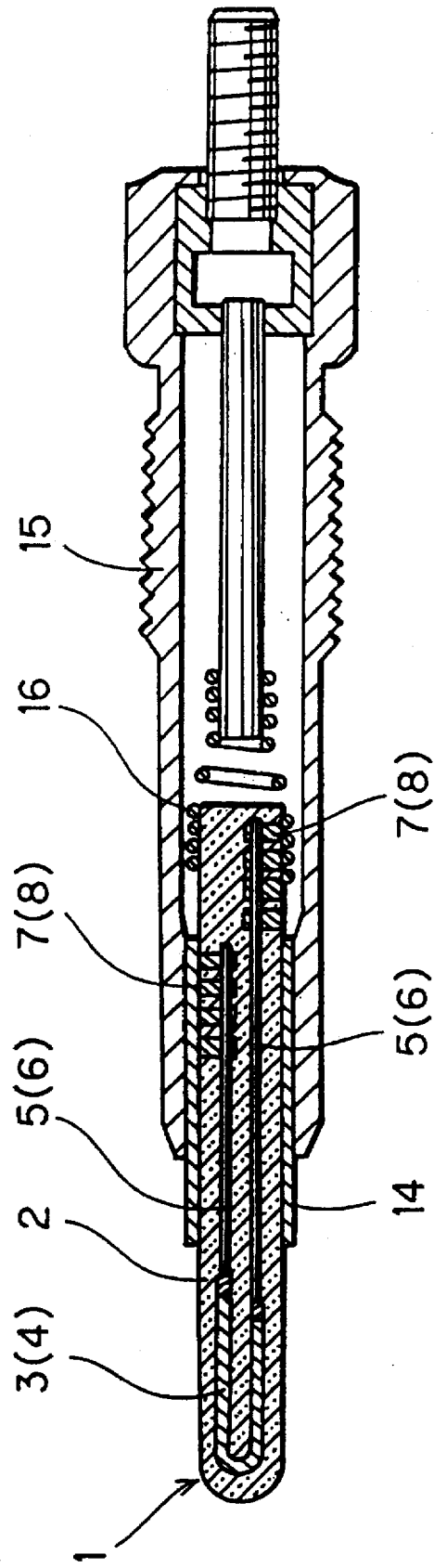
FIG. 19 is a horizontal longitudinal sectional view showing the main section of an example of the ceramic heater of the fourth invention applied to a self-saturation glow plug used to boost the starting of a diesel engine.

FIG. 19 is a horizontal longitudinal sectional view showing the main section of an example of the ceramic heater of the fourth invention applied to a self-saturation glow plug used to boost the starting of a diesel engine.

In the self-saturation glow plug shown in FIG. 19, a ceramic heater 1 comprises two layers 3, 4 of heating resistor made of an inorganic conductive material, leads 5 (6) connected to the ends of the layers 3, 4 of heating resistor and electrodes 7 (8) having a plurality of divided layer pieces and connected to the leads 5 (6), the layers of heating resistor, the lead wires and the electrodes being embedded in an insulating ceramic sintered body 2. A cylindrical pipe 14 is fit on the ceramic heater 1 having a circular cross section and joined, by brazing, with the electrodes 7 (8) exposed by grinding the side surface of the ceramic heater 1 so that the pipe can function as one of the electrode terminals. An electrode 16 is connected to the electrodes 7 (8) exposed at one end of the ceramic heater 1 so that the pipe is derived outside and can function as the other electrode terminal. The ceramic heater is then set in a holder 15 and the electrodes are electrically connected to the corresponding terminals, with the positive and negative electrodes being insulated from each other, to form a self-saturation glow plug.

In the above-mentioned glow plug, the thickness of the layers 3, 4 of heating resistor should preferably be in the range of 2.3 to 150 µm at least at the maximum heating zone 20 to prevent breakdown in the layers of heating resistor during production. In particular, to prevent problems, such as crack generation at the layers 3, 4 of heating resistor during sintering the layers of resistor into one body, the thickness of the layers 3, 4 of heating resistor should more preferably be in the range of 8 to 53 µm at least at the maximum heating zone.

Before evaluating the ceramic heater 1 of the fourth invention, in the same way as the production method MS, flat ceramic green bodies (corresponding to numerals 9, 10 and 11 in FIG. 3) mainly composed of silicon nitride were first made by a known molding method, such as the press molding method, by using granules prepared by adding and mixing yttria ($Y_2O_3$) or an oxide of a rare-earth element as a sintering aid with high-purity silicon nitride ($Si_3N_4$) powder.

Next, solvent was added to a specified mixture of powdery tungsten carbide (WC) and powdery silicon nitride ($Si_3N_4$) to prepare paste. By using the paste, a generally U-shaped pattern 4 (having various dimensions for a plurality of samples) determined on the basis of a designed resistance value and patterns 4' (shown in FIG. 11) having narrowed projected portions and laminated on the ends of the generally U-shaped pattern were formed sequentially on the surface of the ceramic green body 9 by the screen printing method. The distance from the side surface of the ceramic green body 9 to the outermost circumferences of the above-mentioned patterns was set at various values for a plurality of samples.

On the other hand, by using paste made of 85 weight % of powdery tungsten carbide (WC) and 15 weight % of powdery silicon nitride ($Si_3N_4$), four patterns having a width of about 0.7 mm and a thickness of about 70 µm were formed in parallel on the end surfaces of the above-mentioned ceramic green body 9 on the side opposite to the layer 4 of heating resistor at predetermined positions and extended to the side surfaces of the ceramic green body 9 in the same way as described above.

Further, boron nitride (BN) can be added as necessary to the paste used for the above-mentioned layers 3, 4 of heating resistor and the electrodes 7, 8 to adjust the thermal expansion coefficient of the paste with that of the insulating ceramic sintered body 2.

Next, leads 6 formed from tungsten (W) wires of 0.25 mm in diameter were placed between the ceramic green body 9 and a ceramic green body 10, both having the first layers 3, 4 of heating resistor and the electrodes 7, 8 printed on each surface thereof, so that the leads were connected to the above-mentioned generally U-shaped layers 3, 4 of heating resistor and the electrodes 7, 8 by means of the second layers 3', 4' of heating resistor formed and laminated on the generally U-shaped layers of heating resistor made of an inorganic conductive material. Furthermore, the leads formed from tungsten (W) wires similar to the above-mentioned wires were placed between the ceramic green body 10 and a third ceramic green body 11 with no heating resistors and electrodes printed. This structure was fired under pressure at 1750° C. for one hour in a reduction atmosphere including carbon (C).

By grinding the circumference of the ceramic sintered body 2 having the two layers 3, 4 of heating resistor obtained as described above, the tip on the side of the layers 3, 4 of heating resistor was made spheric and its cross section was made circular, and the end surfaces of the embedded electrodes 7, 8 were exposed to the side surfaces of the cylindrical sintered body. In this way, a plurality of ceramic heaters having a diameter of about 3.5 mm and a length of about 54 mm were prepared.

A metallic film of nickel (Ni) or the like was formed on at least the exposed portions of the electrodes of the ceramic heater by the metalizing or plating method. A cylindrical support pipe 14 was fit on the ceramic heater so that the pipe was connected to one of the electrodes exposed to the side surfaces of the ceramic heater. The pipe was joined with the electrode by silver soldering in a reduction atmosphere to function as the negative electrode. Furthermore, an electrode 16 formed from a wire or a cap was connected to and joined with the other electrode by silver soldering in the same way as described above to function as the positive electrode. In this way, a plurality of ceramic heaters 1 with the positive and negative electrodes were prepared for evaluation.

The above-mentioned ceramic heaters 1 for evaluation were then heated to saturation temperatures by applying a DC voltage of 11 to 24 V. The surface temperature distribution from the tip of the ceramic heater exposed from the cylindrical support pipe was measured by a noncontacting radiation thermometer to specify the position of the maximum heating zone 20. The above-mentioned ceramic heaters for evaluation were then X-ray photographed and the distance from the outermost circumference of the layers 3, 4 of heating resistor at the maximum heating zone 20 to the surface of the insulating ceramic sintered body was measured by magnifying photographed film images using a projector, thereby obtaining distance 13 related to the outside diameter D of the insulating ceramic sintered body.

In the same way as described above, distance 14 from the tip of the ceramic heater to the tips of the embedded layers of heating resistor was measured using X-ray films to confirm the design value.

On the other hand, the surface roughness of the side surface including at least the maximum heating zone of the above-mentioned ceramic heater for evaluation was measured in the longitudinal direction in units of Rmax according to the JIS-B0601 Standard.

According to the results of the measurements, the above-mentioned ceramic heater for evaluation was heated by applying a DC voltage of 11 to 24 V. The temperature at the maximum heating zone was measured by a noncontacting method. After confirming that a preset temperature value was reached, the ceramic heater exposed from the cylindrical support pipe was dipped into a molten solder bath three times to apply thermal shock caused by the temperature difference between the maximum heating zone and the solder bath. The ceramic heater was checked visually for the presence or absence of cracks using a stereo microscope and also checked using the fluorescent liquid penetrant inspection method. Samples of the ceramic heaters were evaluated in terms of thermal shock resistance depending on the maximum temperature difference values at which no cracks were caused.

Additionally, by applying a DC voltage of 11 V to some samples of the ceramic heaters for evaluation, the time elapsed from electric power supply to temperature rising to 800° C. was measured to evaluate the quick heating functions of the ceramic heaters.

Furthermore, the ceramic heaters for evaluation were subjected to 10,000 cycles of a high-load durability test wherein each cycle consisted of a heating period in which each ceramic heater was heated by applying a DC voltage of 11 to 24 V for 5 minutes and a forcibly cooling period in which electric power supply was stopped and compressed air was blown to the ceramic heater for 2 minutes. The resistance values of the ceramic heaters before and after the test were measured. A plurality of samples were subjected to the test to evaluate their durability. The samples caused increases in resistance not less than 20% were judged to be improper.

The results of the durability test were shown in Table 8.

TABLE 8

| Sample No. | Position of Heating Resister 13 (%) | Position of Heating Resister 14 (mm) | Surface Roughness Rmax (μm) | Thermal Shock Resistance Δt (°C.) | Quick Heating Function (SEC) | High-load Durability Test | Remarks |
|---|---|---|---|---|---|---|---|
| *1 | 3 | 1.0 | 1.1 | 900 | 3.3 | Improper | A |
| 2 | 6 | " | " | 950 | 3.4 | Proper | |
| 3 | 9 | " | " | 1000 | 3.5 | " | |
| 4 | 11 | " | " | 1100 | " | " | |
| 5 | 12 | " | " | " | 3.6 | " | |
| 6 | 15 | " | " | " | " | " | |
| 7 | 16 | " | " | 1150 | " | " | |
| 8 | 18 | " | " | " | 3.7 | " | |
| 9 | 19 | " | " | " | " | " | |
| 10 | 21 | " | " | 1100 | 3.8 | " | |
| 11 | 24 | " | " | " | " | " | |
| 12 | 25 | " | " | 1000 | 4.0 | " | |
| *13 | 26 | " | " | 900 | 4.6 | " | |
| *14 | 18 | 0.2 | " | " | 3.5 | Improper | B |
| 15 | " | 0.3 | " | 950 | 3.6 | Proper | |
| 16 | " | 0.5 | " | 1000 | " | " | |
| 17 | " | 0.8 | " | 1150 | 3.7 | " | |
| 18 | " | 0.9 | " | " | " | " | |
| 19 | " | 1.1 | " | " | 3.8 | " | |
| 20 | " | 1.2 | " | 1100 | " | " | |
| 21 | " | 1.3 | " | 1000 | " | " | |
| 22 | " | 1.5 | " | 950 | 3.9 | " | |
| *23 | " | 1.6 | " | 900 | 4.3 | " | |
| 24 | " | 1.0 | 0.4 | 1200 | 3.7 | " | |
| 25 | " | " | 0.6 | " | " | " | |
| 26 | " | " | 0.8 | 1150 | " | " | |
| 27 | " | " | 1.0 | " | " | " | |
| 28 | " | " | 1.3 | " | " | " | |
| 29 | " | " | 1.4 | " | " | " | |
| 30 | " | " | 1.5 | " | " | " | |
| 31 | " | " | 1.8 | 1100 | " | " | |
| 32 | " | " | 2.6 | " | " | " | |
| 33 | " | " | 3.0 | 1000 | " | " | |
| 34 | " | " | 3.2 | 950 | " | " | |

Note
(1) Samples identified by sample numbers marked * are not included in the claims of the forth invention.
(2) A . . . Breakage at 351 cycles
B . . . Breakage at 1,914 cycles Self-saturation glow plugs incorporating the above-mentioned ceramic heaters for evaluation were set on a 4-cylinder diesel engine bench test apparatus so that injected fuel was able to directly contact the exposed ceramic heaters at various fuel injection angles. The ceramic heaters were heated by applying a DC voltage of 14 V and the diesel engine was subjected to a durability test wherein the engine was operated at the maximum rotation speed and full load for 100 hours. It was confirmed that the glow plugs operated properly. When the ceramic heaters were subjected to a non-destructive test after the durability test, abnormalities, such as cracks, were not detected on any of the self-saturation glow plugs incorporating the ceramic heaters of the fourth invention.

Even when the ceramic heaters of the fourth invention were used as ignition heaters, it was confirmed that they ensured positive ignition and safety without causing cracks due to thermal shock.

According to Table 8, the ceramic heaters other than those included in the claims of the fourth invention were judged to be improper at the durability test or caused undesirable results, that is, the quick heating function exceeded 4.0 seconds.

As described above, the ceramic heaters of the fourth invention comprises two or more layers of heating resistor made of an inorganic conductive material and leads connected to the layers of heating resistor and electrodes connected to the leads, the layers of heating resistor, leads and electrodes being embedded in an insulating ceramic sintered body. Since the outermost circumference of the layers of heating resistor corresponding to at least the maximum heating zone is positioned inside the surface of the insulating ceramic sintered body by a distance which corresponds to 6 to 25% of the outside diameter of the insulating ceramic sintered body, the tips of the layers of heating resistor are positioned 0.3 to 1.5 mm inside from the tip of the insulating ceramic sintered body and the cross section on the tip side from at least the maximum heating zone is made circular, the ceramic heater can maintain heating at its tip without deteriorating its quick heating function and it is not cracked even when subjected to thermal shock which may cause significantly large temperature difference during operation. The ceramic heater can thus withstand thermal exposure during continuous operation for a long time. The fourth invention can thus provide a self-saturation glow plug for a diesel engine capable of ensuring positive ignition and safety and superior in durability and reliability, as well as a ceramic heater ideally suited for a variety of heating and ignition apparatuses.

The purposes of the fifth invention a redescribed below.

Figure 27:
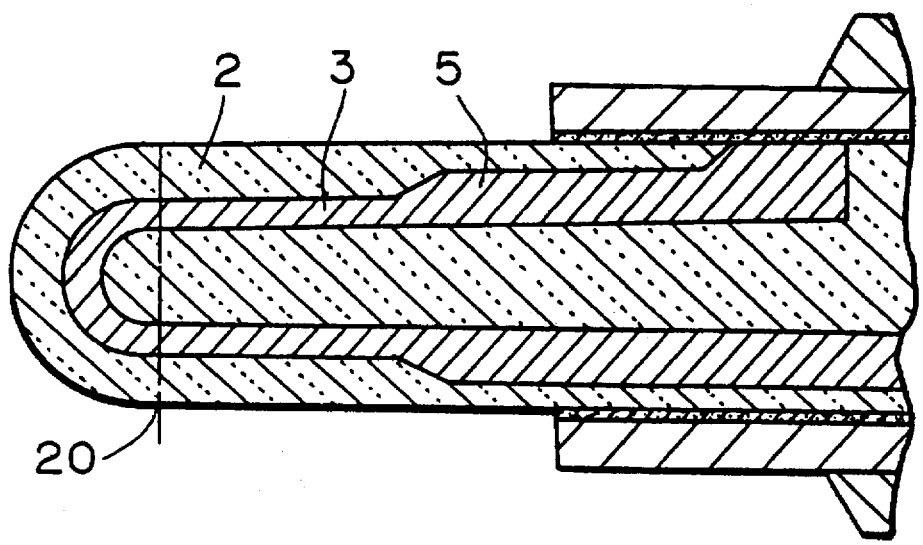
FIG. 27 is a partially cutaway horizontal longitudinal sectional view showing a conventional ceramic glow plug.

A conventional ceramic heater (refer to Japanese Laid-open Patent Publication No. 2-75188 which has already been introduced in FIG. 8) has been proposed for example as shown in FIG. 27, wherein nonoxide ceramics, such as a silicon nitride sintered body, significantly superior in thermal shock resistance and high temperature strength to other ceramics, is used for an insulator 2, a resistor pattern comprising a heating resistor 3 and leads 5 is printed on the above-mentioned insulator 2 by using heating resistor paste generally composed of a high-melting point metal, such as tungsten (W) or molybdenum (Mo), or mainly composed of a compound of such metals, and another insulator is laminated on the insulator and then fired into one body.

When the above-mentioned ceramic heater is used for a glow plug of a diesel engine, at least the maximum heating zone which is energized and red hot is generally exposed in the pre-combustion chamber of the engine to maintain the starting of the engine.

If the ceramic heater is subjected to shock by hitting or dropping it when it is set in the cylinder head of an engine, the ceramic heater may be broken at a strength not more than the breakdown strength of the insulating ceramic sintered body, thereby lowering durability and deteriorating reliability.

The fifth invention is intended to solve the above-mentioned problems. The purposes of the fifth invention are to provide a ceramic glow plug superior in durability and reliability, the ceramic heater of which is not broken easily by shock which may be applied unexpectedly to the glow plug during glow plug handling operation.

When the distance from the joining starting point of the support pipe used to secure the ceramic heater to the corners near the outer circumferences of at least two layers of heating resistor connected to the lead wires is $d_n$, the maximum distance from the center of the cross section of the ceramic heater composed of at least the above-mentioned two layers of heating resistor including the corners thereof to each corner is $W_n$, the exposed length of the ceramic heater composed of the two layers of heating resistor from the joining starting point to the tip of the ceramic heater is L, and the outside diameter or width at the corner of the insulating ceramic sintered body is D, the ceramic glow plug of the fifth invention can satisfy the equation described below.

$$D/2W_n \geq 2(L-d_n)/L$$

where $2W_n < D$
$0 < d_n < L$
n is an integer.

In the ceramic glow plug of the fifth invention, by satisfying the above equation, stress generated by shock applied to the ceramic heater is concentrated to the above-mentioned joining starting point and does not affect the heating resistors embedded inside. The ceramic heater can thus withstand stress which is nearly as high as the breakdown strength of the insulating ceramic sintered body. The ceramic glow plug can thus be improved in durability and reliability.

(Example 6)

The ceramic glow plug of the fifth invention will be explained below referring to the attached drawings.

Figure 21:
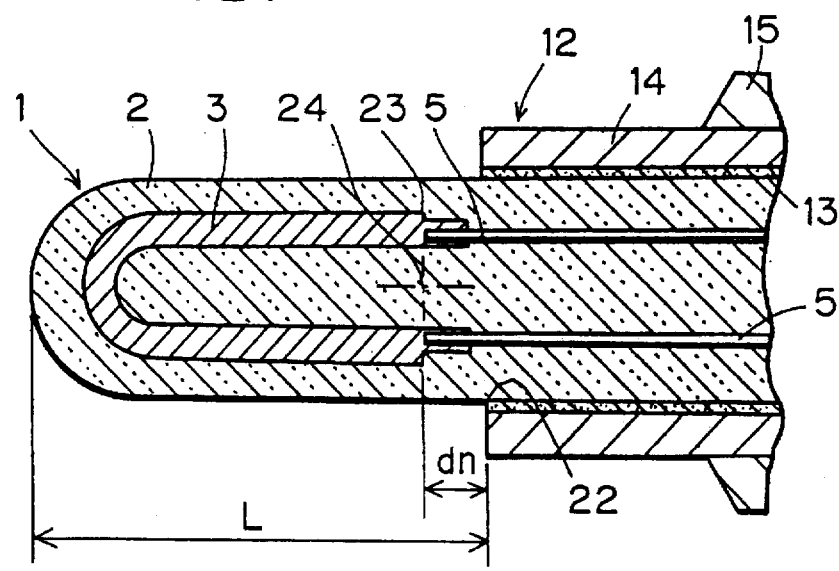
FIG. 21 is a cutaway horizontal longitudinal sectional view showing the main section of an example of a ceramic glow plug of the fifth invention.
Figure 22:
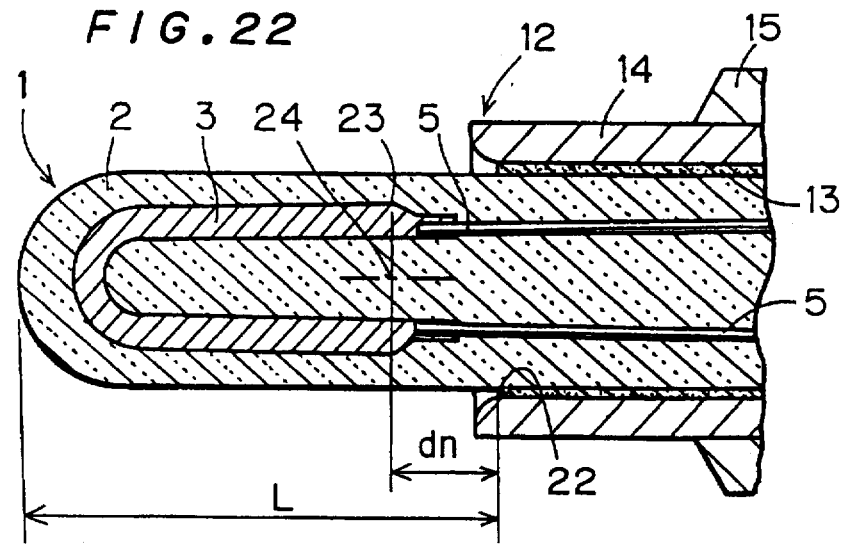
FIG. 22 is a horizontal longitudinal sectional view of the main section of another example of a ceramic glow plug of the fifth invention, wherein the end section of the heating resistor of the ceramic glow plug is narrowed by a taper disposed at the outer circumference and the tip of a support pipe has a circular arc shape.
Figure 23:
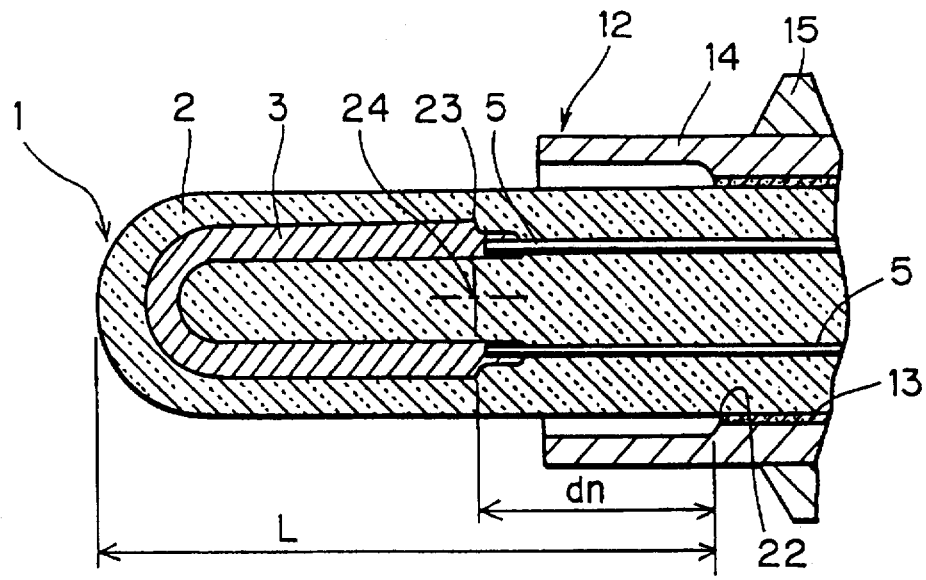
FIG. 23 is a cutaway horizontal longitudinal sectional view showing the main section of a still another example of the fifth invention, wherein the corner of the heating resistor of a ceramic glow plug has a circular arc shape and the starting point of joining the corner with the ceramic glow plug is set at the inner backward position of the support pipe.
Figure 24:
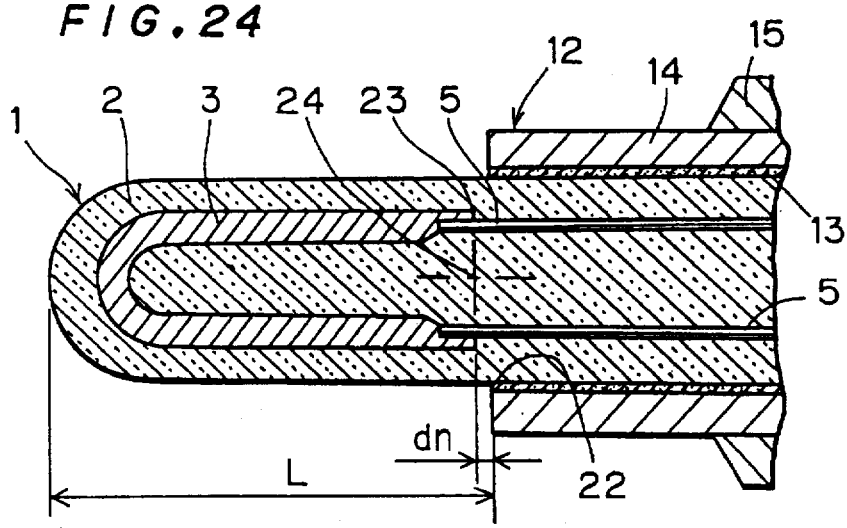
FIG. 24 is a cutaway horizontal longitudinal sectional view of the main section of a yet still another example of the fifth invention, wherein the end of the heating resistor of a ceramic glow plug is narrowed by a taper disposed at the inside of the end.

FIG. 21 is a cutaway horizontal longitudinal sectional view showing the main section of an example of the ceramic glow plug of the fifth invention and FIGS. 22 to 24 are horizontal longitudinal sectional views of the main sections of other examples of the ceramic glow plug of the fifth invention, wherein the ends of the heating resistors of the ceramic glow plug are changed in shape and the joining starting point to be set by the support pipe is also changed.

Referring to the drawings, numeral 12 represents a ceramic glow plug wherein a ceramic heater 1 comprises generally U-shaped heating resistors 3 (4) made of an inorganic conductive material and lead wires 5 (6) connected to the ends of the heating resistors, the heating resistors and the lead wires being embedded in an insulating ceramic sintered body 2. The ceramic heater 1 is secured with a cylindrical support pipe 14 which is connected to a cylinder head holder 15, with a brazing material 13 inserted between the ceramic heater and the support pipe.

When the distance from the joining starting point 22 of the support pipe 14 to the corner 23 near the outer circumference of at least two generally U-shaped heating resistors 3 (4) connected to the lead wires 5 (6) is $d_n$, the maximum distance from the center 24 of the cross section of the heating resistors 3 (4) including the corners thereof to each corner is $W_n$, the exposed length of the ceramic heater 1 from the joining starting point 22 to the tip of the ceramic heater 1 is L, and the outside diameter or width at the corner 23 of the insulating ceramic sintered body 2 is D, the ceramic glow plug 12 of the fifth invention can satisfy the equation described below.

$$D/2W_n \geq 2(L-d_n)/L$$

where $2W_n < D$
$0 < d_n < L$
n is an integer.

In the fifth invention, the corner 23 designates a first refraction point formed on the outside fringe of the generally U-shaped heating resistors 3 (4) at the connections near the ends of the heating resistors 3 (4) connected to the lead wires 5 (6). More particularly, in FIGS. 21, 22 and 23, the corner designates the first refraction point wherein the outside fringe is narrowed backward, and in FIG. 24, the corner designates the end of the heating resistor, that is, the first refraction point.

In the fifth invention, the center 24 of the cross section including the corners designates a point positioned on the center line of the insulating ceramic sintered body 2 at the cross section including the generally U-shaped heating resistors 3 (4).

Figure 25:
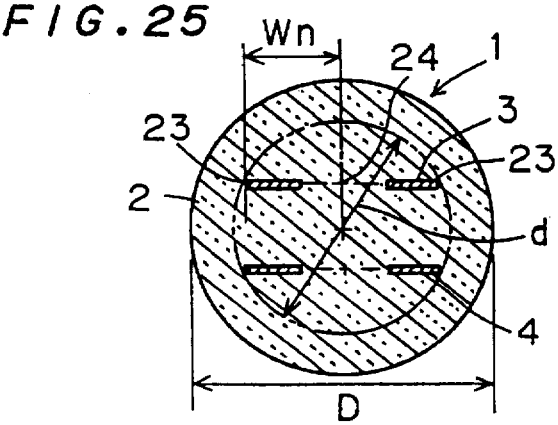
FIG. 25 is a transverse sectional view showing the transverse cross section of the corner shown in FIGS. 21–24 has a circular shape.
Figure 26:
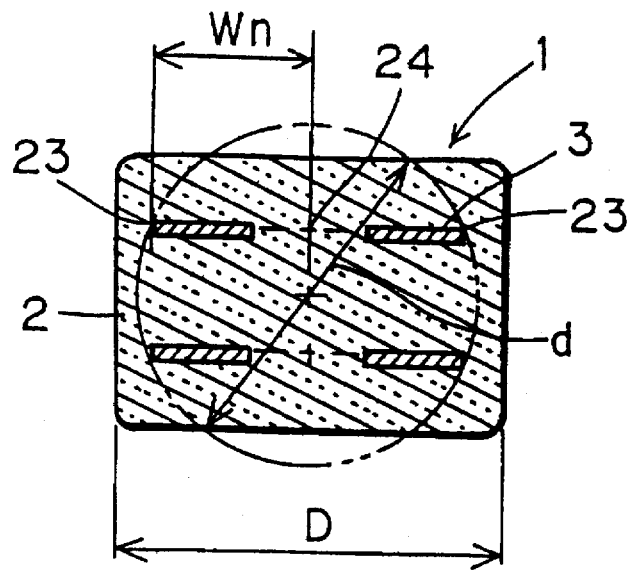
FIG. 26 is a transverse sectional view showing the transverse cross section of the corner shown in FIGS. 21–24 has a square shape.

FIGS. 25 and 26 are transverse sectional views of ceramic glow plugs of the fifth invention wherein at least two layers of heating resistor are embedded. The horizontal longitudinal sectional views of the ceramic glow plugs are the same as those shown in FIGS. 21 to 24. In addition, the corner 23 and the center 24 of the vertical cross section are also defined as described above.

FIGS. 25 and 26 are typical transverse sectional views of the ceramic heater 1 embedded in the insulating ceramic sintered body 2, with the ratio of d/D being set in the range of 0.3 to 0.9 when the diameter of the circle indicated by a two-dot chain line and enclosing at least two layers 3, 4 of heating resistor made of an inorganic conductive material is d and the outside diameter or width of the insulating ceramic sintered body 2 is D.

In the above descriptions, the ceramic heaters of the fifth invention having circular and rectangular cross sections are detailed. Other than these shapes, the cross section of the ceramic heater can have an elliptic or oval shape.

Before evaluating the ceramic glow plug of the fifth invention, ceramic heaters having diameters of 2.6 mm, 3.0 mm and 3.4 mm and a length of about 54 mm were prepared in the same way as the production method MS already described.

Next, a metallic film of nickel (Ni) or the like was formed on the above-mentioned ceramic heater. The support pipe was fit on the ceramic heater so that the pipe was connected to one of the electrodes exposed to the side surfaces of the ceramic heater. The pipe was joined with the electrode by silver soldering in a reduction atmosphere. In this way, the ceramic glow plugs for evaluation were prepared.

Additionally, a ceramic glow plug wherein the support pipe was joined with the same insulating ceramic sintered body as that described above but having no heating resistors embedded therein was prepared as a comparison example.

Next, the support pipe of the above-mentioned ceramic glow plug for evaluation was held and a load was applied to the tip of the exposed ceramic heater to conduct a cantilever bending test and to calculate the breakdown strength thereof.

Furthermore, the breakdown starting point of the ceramic heater was observed. Samples which were broken beginning with the above-mentioned joining starting point were classified as S and samples which were broken at the exposed ceramic heaters were classified as H.

Moreover, samples having a cantilever bending strength of not less than 50 kg/mm$^2$ and also having the breakdown starting points thereof at the joining starting points of the support pipes were judged to be proper, considering a deviation of 3 β from the cantilever bending strength and breakdown starting point of the comparison example measured before the measurement of the ceramic glow plugs for evaluation. Samples other than those were judged to be improper.

The above-mentioned joining starting point and the corners near the outer circumference at the tips of the heating resistors were checked by X-ray film images using a magnifying projector. Values of D, $W_n$, L and $d_n$ were measured to confirm that they conform to the design dimensions.

The results of the above evaluation are shown in Tables 9 and 10.

Figure 28:
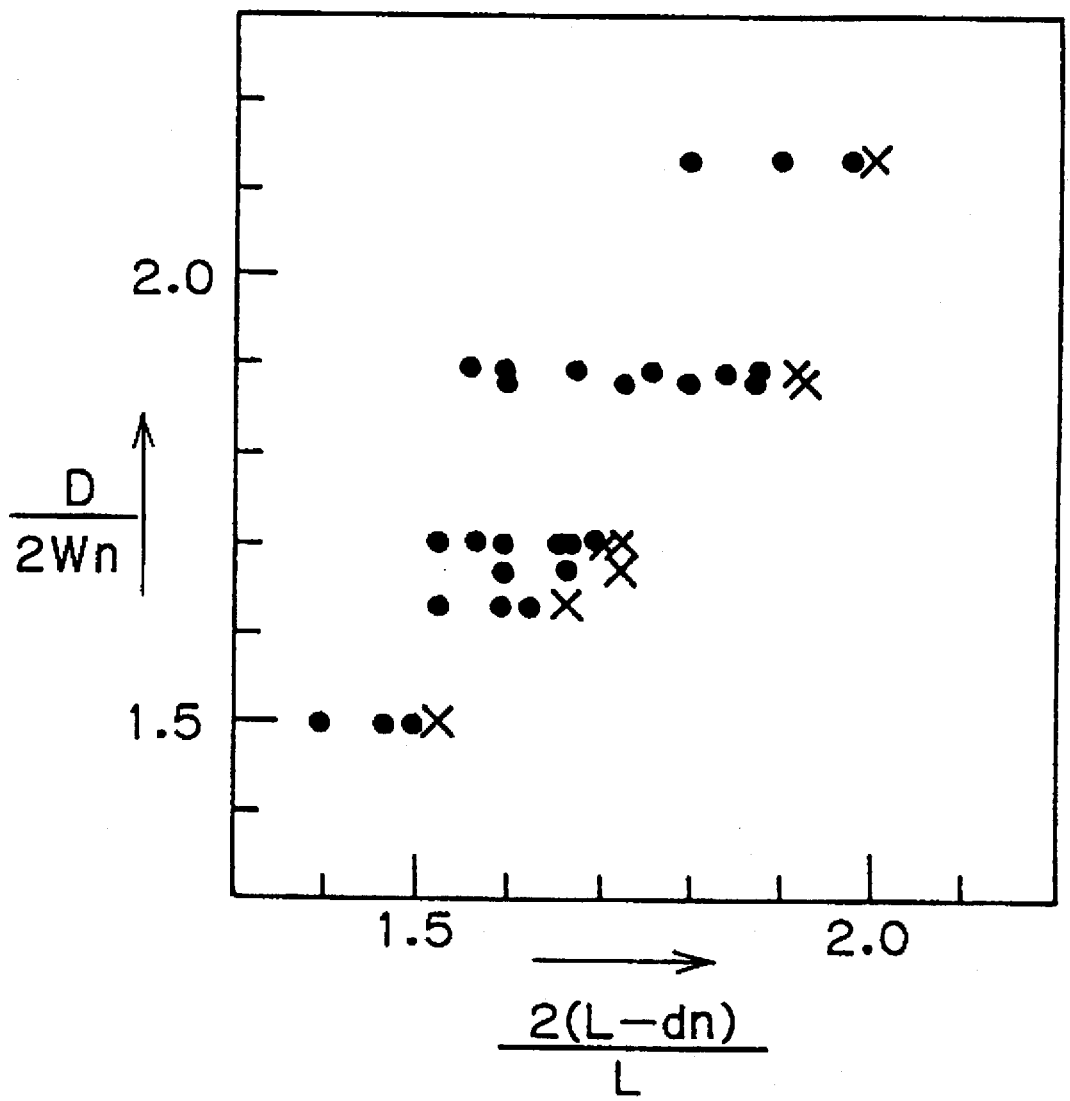
FIG. 28 is a diagram showing the relationship between $D/2W_n$ and $2(L-d_n)/L$ of a ceramic glow plug of the fifth invention.

According to the results shown in Tables 9 and 10, the relationship between $D/2W_n$ and $2(L-d_n)/L$ was shown in FIG. 28. Samples included in the claims of the fifth invention are represented by ● and samples excluded from the claims are represented by X.

TABLE 9

| Sample No. | D (mm) | Wn (mm) | L (mm) | dn (mm) | D/2Wn | 2(L−dn)/L |
|---|---|---|---|---|---|---|
| 1 | 3.4 | 1.0 | 14.0 | 2.8 | 1.70 | 1.60 |
| 2 | " | " | " | 2.4 | " | 1.66 |
| *3 | " | " | " | 2.0 | " | 1.71 |
| 4 | " | " | 12.0 | 2.8 | " | 1.53 |
| 5 | " | " | " | 2.4 | " | 1.60 |
| 6 | " | " | " | 2.0 | " | 1.67 |
| 7 | " | " | " | 1.8 | " | 1.70 |
| *8 | " | " | " | 1.6 | " | 1.73 |
| 9 | " | 0.9 | 10.0 | 2.0 | 1.89 | 1.60 |
| 10 | " | " | " | 1.6 | " | 1.68 |
| 11 | " | " | " | 1.2 | " | 1.76 |
| 12 | " | " | " | 0.8 | " | 1.84 |
| 13 | " | " | " | 0.6 | " | 1.88 |
| *14 | " | " | " | 0.4 | " | 1.92 |
| 15 | " | 0.8 | 8.0 | 0.8 | 2.13 | 1.80 |
| 16 | " | " | " | 0.4 | " | 1.90 |
| 17 | " | " | " | 0.1 | " | 1.98 |
| *18 | " | " | " | 0 | " | 2.00 |
| 19 | 3.0 | 1.0 | 12.0 | 3.6 | 1.50 | 1.40 |
| 20 | " | " | " | 3.2 | " | 1.47 |
| 21 | " | " | " | 3.0 | " | 1.50 |
| *22 | " | " | " | 2.8 | " | 1.53 |
| 23 | " | 0.9 | " | 2.4 | 1.67 | 1.60 |
| 24 | " | " | " | 2.0 | " | 1.67 |
| *25 | " | " | " | 1.6 | " | 1.73 |
| 26 | " | 0.8 | " | 2.0 | 1.88 | 1.60 |
| 27 | " | " | " | 1.6 | " | 1.73 |
| 28 | " | " | " | 1.2 | " | 1.80 |
| 29 | " | " | " | 0.8 | " | 1.87 |
| *30 | " | " | " | 0.4 | " | 1.93 |
| 31 | 2.6 | " | " | 2.8 | 1.63 | 1.53 |
| 32 | " | " | " | 2.4 | " | 1.60 |
| 33 | " | " | " | 2.2 | " | 1.63 |
| *34 | " | " | " | 2.0 | " | 1.67 |

Note:
Samples identified by sample numbers marked * are not included in the claims of the fifth invention.

TABLE 10

| Sample No. | Heating Resistor Type | Cantilever Bending Strength (Kg/mm$^2$) | Breakage Starting Point | Evaluation |
|---|---|---|---|---|
| 1 | Pattern,2-layer | 70.3 | S | Proper |
| 2 | " | 68.2 | " | " |
| *3 | " | 43.3 | H | Improper |
| 4 | " | 65.4 | S | Proper |
| 5 | " | 63.1 | " | " |
| 6 | " | 60.0 | " | " |
| 7 | " | 65.2 | " | " |
| *8 | " | 49.0 | H | Improper |
| 9 | " | 70.8 | S | Proper |
| 10 | " | 67.5 | " | " |
| 11 | " | 64.4 | " | " |
| 12 | " | 61.6 | " | " |
| 13 | " | 63.3 | " | " |
| *14 | " | 49.2 | H | Improper |
| 15 | " | 69.0 | S | Proper |
| 16 | " | 55.9 | " | " |
| 17 | " | 60.2 | " | " |
| *18 | " | 53.1 | H | Improper |
| 19 | " | 63.6 | S | Proper |
| 20 | " | 61.1 | " | " |
| 21 | " | 73.4 | " | " |
| *22 | " | 48.9 | H | Improper |
| 23 | " | 62.1 | S | Proper |
| 24 | " | 60.0 | " | " |
| *25 | " | 43.1 | H | Improper |
| 26 | " | 61.3 | S | Proper |
| 27 | " | 59.0 | " | " |

TABLE 10-continued

| Sample No. | Heating Resistor Type | Cantilever Bending Strength (Kg/mm$^2$) | Breakage Starting Point | Evaluation |
|---|---|---|---|---|
| 28 | " | 57.1 | " | " |
| 29 | " | 60.2 | " | " |
| *30 | " | 43.5 | H | Improper |
| 31 | " | 62.9 | S | Proper |
| 32 | " | 55.8 | " | " |
| 33 | " | 70.4 | " | " |
| *34 | " | 48.8 | H | Improper |

Note
(1) Samples identified by sample numbers marked * are not included in the claims of the fifth invention.
(2) S represents samples which were broken beginning with the joining starting point and H represents samples which were broken at the ceramic heater.

According to Tables 9 and 10, samples which do not satisfy the relationship of $D/2W_n \geq 2(L-d_n)/L$ are judged to be improper, since their breakdown starting points are on the ceramic heaters. Unlike these samples, all the samples included in the claims of the fifth invention are found to be proper.

Moreover, after self-saturation glow plugs prepared by connecting holders for mounting glow plugs on cylinder heads to the above-mentioned ceramic glow plugs for evaluation were dropped to a concrete floor from a predetermined height, they were set in a 4-cylinder diesel engine bench test apparatus at a predetermined torque using a torque wrench so that injected fuel was able to directly contact the exposed ceramic heaters at various fuel injection angles and the diesel engine was subjected to a durability test by operating it at the maximum rotation speed and full load for 100 hours. During the test, it was confirmed that the glow plugs of the fifth invention operated properly and the exposed ceramic heaters thereof were not broken. Even when the ceramic heaters of the fifth invention were subjected to a non-destructive test after the durability test, abnormalities, such as cracks, were not detected on any of the glow plugs.

As described above, in the ceramic glow plug of the fifth invention, the positional relationship between the ceramic heater at the joining start point wherein at least two layers of ceramic heater are secured to the support pipe and the heating resistors embedded in the ceramic heater can satisfy the equation described below.

$$D/2W_n \geq 2(L-d_n)/L$$

where $2W_n < D$
$0 < d_n < L$
n is an integer.

With this structure, the ceramic heater of the glow plug is not broken easily by shock which may be applied unexpectedly to the glow plug during glow plug handling operation. The ceramic heater can thus withstand thermal shock during continuous operation for a long time. The fifth invention can thus provide a self-saturation glow plug for a diesel engine, capable of ensuring positive ignition and safety and superior in durability and reliability.

The sixth invention is intended to carry out the improvements described below. For an insulating ceramic sintered body, a silicon nitride sintered body is frequently used, since it is superior in thermal resistance, thermal shock resistance and oxidation resistance. However, such a silicon nitride sintered body itself is apt to cause cracks due to difference in thermal expansion between the nitride sintered body and heating resistors embedded therein. In addition, when such a ceramic heater as that comprising the silicon nitride sintered body and the heating resistors is heated to 1000° C. or more by applying electric power, the silicon nitride sintered body is deteriorated in strength because of softening of the grain boundary phase of the sintered body and also deteriorated in structure because of ion movement in the grain boundary phase, since the grain boundary phase of the silicon nitride sintered body is generally formed from glass components. Consequently, the insulator of the ceramic heater is cracked or the silicon nitride sintered body of the insulator is oxidized, thereby changing the resistance values of the heating resistors and eventually causing breakdown in the heating resistors.

To eliminate the above-mentioned defects, the types and amounts of sintering aids to be added have been examined variously. According to such examinations, crystallizing the grain boundary phase of the silicon nitride sintered body has been proposed (refer to Japanese Laid-open Patent Publication No. 1-313362).

However, if $MoSi_2$ is used as a sintering aid to decrease the difference in thermal expansion between the silicon nitride sintered body and the heating resistors, the heating resistors themselves are apt to be siliconized when the embedded heating resistors are sintered with the silicon nitride sintered body into one body. As a result, the siliconized portions of the heating resistors may be cracked in a short time during electric power supply and operation, thereby causing change in resistance and eventually deteriorating durability.

Besides, ceramic heaters are being used in severer operation conditions and in more oxidative atmospheres these days. When a ceramic heater formed on a insulator composed of a silicon nitride sintered body having a crystallized grain boundary phase is used at high temperatures of 1000° C. or more for glow plugs of internal combustion engines and various ignition and heating apparatuses, the ceramic heater is generally heated between 1000° and 1300° C. at the time of ignition. Furthermore, the ceramic heater may be heated to high temperatures exceeding 1350° C. when exposed to ignition flames. Since this heating and cooling cycle is continuously repeated, the heating resistors made of an inorganic conductive material embedded therein cause increase in resistance with time, that is, the resistance may increase by more than 10% in a short time, thereby eventually causing breakdown in the heating resistors. Moreover, the silicon nitride sintered body itself is apt to be oxidized. The ceramic heater, therefore, becomes inferior in durability.

The sixth invention has been developed to eliminate the above-mentioned defects. The purpose of the sixth invention is to provide a ceramic heater comprising heating resistors which are not easily siliconized when they are sintered with the silicon nitride sintered body into one body. The further purpose of the sixth invention is to provide highly durable ceramic heaters which do not cause significant increase in resistance, breakdown in the heating resistors themselves, cracks in the insulator of the ceramic heaters or oxidation of the silicon nitride sintered body, even when the obtained ceramic heaters are heated quickly from room temperature to a high temperature of about 1000° C. repeatedly for a long time or even when the ceramic heaters are operated continuously for a long time at high temperatures of 1000° C. or more.

The inventors of the sixth invention carried out various examinations from a point of view that the generation of silicon must be inhibited in the firing process to prevent the embedded heating resistors from being siliconized and that the grain boundary phase of the silicon nitride sintered body must be composed of only the high-melting point crystal phase to restrict increase in the resistance of the ceramic heaters and to improve the durability of the ceramic heaters at high temperatures. As a result of the various examinations, the inventors have found that the generation of silicon can be inhibited by allowing the crystals of $Mo_{4.8}Si_3C_{0.6}$ and $MoSi_2$ to coexist in the grain boundary phase of the silicone nitride sintered body and that increase in the resistance of the ceramic heater can be restricted in the existence of monosilicate represented by $RE_2O_3.SiO_2$ (hereafter, RE is referred to as an element of the group 3a in the periodic table) in the crystal phase existing in the grain boundary of the silicon nitride sintered body before the thermal exposure of the sintered body. These findings resulted in the development of the sixth invention.

More particularly, in the ceramic heater of the sixth invention, the grain boundary phase of the silicon nitride sintered body, which is an insulator embedded with heating resistors made of an inorganic conductive material, includes both crystals of $Mo_{4.8}Si_3C_{0.6}$ and $MoSi_2$, and the crystal phase consisting of silicate of RE existing in the grain boundary before thermal exposure includes monosilicate represented by $RE_2O_3.SiO_2$.

The mole ratio of $SiO_2$ to $RE_2O_3$ included in the silicon nitride sintered body is in the range of 0.8 to 1.8, or $Al_2O_3$ included in the silicon nitride sintered body is in the range of 0.5 to 1.0 weight % or RE of the monosilicate represented by $RE_2O_3.SiO_2$ is Yb, Y, Ho, Er or Lu.

In the ceramic heater of the sixth invention, since the grain boundary phase of the silicon nitride sintered body includes the crystals of $Mo_{4.8}Si_3C_{0.6}$ and $MoSi_2$, sintering progresses without silicconizing the embedded heating resistors, thereby decreasing the difference in thermal expansion between the silicon nitride sintered body and heating resistors.

In addition, since the grain boundary phase of the silicon nitride sintered body before its thermal exposure includes the monosilicate represented by $RE_2O_3.SiO_2$ which has a melting point higher than that of disilicate represented by $RE_2O_3.2SiO_2$, also has lower difference in thermal expansion between the monosilicate and the silicon nitride sintered body, and is superior in thermal resistance, the movement of ions during electric power supply hardly occurs even when heating and cooling are repeated for a long time. As a result, change in resistance hardly generates and the high temperature resistance and oxidation resistance of the ceramic heater are maintained. Consequently, the ceramic heater can have appropriate self-saturation temperature characteristics without deteriorating the quick heating function, thereby having improved durability and reliability.

If the silicon nitride sintered body including the above-mentioned monosilicate is exposed in an oxidative atmosphere at a high temperature for a long time, oxygen is diffused through the surface of the silicon nitride sintered body and the silicon nitride sintered body is oxidized, generating silica ($SiO_2$). The silica $SiO_2$ cannot exist in equilibrium with $RE_2O_3.SiO_2$ because of a reason in phase equilibrium but reacts with it and generates $RE_2O_3.2SiO_2$.

However, once $RE_2O_3.2SiO_2$ is formed in the grain boundary phase near the surface of the silicon nitride sintered body, it exists stably in equilibrium with $SiO_2$ up to high temperatures without causing any reaction and diffusion. As a result, the thermal resistance of the ceramic heater is rather improved.

(Example 7)

The ceramic heater of the sixth invention will be detailed below referring to the attached drawings.

Figure 29:
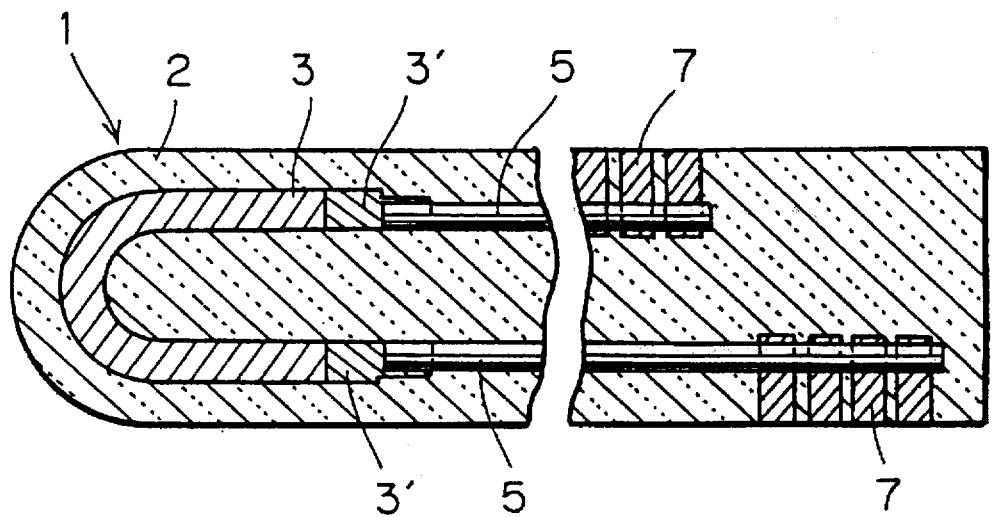
FIG. 29 is a horizontal longitudinal sectional view showing the main section of an example of a ceramic heater of the sixth invention.
Figure 30:
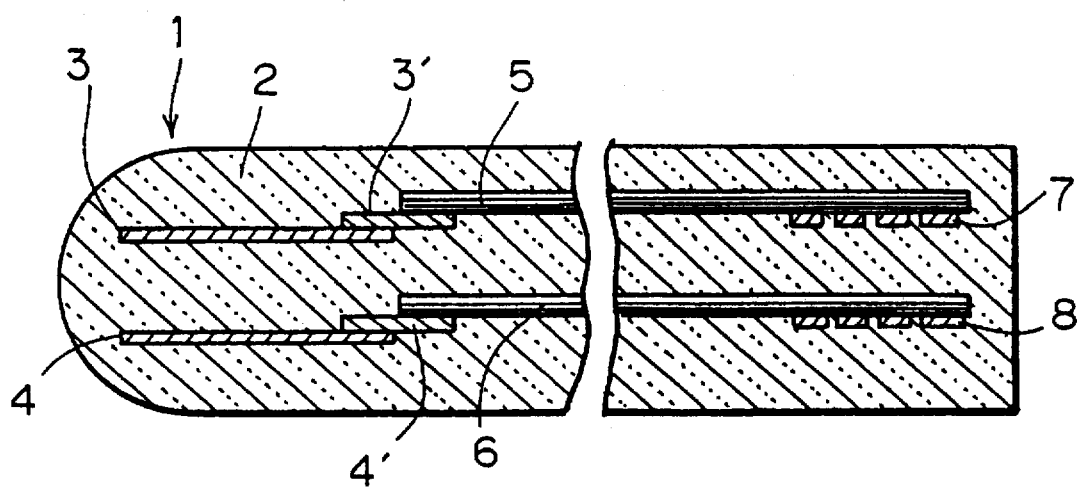
FIG. 30 is a vertical longitudinal sectional view showing the main section of the ceramic heater of the sixth invention.

FIG. 29 is a horizontal longitudinal sectional view showing the main section of an example of the ceramic heater of the sixth invention and FIG. 30 is a vertical longitudinal sectional view showing the main section of the ceramic heater of the sixth invention.

Referring to FIGS. 29 and 30, numeral 1 represents a ceramic heater comprising generally U-shaped first layers 3 (4) of heating resistor composed of two nearly-parallel layers made of an inorganic conductive material, second heating resistors 3' (4') at least partially laminated on the ends of the first layers 3 (4) of heating resistor, lead wires 5 (6) formed from high-melting point wires and connected to the ends of the first layers 3 (4) of heating resistor by means of the second heating resistors 3' (4') and electrodes 7 (8) divided into a plurality of pieces made of an inorganic conductive material and connected to the lead wires 5, 6, the first layers of heating resistor, the second heating resistors 3' (4'), the lead wires and the electrodes 7 (8) being embedded in a silicon nitride sintered body 2, the electrodes 7 (8) being partially exposed outside the circumferential surface of the silicon nitride sintered body 2 and the tip of the ceramic heater being made spheric and the cross section thereof being made circular.

The mole ratio of $SiO_2$ to $RE_2O_3$ included in the silicon nitride sintered body 2 should preferably be in the range of 0.8 to 1.8 so that the grain boundary phase can keep a high melting point and have superior oxidation resistance.

To improve oxidation resistance of the silicon nitride sintered body 2 at high temperatures of 1400° C. or more and enhance oxidation resistance of the $Mo_{4.8}Si_3C_{0.6}$ in the grain boundary phase, the content of $Al_2O_3$ included in the silicon nitride sintered body should more preferably be in the range of 0.5 to 1.0 weight %.

Furthermore, the peak intensity ratio of the crystal phase in the grain boundary phase of the silicon nitride sintered body 2 before its thermal exposure, which is identified by the X-ray diffraction method described later, should preferably be not less than 20% and should more preferably be not less than 25% for monosilicate represented by $RE_2O_3.SiO_2$.

The disilicate represented by $RE_2O_3.2SiO_2$ is allowed to coexist with the above-mentioned monosilicate.

To generate the above-mentioned monosilicate, it is desired that the amount of oxygen in materials, particularly the amount of oxygen in a silicon nitride material is decreased as little as possible and the amount of $RE_2O_3$ to be added as a sintering aid is increased by about 10.5 to 15% to adjust the $Si/SiO_2$ atmosphere so that the amount of oxygen and $SiO_2$ does not increase during firing.

The above-mentioned $SiO_2$ is so-called surplus oxygen existing in the sintered body. More specifically, it is an amount of oxygen excluding the oxygen combined with elements when RE stoichiometrically forms oxides from the total amount of oxygen in the sintered body. The most amount of the oxygen is included in the silicon nitride material.

$RE_2O_3$ to be added as the above-mentioned sintering aid becomes a liquid phase by reacting with silicon nitride grains during sintering to promote sintering. If the additive remains as a glass phase in the grain boundary phase after cooling, however, it deteriorates the oxidation resistance of the sintered body. It is, therefore, necessary to deposit the additive as a crystal phase in the grain boundary by a predetermined cooling process or heat treatment.

RE used for the sixth invention should be yttrium (Y) or lanthanoids. In view of oxidation resistance, RE should preferably be Yb, Y Ho, Er or Lu having a smaller ion radius, and most preferably be Yb.

As unavoidable impurities, Al, Ca, Mg, Fe, etc. may be included in the silicon nitride sintered body. Since these elements are apt to form low-melting point substances as oxides and tend to deteriorate high-temperature characteristics, the amount of such components should preferably be reduced to not more than 0.5 weight % when converted to the amount of oxides.

Additionally, carbide, nitride, oxide, carbonic nitride, silicide, etc. of elements of the 4a, 5a and 6a groups of the periodic table, such as TiC, TiN, WC, $WO_3$, NbC, TaC, $MoSi_2$, etc. can also be added to the extent that the characteristics of the silicon nitride sintered body are not adversely affected, more particularly that the crystallization of the above-mentioned grain boundary phase is not adversely affected, since these additives decrease difference in thermal expansion between the silicon nitride sintered body and the electrode material, thereby improving the thermal shock resistance and being effective as sintering aids.

Furthermore, the main component of the layers 3, 4 of heating resistor or the electrodes 7, 8 made of an inorganic conductive material, is a high-melting point metal, such as tungsten (W), molybdenum (Mo) or rhenium (Re) or one of their alloys, or a carbide or a nitride of the elements of the 4a, 5a and 6a groups of the periodic table, such as tungsten carbide (WC), titanium nitride (TiN) or zirconium boride ($ZrB_2$). In particular, tungsten carbide (WC) is preferable, since it delivers small difference in thermal expansion between the component used as an inorganic conductive material and the silicon nitride sintered body and is superior in thermal shock resistance and stability.

On the other hand, for higher conductivity the lead wires 5, 6 should be made of a high-melting point metal, that is, tungsten (W), molybdenum (Mo) or rhenium (Re), or one of their alloys. In particular, tungsten (W) is ideally suited for easier design.

The tip of the ceramic heater 1 is made generally spheric and its cross section is made circular so that the maximum heating zone is located near the tip and the outer circumference of the ceramic heater is heated effectively and uniformly. The tip is, however, not limited to this shape.

Before evaluating the ceramic heater of the sixth invention, silicon nitride ($Si_3N_4$) powder composed of not more than 1.5 weight % of oxygen as an unavoidable impurity with a specific surface area of 7 to 15 m²/g and not more than 0.05 weight % of metallic impurities was mixed with an oxide of an element of the 3a group of the periodic table, alumina ($Al_2O_3$) and molybdenum silicide ($MoSi_2$), as sintering aids, which were weighed so that the sintered body had compositions shown in Tables 11 and 12. By using the obtained granules, flat ceramic green bodies (refer to FIG. 3) mainly composed of silicon nitride were prepared by a known molding method, such as the press molding method. The amounts of molybdenum silicide in the sintered body compositions shown in Tables 11 and 12 are the sums of the amounts of $Mo_{4.8}Si_3C_{0.6}$ and $MoSi_2$.

Next, solvent was added to the mixture of 80 weight % of powdery tungsten carbide (WC) and 20 weight % of powdery silicon nitride ($Si_3N_4$) to prepare paste. By using the paste, the heating resistors 4 having a thickness of about 40 µm were formed on the surfaces of two different ceramic green bodies 9, 10 by the screen printing method or the like so that the resistor layer had a generally U-shaped pattern and the tip of the pattern was placed within 5 mm from the tip of the ceramic sintered body.

Subsequently, by using the paste composed of 85 weight % of powdery tungsten carbide (WC) and 15 weight % of powdery silicon nitride ($Si_3N_4$), the heating resistors 4' having a thickness of about 40 µm were formed and partially laminated on the ends of the heating resistor 4.

On the other hand, by using the paste having the same composition as that of the heating resistor 4, the four patterns of the electrode 8 having a width of about 0.7 mm and a thickness of about 70 µm were formed in parallel on the other end surface of the ceramic green body 9 at predetermined positions and extended to the side surfaces of the ceramic green body 9 in the same way as described above.

Next, on the ceramic green body 9 on which the layers 3, 3' of heating resistor and the electrodes 7 had been printed in the same way as described above, tungsten (W) wires 6 of 0.25 mm in diameter were placed so that the wires were connected to the heating resistors 4' and the electrodes 8. On this lamination, the above-mentioned ceramic green body 10 was further laminated and other tungsten wires 5 were placed on the ceramic green body 10 so that the wires were connected to the heating resistors 3' and the electrodes 7. The ceramic green body 11 on which no heating resistors and electrodes had been printed was further laminated on the ceramic green body 10. This structure was fired under pressure at 1750° C. for one hour in a reduction atmosphere including carbon (C) and obtained by adjusting the atmosphere of $Si/SiO_2$.

The structure was then heat-treated in nitrogen gas at 1400° C. for 24 hours to crystallize the grain boundary phase.

By grinding the circumference of the silicon nitride sintered body 2 obtained as described above, the tip thereof was made spheric and the cross section thereof was made circular, and the end surfaces of the embedded electrodes 7, 8 were exposed to the side surfaces of the cylindrical sintered body. In this way, a plurality of ceramic heaters 1 having a diameter of about 3.5 mm were prepared.

The surface of the ceramic heater was ground to remove 100 µm or more of its material. The removed substance was then roughly pulverized in a mortar and the above-mentioned inorganic conductive material was removed. The remaining substance was finely ground and the amount of oxygen in the silicon nitride sintered body powder was measured by using a combustion type gas analyzer.

The amount of oxygen included in the oxides added as sintering aids was calculated and subtracted from the measured amount of oxygen. Assuming that the remaining amount of oxygen is entirely included as $SiO_2$, the amount of $SiO_2$ was obtained by calculation. Furthermore, the mole ratio of $SiO_2$ to $RE_2O_3$ was calculated.

Next, a metallic film of nickel (Ni) or the like was formed on at least the exposed portions of the electrodes of the ceramic heater by the metalizing or plating method. A cylindrical support pipe was fit on the ceramic heater so that the pipe was connected to one of the electrodes exposed to the side surfaces of the ceramic heater. The pipe was joined with the electrode by silver soldering in a reduction atmosphere to function as the negative electrode. Furthermore, an electrode formed from a wire or a cap was connected to and joined with the other electrode by silver soldering in the same way as described above to function as the positive electrode. In this way, a plurality of ceramic heaters with the positive and negative electrodes were prepared for evaluation.

The above-mentioned ceramic heater 1 for evaluation was then subjected to 20,000 cycles of a high-load durability test wherein each cycle consisted of a heating period in which the ceramic heater was heated up to the saturation temperature of 1400° C. by applying a DC voltage of 10 to 35 V for 5 minutes and a forcibly cooling period in which electric power supply was stopped and compressed air was blown to the ceramic heater for 1 minute. The change in the resistance value across the electrodes of the ceramic heater before and after the test was measured. A plurality of samples were subjected to the test and those caused increases in resistance not more than 10% were judged to be proper and those caused increases in resistance more than 10% were judged to be improper. The surfaces of the ceramic heaters were further checked for the presence or absence of cracks visually and by using the fluorescent liquid penetrant inspection method.

To examine the crystal phase in the grain boundary phase of the silicon nitride sintered body used as the insulator of the ceramic heater 1, samples of ceramic heaters having the same specifications as those of the ceramic heaters subjected to the high-load durability test were used. After the outer circumference of each sample was ground to remove a slight amount of its material, the substance removed from each silicon nitride sintered body was finely ground and subjected to X-ray diffraction. As a result, $Mo_{4.8}Si_3C_{0.6}$ (represented by (1) in Tables 13 and 14) was identified from the peak at $2\theta=41.8°$ and $MoSi_2$ was identified from the peak at $2\theta=44.7°$ (represented by (2) In Tables 13 and 14). By using the sum of the peak at $2\theta=34.8°$ for $\alpha\text{-}Si_3N_4$ and the peak at $2\theta=33.6°$ for $\beta\text{-}Si_3N_4$ as a standard, that is, by assuming the sum of the peaks to be 100, the peak of the monosilicate (represented by M in Tables 13 and 14) on (-121) at $2\theta=28.7°$ and the peak of the disilicate (represented by Dy in Tables 13 and 14) on (201) at $2\theta=28.0°$ were obtained. The ratios of the two peaks to the sum of the peaks of $\alpha\text{-}Si_3N_4$ and $\beta\text{-}Si_3N_4$ were calculated to identify the two corresponding crystal phases in the grain boundary phase of the silicon nitride sintered body.

Figure 33:
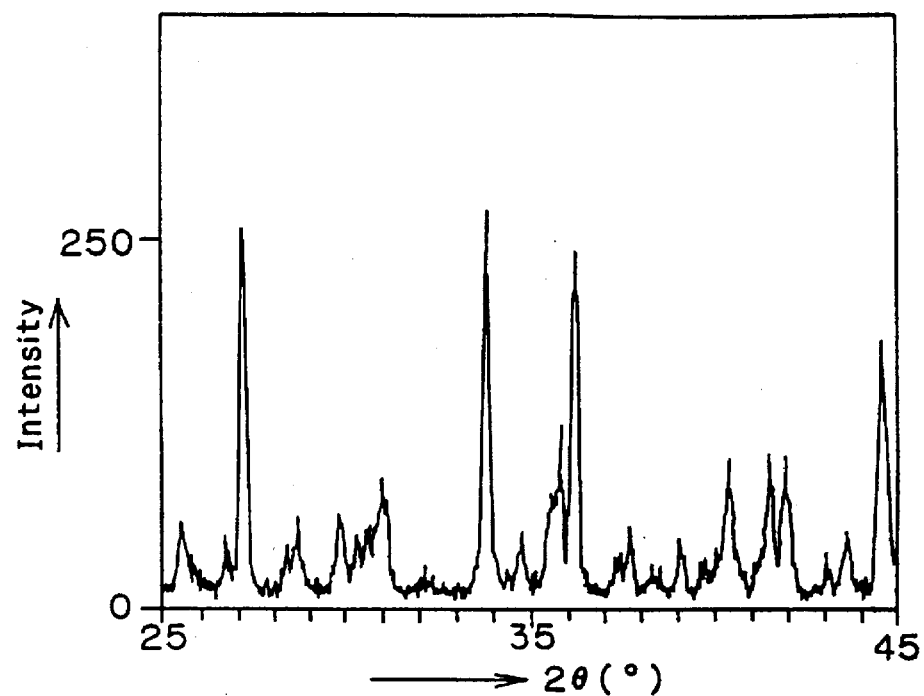
FIG. 33 is an X-ray diffraction pattern for still another typical silicon nitride sintered body of the ceramic heater of the sixth invention.
Figure 34:
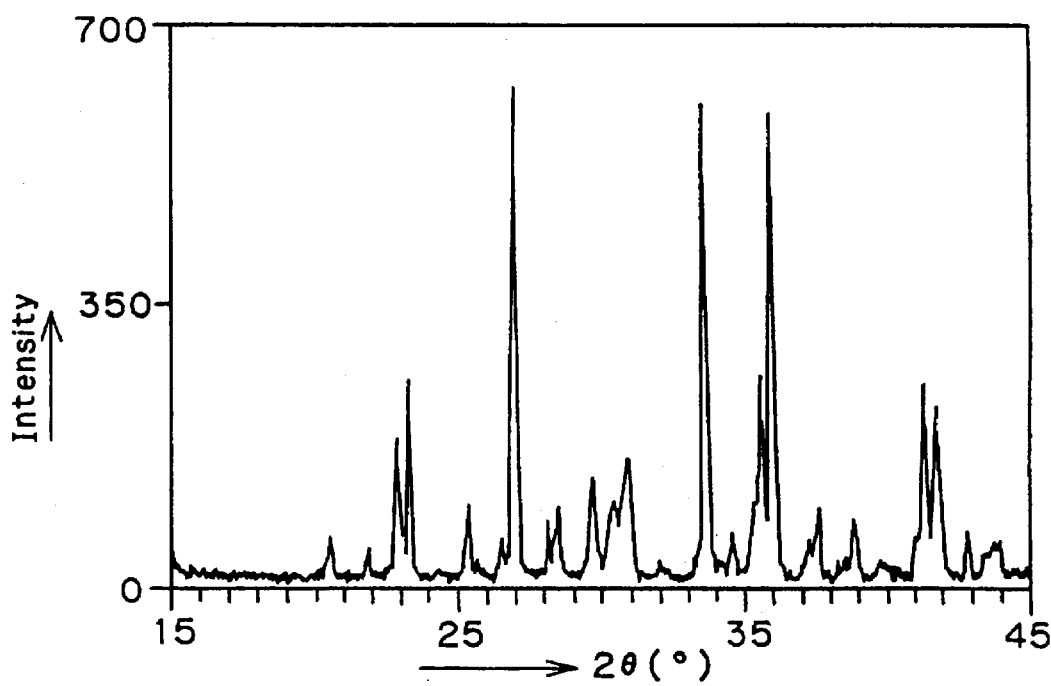
FIG. 34 is an X-ray diffraction pattern for yet still another typical silicon nitride sintered body of the ceramic heater of the sixth invention.
Figure 35:
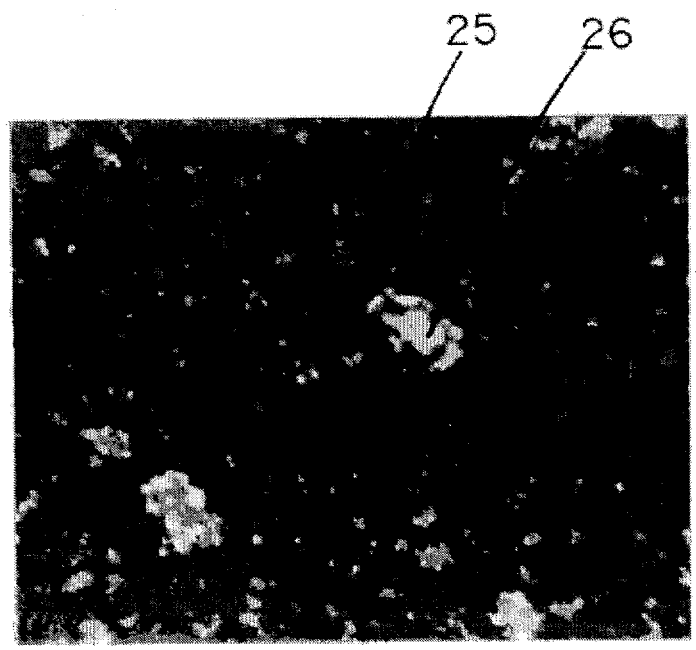
FIG. 35 is a photograph showing the crystal structure of the grain boundary phase of a still further typical silicon nitride of the ceramic heater of the sixth invention (x800)

FIGS. 31 to 34 are X-ray diffraction patterns for typical silicon nitride sintered bodies of the sixth invention. FIG. 35 is a photograph showing a typical crystal structure of the silicon nitride sintered body of the sixth invention.

Figure 36:
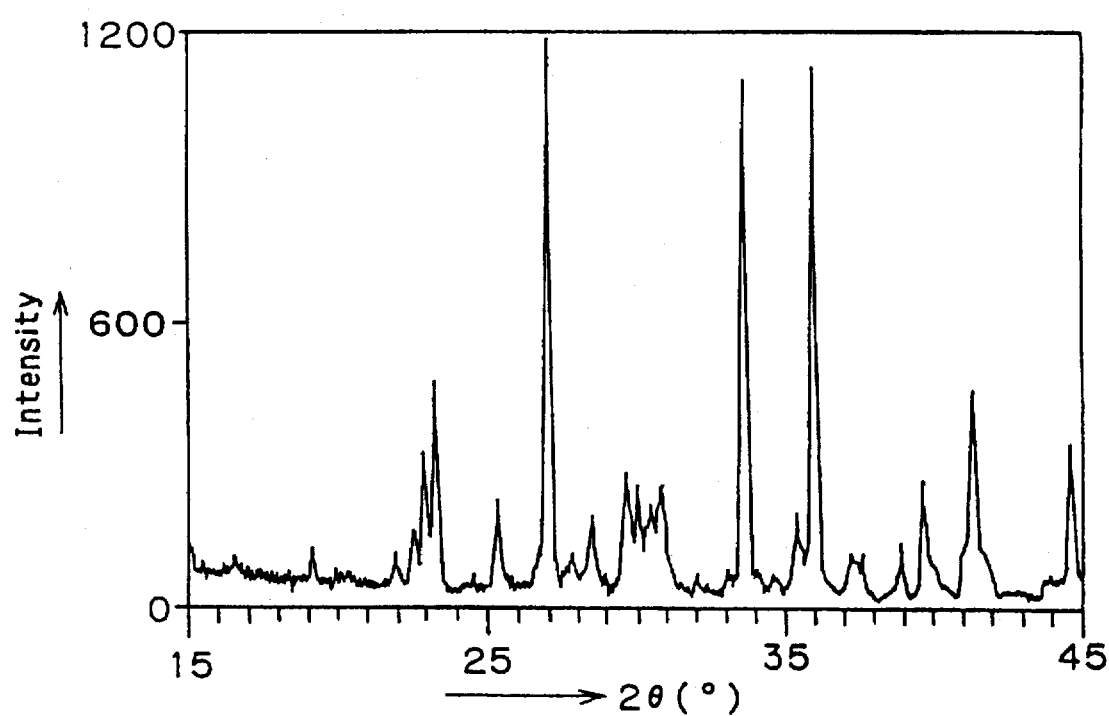
FIG. 36 is an X-ray diffraction pattern for a silicon nitride sintered body of a ceramic heater other than the sixth invention.
Figure 37:
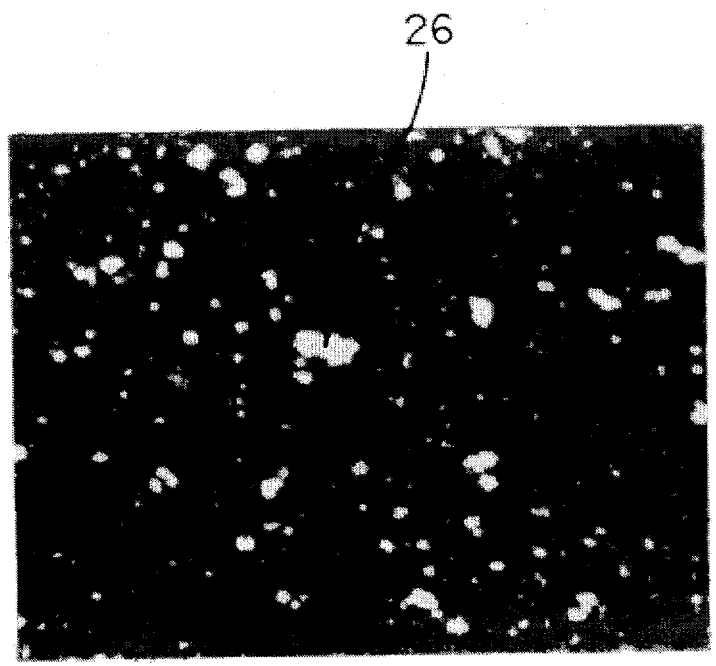
FIG. 37 is a photograph showing the crystal structure of the grain boundary phase of a silicon nitride sintered body of a ceramic heater other than the sixth invention (x800).

FIG. 36 is an X-ray diffraction pattern for a typical silicon nitride sintered body other than the sixth invention, and FIG. 37 is a photograph showing the crystal structure of the grain boundary phase of a typical silicon nitride sintered body other than the sixth invention.

TABLE 11

| Sample No. | Sintered Body Composition | | | | Other Components of Sintered Body | | $\frac{SiO_2}{RE_2O_3}$ |
|---|---|---|---|---|---|---|---|
| | $Si_3N_4$ (wt %) | $RE_2O_3$ Type | (wt %) | $Al_2O_3$ (wt %) | $MoSi_2$ (wt %) | Amount of Oxygen (wt %) | $SiO_2$ (wt %) | (Mole %) |
| 1 | 79.5 | $Yb_2O_3$ | 12.0 | — | 8.5 | 2.56 | 2.06 | 1.1 |
| 2 | " | " | " | — | " | 2.64 | 2.21 | 1.2 |
| 3 | " | " | " | — | " | 2.76 | 2.44 | 1.3 |
| 4 | " | " | " | — | " | 2.85 | 2.61 | 1.4 |
| 5 | " | " | " | — | " | 2.96 | 2.81 | 1.5 |
| 6 | 81.5 | " | 10.0 | — | " | 2.40 | 2.22 | " |
| 7 | " | " | " | — | " | 2.52 | 2.44 | 1.6 |
| 8 | " | " | " | — | " | 2.60 | 2.60 | 1.7 |
| 9 | " | " | " | — | " | 2.72 | 2.82 | 1.8 |
| 10 | 79.5 | " | 12.0 | 0.5 | 8.0 | 2.79 | 2.05 | 1.1 |
| 11 | " | " | " | " | " | 2.86 | 2.18 | 1.2 |
| 12 | " | " | " | " | " | 2.99 | 2.43 | 1.3 |
| 13 | " | " | " | " | " | 3.13 | 2.69 | 1.5 |
| 14 | 81.5 | " | 10.0 | " | " | 2.63 | 2.21 | " |
| 15 | " | " | " | " | " | 2.71 | 2.36 | 1.6 |
| 16 | 79.5 | " | 12.0 | 1.0 | 7.5 | 2.88 | 1.78 | 1.0 |
| 17 | " | " | " | " | " | 3.00 | 2.00 | 1.1 |
| 18 | " | " | " | " | " | 3.10 | 2.19 | 1.2 |
| 19 | " | " | " | " | " | 3.26 | 2.49 | 1.4 |
| 20 | 84.2 | $Y_2O_3$ | 7.3 | 0.5 | 8.0 | 2.76 | 1.83 | 0.9 |
| 21 | " | " | " | " | " | 2.98 | 2.24 | 1.2 |
| 22 | " | " | " | " | " | 3.18 | 2.62 | 1.4 |
| 23 | 79.5 | $Gd_2O_3$ | 12.0 | " | " | 2.79 | 1.81 | 0.9 |
| 24 | " | " | " | " | " | 3.00 | 2.20 | 1.1 |
| 25 | " | " | " | " | " | 3.21 | 2.60 | 1.3 |
| 26 | " | $Dy_2O_3$ | " | " | " | 2.81 | 1.94 | 1.0 |
| 27 | " | " | " | " | " | 3.01 | 2.31 | 1.2 |
| 28 | " | " | " | " | " | 3.10 | 2.48 | 1.3 |
| 29 | " | $Ho_2O_3$ | " | " | " | 2.88 | 2.10 | 1.1 |
| 30 | " | " | " | " | " | 2.98 | 2.29 | 1.2 |
| 31 | " | " | " | " | " | 3.13 | 2.57 | 1.3 |

TABLE 12

| Sample No. | Sintered Body Composition | | | | Other Components Sintered Body | | SiO$_2$/RE$_2$O$_3$ (Mole %) |
|---|---|---|---|---|---|---|---|
| | Si$_3$N$_4$ (wt %) | RE$_2$O$_3$ | | Al$_2$O$_3$ (wt %) | MoSi$_2$ (wt %) | Amount of Oxygen (wt %) | SiO$_2$ (wt %) |
| | | Type | (wt %) | | | | |
| 32 | 79.5 | Er$_2$O$_3$ | 12.0 | 0.5 | 8.0 | 2.96 | 2.29 | 1.2 |
| 33 | " | " | " | " | " | 3.07 | 2.50 | 1.3 |
| 34 | " | " | " | " | " | 3.17 | 2.69 | 1.4 |
| 35 | " | Lu$_2$O$_3$ | " | " | " | 2.81 | 2.12 | 1.2 |
| 36 | " | " | " | " | " | 2.92 | 2.32 | 1.3 |
| 37 | " | " | " | " | " | 3.02 | 2.51 | 1.4 |
| *38 | 79.4 | Yb$_2$O$_3$ | " | 0.1 | 8.5 | 2.85 | 2.60 | " |
| *39 | 79.0 | " | " | 0.5 | " | 3.08 | 2.59 | " |
| *40 | 78.6 | " | " | 0.9 | " | 3.27 | " | " |
| 41 | 71.5 | " | 20.0 | — | " | 3.43 | 1.86 | 0.6 |
| 42 | 75.5 | " | 16.0 | — | " | 3.00 | 1.97 | 0.8 |
| 43 | 79.5 | " | 12.0 | — | " | 2.85 | 2.60 | 1.4 |
| 44 | 83.5 | " | 8.0 | — | " | 2.50 | 2.86 | 2.4 |
| *45 | 85.5 | " | 6.0 | — | " | 2.05 | 2.47 | 2.7 |
| 46 | 71.4 | " | 20.0 | 0.1 | " | 3.40 | 1.72 | 0.6 |
| 47 | 75.4 | " | 16.0 | " | " | 3.01 | 1.90 | 0.8 |
| 48 | 79.4 | " | 12.0 | " | " | 2.86 | 2.53 | 1.4 |
| 49 | 83.4 | " | 8.0 | " | " | 2.56 | 2.88 | 2.4 |
| *50 | 85.4 | " | 6.0 | " | " | 2.10 | 2.48 | 2.7 |
| 51 | 71.0 | " | 20.0 | 0.5 | " | 3.64 | 1.82 | 0.6 |
| 52 | 75.0 | " | 16.0 | " | " | 3.22 | 1.94 | 0.8 |
| 53 | 79.0 | " | 12.0 | " | " | 3.04 | 2.52 | 1.4 |
| 54 | 83.0 | " | 8.0 | " | " | 2.78 | 2.94 | 2.4 |
| *55 | 85.0 | " | 6.0 | " | " | 2.28 | 2.46 | 2.7 |
| 56 | 70.6 | " | 20.0 | 0.9 | " | 3.80 | 1.76 | 0.6 |
| 57 | 74.6 | " | 16.0 | " | " | 3.41 | 1.95 | 0.8 |
| 58 | 78.6 | " | 12.0 | " | " | 3.24 | 2.54 | 1.4 |
| 59 | 82.6 | " | 8.0 | " | " | 2.94 | 2.89 | 2.4 |
| *60 | 84.6 | " | 6.0 | " | " | 2.46 | 2.45 | 2.7 |
| 61 | 70.0 | " | 20.0 | 1.5 | " | 4.10 | 1.80 | 0.6 |
| 62 | 74.0 | " | 16.0 | " | " | 3.71 | 1.99 | 0.8 |
| 63 | 78.0 | " | 12.0 | " | " | 3.50 | 2.50 | 1.4 |
| 64 | 82.0 | " | 8.0 | " | " | 3.23 | 2.91 | 2.4 |
| *65 | 84.0 | " | 6.0 | " | " | 2.74 | 2.44 | 2.7 |

Note:
Samples identified by sample numbers marked * are not included in the claims of the sixth invention.

TABLE 13

Figure 31:
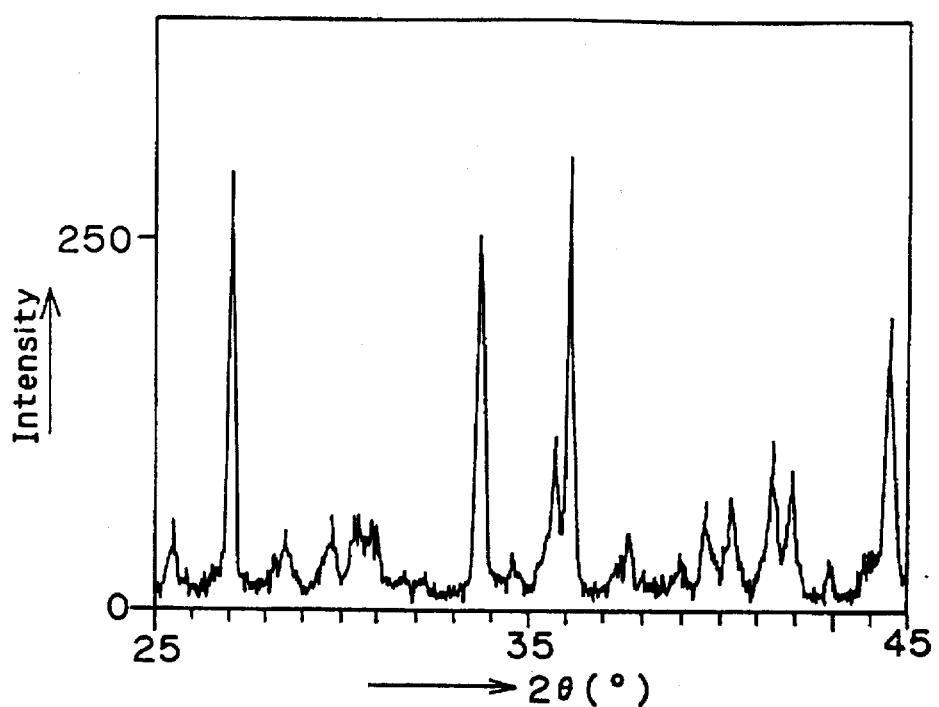
FIG. 31 is an X-ray diffraction pattern for a typical silicon nitride sintered body of the ceramic heater of the sixth invention.
Figure 32:
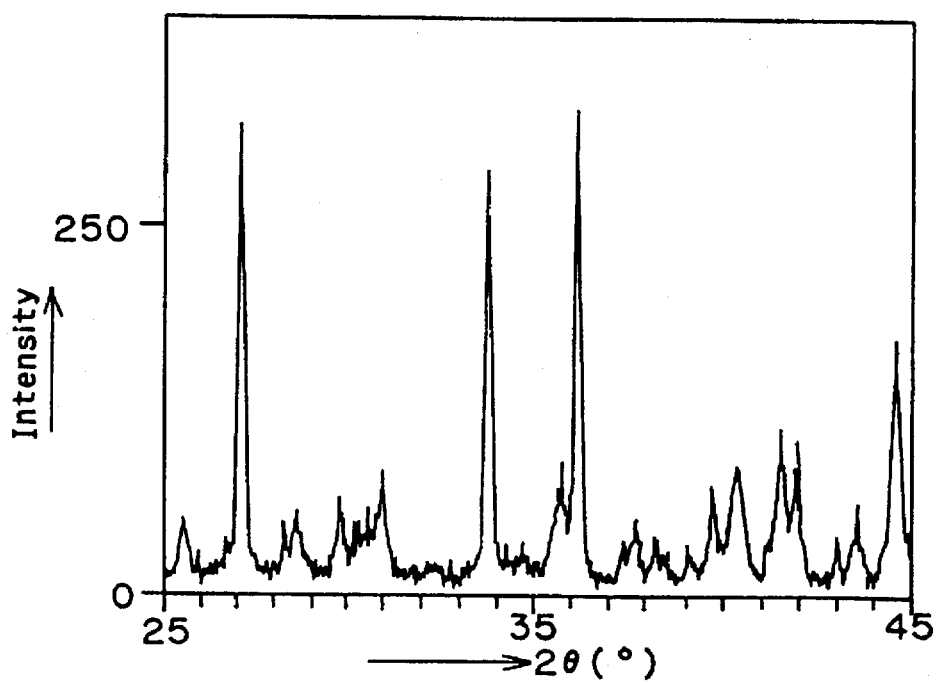
FIG. 32 is an X-ray diffraction pattern for another typical silicon nitride sintered body of the ceramic heater of the sixth invention.

| Sample No. | X-ray Diffraction | | | Increasing in Resistance | High-load Durability Test 1400° C.–20000 cycles | | Remarks |
|---|---|---|---|---|---|---|---|
| | ① Presence ② Absence | M (%) α + β | DY (%) α + β | | Surface Condition | Crack Generation | |
| 1 | ①-② | 23 | 0 | Proper | Normal | Not cracked | |
| 2 | " | 17 | " | " | " | " | |
| 3 | " | 15 | " | " | " | " | FIG. 31 |
| 4 | " | 13 | " | " | " | " | |
| 5 | " | 12 | " | " | " | " | FIG. 32 |
| 6 | " | 19 | " | " | " | " | |
| 7 | " | 17 | " | " | " | " | |
| 8 | " | 13 | " | " | " | " | |
| 9 | " | 12 | " | " | " | " | |
| 10 | " | 21 | " | " | " | " | FIG. 33 |
| 11 | " | 18 | " | " | " | " | |
| 12 | " | 14 | " | " | " | " | |
| 13 | " | 11 | " | " | " | " | |
| 14 | " | 17 | " | " | " | " | |
| 15 | " | 13 | " | " | " | " | |
| 16 | " | 22 | " | " | " | " | |
| 17 | " | 17 | " | " | " | " | |
| 18 | " | 13 | " | " | " | " | |

TABLE 13-continued

| | X-ray Diffraction | | | High-load Durability Test 1400° C.–20000 cycles | | | |
|---|---|---|---|---|---|---|---|
| | | (%) | | Increasing in | | | |
| Sample No. | ① Presence ② Absence | M α + β | DY α + β | Resistance | Surface Condition | Crack Generation | Remarks |
| 19 | " | 10 | " | " | " | " | |
| 20 | " | 19 | " | " | " | " | |
| 21 | " | 14 | " | " | " | " | |
| 22 | " | 11 | " | " | " | " | |
| 23 | " | 21 | " | " | " | " | |
| 24 | " | 14 | " | " | " | " | |
| 25 | " | 10 | " | " | " | " | |
| 26 | " | 21 | " | " | " | " | |
| 27 | " | 13 | " | " | " | " | |
| 28 | " | 10 | " | " | " | " | |
| 29 | " | 20 | " | " | " | " | |
| 30 | " | 14 | " | " | " | " | |
| 31 | " | 9 | " | " | " | " | |

TABLE 14

| | X-ray Diffraction | | | High-load Durability Test 1400° C.–20000 cycles | | | |
|---|---|---|---|---|---|---|---|
| | | (%) | | Increasing in | | | |
| Sample No. | ① Presence ② Absence | M α + β | DY α + β | Resistance | Surface Condition | Crack Generation | Remarks |
| 32 | ①–② | 19 | 0 | Proper | Normal | Not cracked | |
| 33 | " | 13 | " | " | " | " | |
| 34 | " | 9 | " | " | " | " | |
| 35 | " | 20 | " | " | " | " | |
| 36 | " | 15 | " | " | " | " | |
| 37 | " | 13 | " | " | " | " | |
| *38 | ① | 18 | " | Improper | Whitening | Cracked | |
| *39 | " | 15 | 7 | " | Normal | " | A |
| *40 | " | 16 | 0 | " | Whitening | " | |
| 41 | ①–② | 28 | " | Proper | Normal | Not cracked | |
| 42 | " | 20 | " | " | " | " | |
| 43 | " | 15 | " | " | " | " | |
| 44 | " | 8 | 10 | " | " | " | |
| *45 | " | 0 | 40 | Improper | " | Cracked | |
| 46 | " | 29 | 0 | Proper | " | Not cracked | |
| 47 | " | 23 | " | " | " | " | |
| 48 | " | 16 | " | " | " | " | |
| 49 | " | 10 | 14 | " | " | " | |
| *50 | " | 0 | 45 | Improper | " | Cracked | |
| 51 | " | 30 | 0 | Proper | " | Not cracked | |
| 52 | " | 22 | " | " | " | " | |
| 53 | " | 14 | " | " | " | " | B |
| 54 | " | 7 | 10 | " | " | " | |
| *55 | " | 0 | 43 | Improper | " | Cracked | |
| 56 | " | 30 | 0 | Proper | " | Not cracked | |
| 57 | " | 23 | " | " | " | " | |
| 58 | " | 17 | " | " | " | " | |
| 59 | " | 12 | 11 | " | " | " | |
| *60 | " | 0 | 38 | Improper | " | Cracked | |
| 61 | " | 31 | 0 | Proper | " | Not cracked | |
| 62 | " | 24 | " | " | " | " | |
| 63 | " | 16 | " | " | " | " | |
| 64 | " | 11 | 13 | " | " | " | |
| *65 | " | 0 | 39 | Improper | " | Cracked | |

Note
(1) Samples identified by sample numbers marked * are not included in the claims of the sixth invention.
(2) A . . . FIG. 36, FIG. 37
B . . . FIG. 34, FIG. 35

As clearly shown in Tables 11 to 14, samples 38, 39 and 40 wherein two crystals of $Mo_{4.8}Si_3C_{0.6}$ and $MoSi_2$ did not coexist in the grain boundary phase of the silicon nitride sintered body, or samples 45, 50, 55, 60 and 65 wherein only disilicate was detected in the grain boundary phase of the silicon nitride sintered body caused increases in resistance exceeding 10% at the high-load durability test. In particular, samples 45, 50, 55, 60 and 65 were cracked.

On the other hand, the ceramic heater samples of the sixth invention were found normal after 20,000 cycles of the high-load durability test wherein the samples were heated up to 1400° C.

According to the structure photographs in FIGS. 35 and 37, only the crystal of $MoSi_2$ (26) existed in the grain boundary phase of a ceramic heater other than the sixth invention as shown in FIG. 37, but the crystal of $Mo_{4.8}Si_3C_{0.6}$ (25) exists in the crystal of $MoSi_2$ (26) in FIG. 35 which shows the grain boundary phase of the silicon nitride sintered body of the ceramic heater of the sixth invention.

Time required for the maximum heating zone to reach 800° C. was measured when the maximum voltage of 14.3 V was applied to each ceramic heater for evaluation. By this measurement, it was confirmed that all the ceramic heater samples of the sixth invention had a quick heating function of not more than 2.1 seconds.

To make the ceramic heater of the sixth invention usable in various temperature conditions ranging from severe cold to tropical hot weather, the ceramic heater samples were also subjected to a standing test for 100 hours between 600° and 900° C. wherein the grain boundary phase of the silicon nitride sintered body was apt to be oxidized. It was confirmed that all the ceramic heater samples of the sixth invention were normal after the test.

As described above, in the ceramic heater of the sixth invention, two crystals of $Mo_{4.8}Si_3C_{0.6}$ and $MoSi_2$ can coexist in the grain boundary phase of the silicon nitride sintered body, and the grain boundary phase of the silicon nitride sintered body before its thermal exposure includes monosilicate represented by $RE_2O_3 \cdot SiO_2$. Consequently, the heating resistors are hardly siliconized when they are sintered with the sintered body into one body and the resistance values of the heating resistors do not change significantly even when the heater is repeatedly heated and cooled for a long time. In addition, breakdown is not caused in the heating resistors and the insulator of the ceramic heater is not cracked. Consequently, the strength at high temperatures and oxidation resistance of the ceramic heater can be maintained and appropriate self-saturation temperature characteristics can be obtained without deteriorating the quick heating function. For these reasons, the sixth invention can provide a ceramic heater superior in durability and reliability in any environments.

We claim:

1. A ceramic heater for a DC power source, comprising:

an insulating ceramic sintered body having a surface, a heating resistor embedded in the sintered body, and at least two leads connected to the heating resistor, the at least two leads comprising at least two electrodes exposed on the surface of the ceramic sintered body, the heating resistor comprising at least two printed layers of inorganic conductive material, the at least two electrodes comprising at least a printed layer of inorganic conductive material, and the at least two leads comprising at least a high melting point metal wire, wherein the ceramic sintered body comprises a substantially rod-shaped body having a substantially spherical tip, the heating resistor, the at least two leads and at least a portion of the at least two electrodes are disposed in the ceramic sintered body, the heating resistor comprises at least two substantially U-shaped, mutually parallel layers, and each of the at least two electrodes comprises a separate layer and each separate layer comprises a plurality of pieces.

2. The ceramic heater of claim 1, comprising:

a support pipe for supporting the heating resistor, and brazing material for joining the heating resistor to the support pipe.

3. The ceramic heater of claim 1, wherein the insulating ceramic sintered body comprises silicon nitride ceramic, the silicon nitride ceramic comprising mainly silicon nitride, at least one of the at least two printed layers of the heating resistor comprises a first material, the first material having a first resistance and comprising 65 to 95 weight % of WC and 5 to 35 weight % of $Si_3N_4$, at least one of the at least two electrodes comprises a second material, the second material having a second resistance and being substantially identical to the first material, the second resistance being lower than the first resistance, and at least one of the at least two leads comprises a W wire.

4. The ceramic heater of claim 3, wherein at least one of the at least two printed layers of the heating resistor comprises 75 to 90 weight % of WC and 10 to 25 weight % of $Si_3N_4$.

5. The ceramic heater of claim 2, wherein the heating resistor defines an effective heating zone having a length l, the insulating ceramic sintered body including the effective heating zone defines a maximum outside diameter D, the ceramic heater defines an exposed length L, and the following equations are satisfied:

$l/L \leq (\frac{1}{2} \times l/D) - 5$, $10 \leq l/L \leq 67$ and, $50 \leq l/D \leq 178$ where l/L and l/D represent percent values.

6. The ceramic heater of claim 5, wherein the values of l/D and l/L are defined, as shown in FIG. 9, by a shaded area II surrounded by lines connecting points P6, P7, P8 and P9 which are represented by the following values of l/D and l/L:

|    | l/D | l/L |
|----|-----|-----|
| P6 | 89  | 32  |
| P7 | 89  | 22  |
| P8 | 148 | 35  |
| P9 | 148 | 56. |

7. A ceramic heater for a DC power source, comprising:

an insulating ceramic sintered body having a surface, a heating resistor embedded in the sintered body, at least two leads connected to the heating resistor, the at least two leads comprising at least two electrodes exposed on the surface of the ceramic sintered body, the heating resistor comprising at least a first and a second printed layers of inorganic conductive material, the at least two electrodes comprising at least a printed layer of inorganic conductive material, the at least two leads comprising at least a high melting point metal wire having a first end and a second end, at least a portion of the first and second layers being laminated together to thereby connect the first end of the high melting point wire to at least one of the first and second layers, and the at least two electrodes being embedded in the sintered body and being connected to the second end of the high melting point wire.

8. The ceramic heater of claim 7, wherein the second layer defines a width, wherein the first layer defines a width, and wherein the width of the second layer is smaller than the width of the first layer.

9. The ceramic heater of claim 2, wherein the heating resistor has an end connected to the lead wire, d represents the minimum diameter of a circle enclosing the heating resistor in the transverse sectional plane of the ceramic heater, the ceramic heater has a tip and defines a minimum outside diameter or thickness equal to D1, the tip of the ceramic heater and the end of the heating resistor connected to the lead wire define a distance therebetween equal to l2, the ceramic heater defines an exposed length L, and the following equations are satisfied:

$$0.06 < d/D1 \times P2/L \leq 0.6,$$

$$0.3 < d/D1 < 0.9, \text{ and}$$

$$0.2 < l2/L < 1.0$$

10. The ceramic heater of claim 2, wherein the ceramic heater defines a tip, the support pipe defines an outer edge, the heating resistor defines a cross section having a center, a corner, and an outer circumferential edge, the outer edge of the support pipe and the outer circumferential edge of the heating resistor define a distance therebetween equal to $d_n$, the center of the cross section of the heating resistor and the corner of the heating resistor define a maximum distance therebetween equal to $W_n$, the tip of the ceramic heater and the outer edge of the support pipe define a distance of exposed length of ceramic heater therebetween equal to L, the insulating ceramic sintered body defines an outside diameter or width equal to D, and the following equations are satisfied:

$$D/2W_n > 2(L-d_n)/L, \text{ where}$$

$$2W_n < D,$$

$$0 < d_n < L, \text{ and}$$

n is an integer.

* * * * *